(12) United States Patent
Nisnevich et al.

(10) Patent No.: US 7,588,314 B1
(45) Date of Patent: Sep. 15, 2009

(54) IMAGE FORMING DEVICE AND METHOD USING INTERMITTENT MOTION ACROSS A WORK SURFACE

(76) Inventors: Lev Nisnevich, 6 Sela Street, Tel Aviv 67537 (IL); Marina Borodina Stein, 3771 Hwy. 546, Princeton, TX (US) 75407

( * ) Notice: Subject to any disclaimer, the term of this patent is extended or adjusted under 35 U.S.C. 154(b) by 784 days.

(21) Appl. No.: 11/339,556

(22) Filed: Jan. 26, 2006

Related U.S. Application Data

(63) Continuation of application No. 11/246,244, filed on Oct. 11, 2005, now abandoned.

(60) Provisional application No. 60/617,972, filed on Oct. 12, 2004.

(51) Int. Cl.
*B41J 25/00* (2006.01)
(52) U.S. Cl. .......................... 347/37; 347/104; 400/283
(58) Field of Classification Search ................. 347/104, 347/37, 101, 197; 400/23, 283
See application file for complete search history.

(56) References Cited

U.S. PATENT DOCUMENTS

| 6,695,445 | B2 * | 2/2004 | Hagstrom et al. | 347/104 |
| 6,805,504 | B1 * | 10/2004 | Nisnevich | 400/283 |

* cited by examiner

*Primary Examiner*—Huan H Tran
(74) *Attorney, Agent, or Firm*—Dennison, Schultz & MacDonald

(57) ABSTRACT

A method and device for forming an image on various types of work surfaces and/or copying an image from a work surface to a computer memory. The device forms an image portion by portion, each portion being formed while the device is motionless at the stoppages between displacements thereof. The device includes means for enabling placing subsequently formed image portions with proper spatial relationship to the portions formed earlier in order to form an accurate image. The device comprises two or more rigid structures moving relative to each other each having contact means for engagement and release of the rigid structures to and from the work surface.

40 Claims, 38 Drawing Sheets

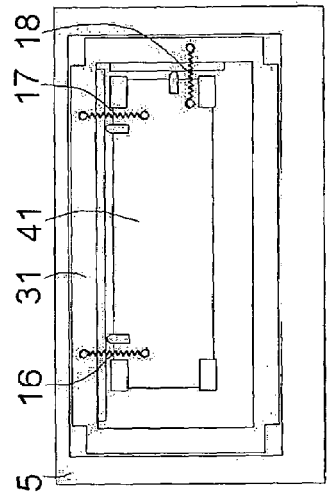
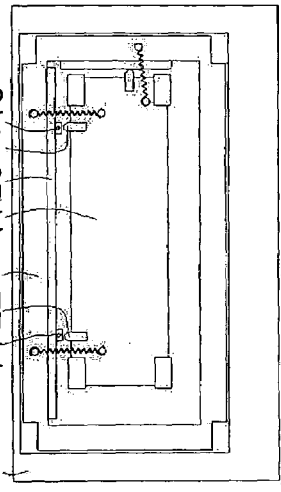
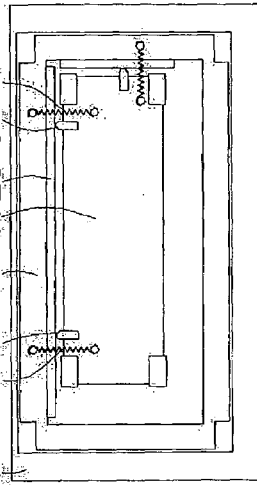
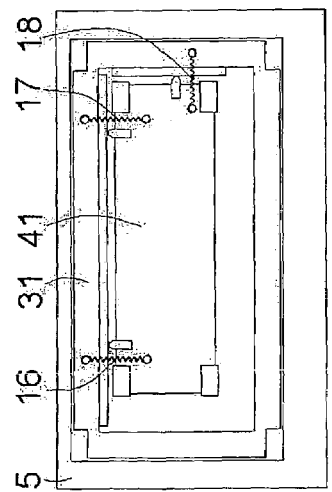
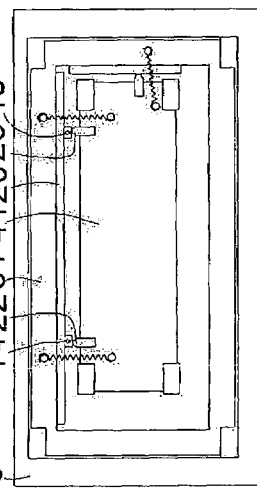
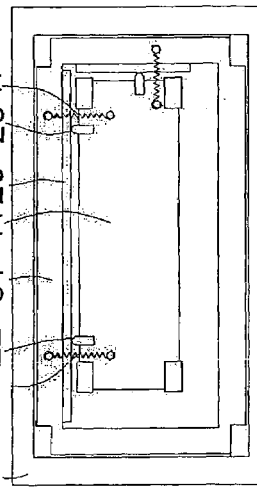

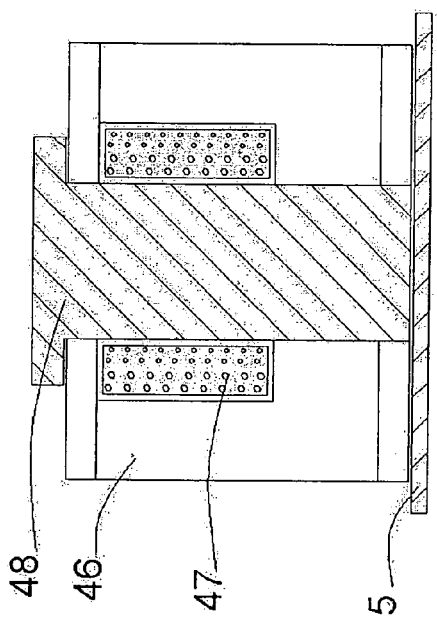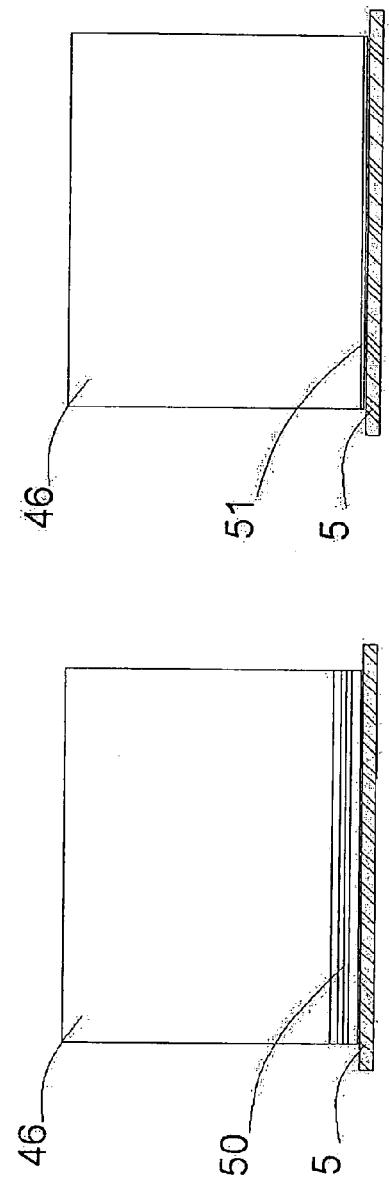

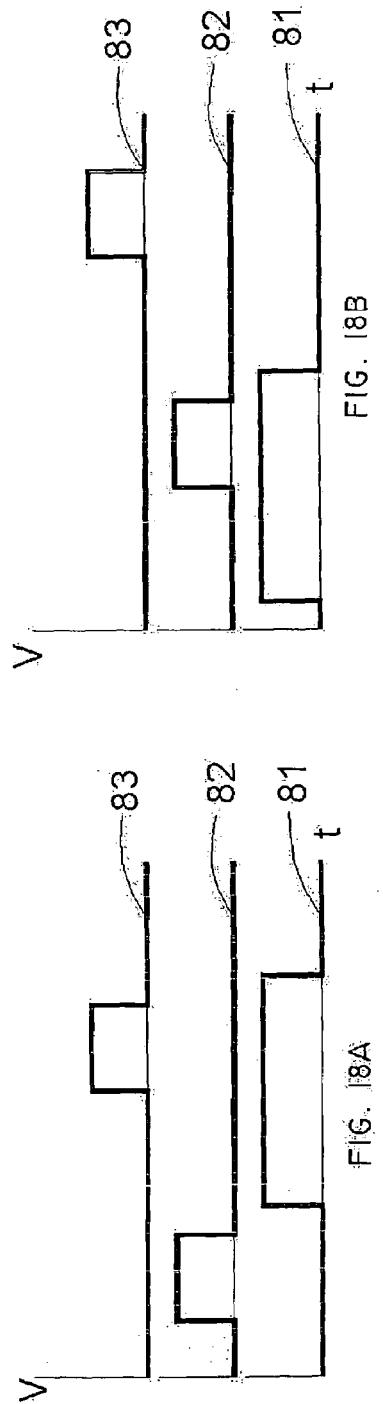
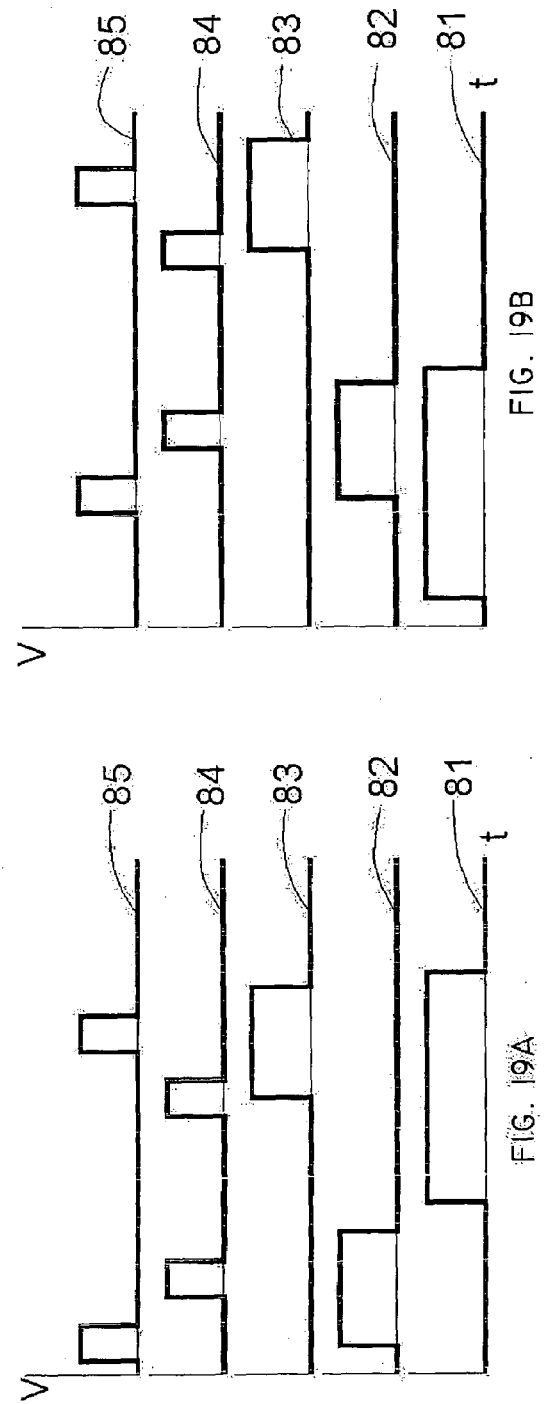

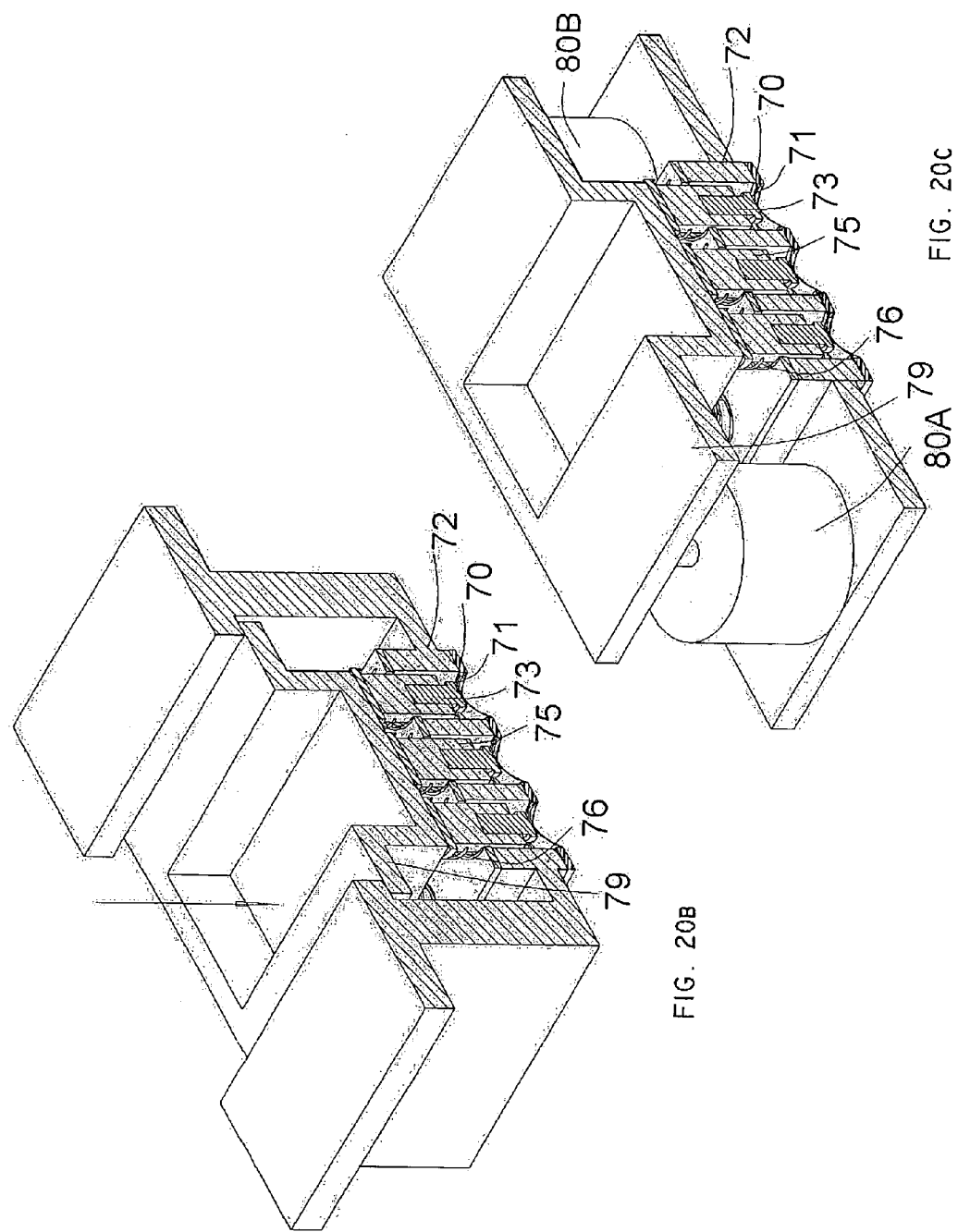

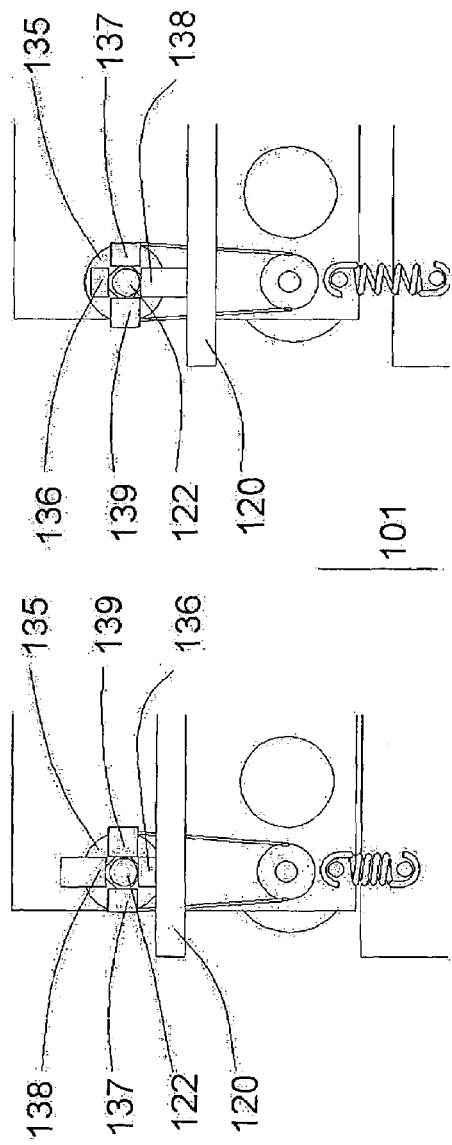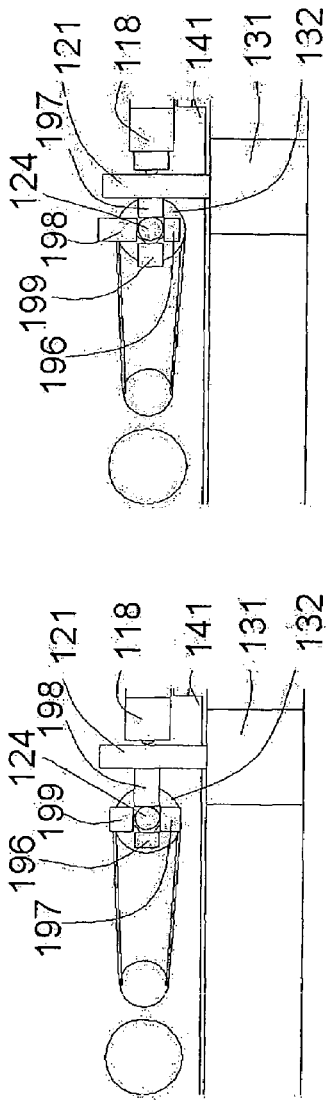
FIG. 22B
FIG. 22A
FIG. 22D
FIG. 22C

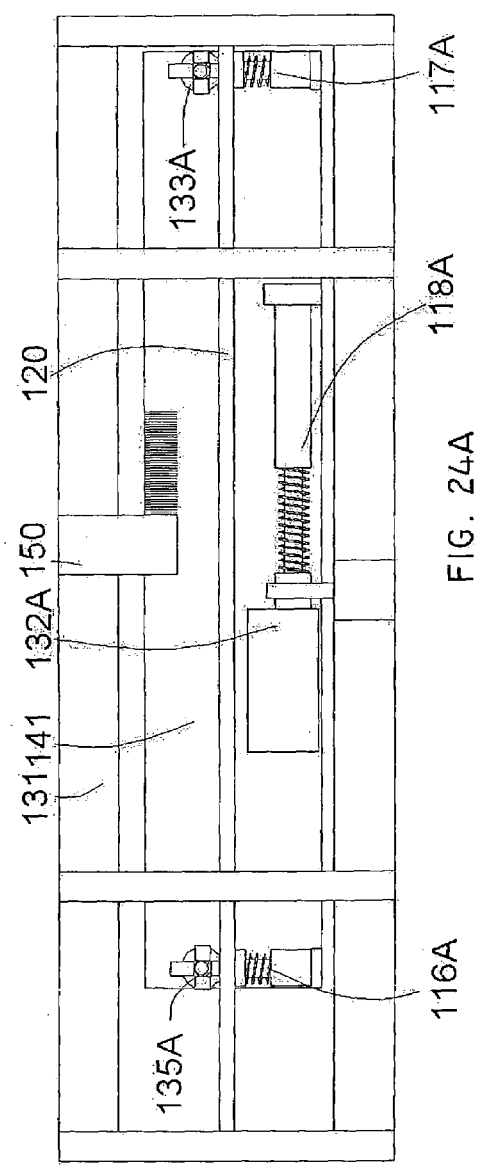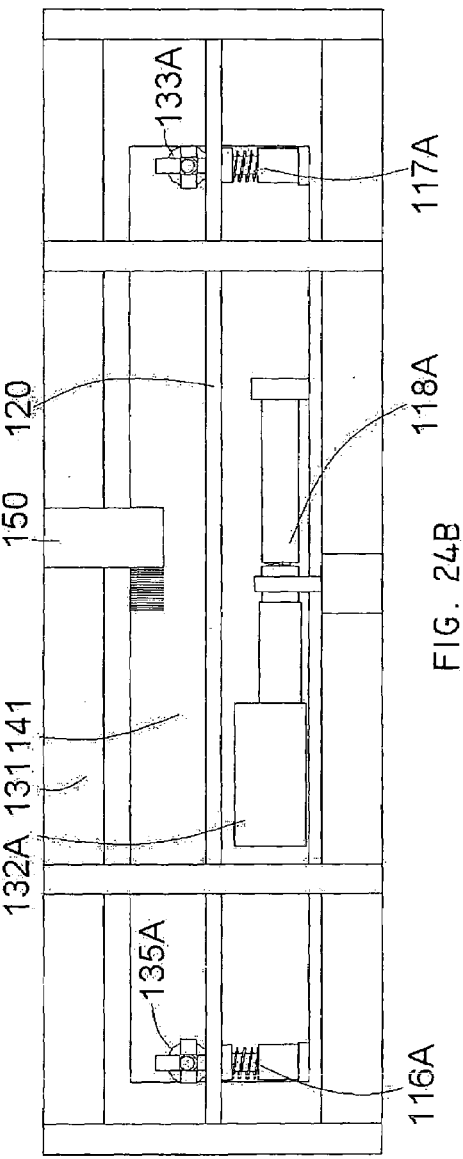
FIG. 24A
FIG. 24B

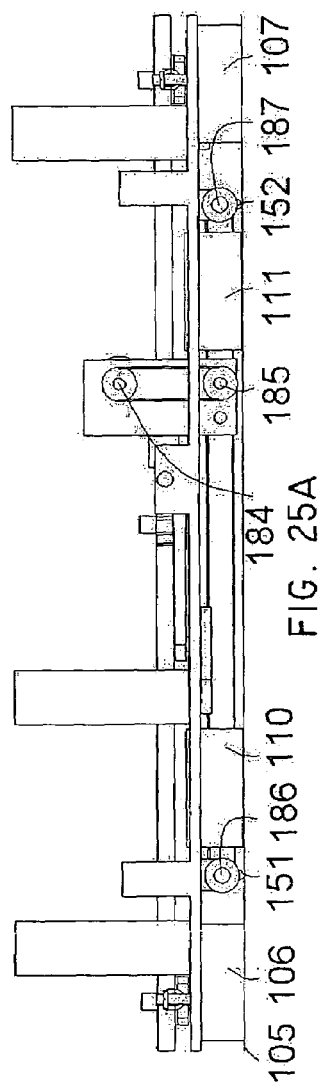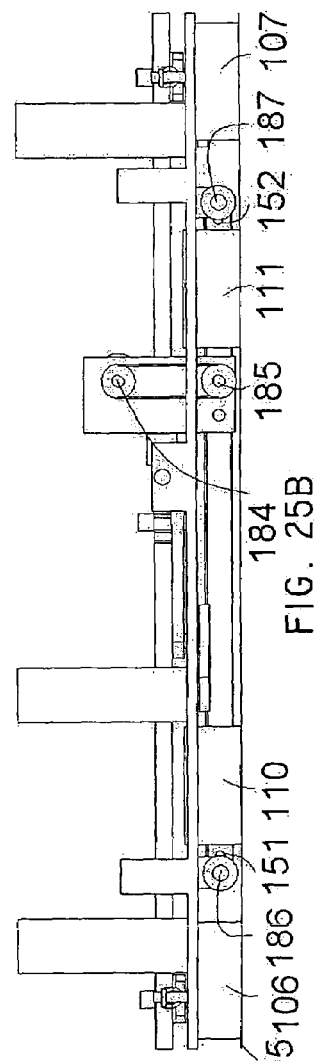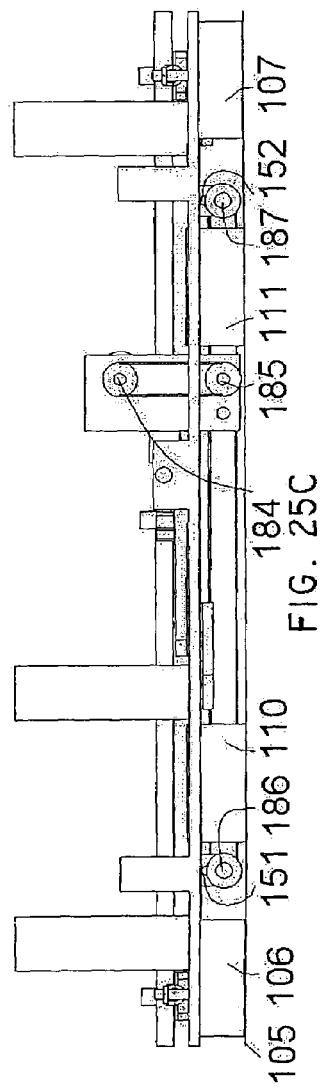

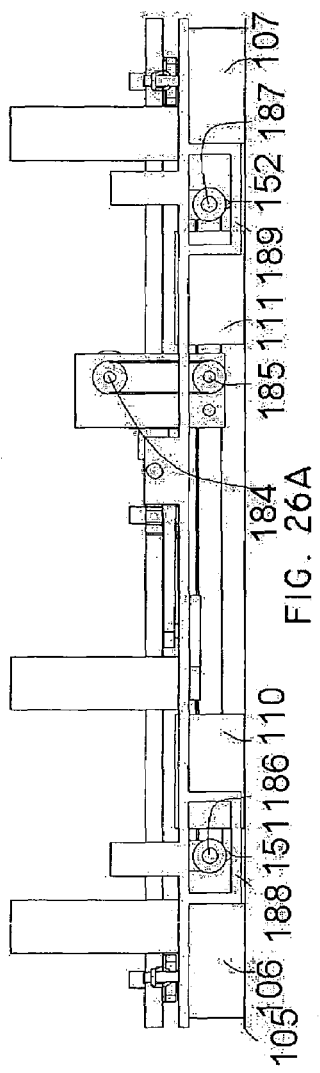
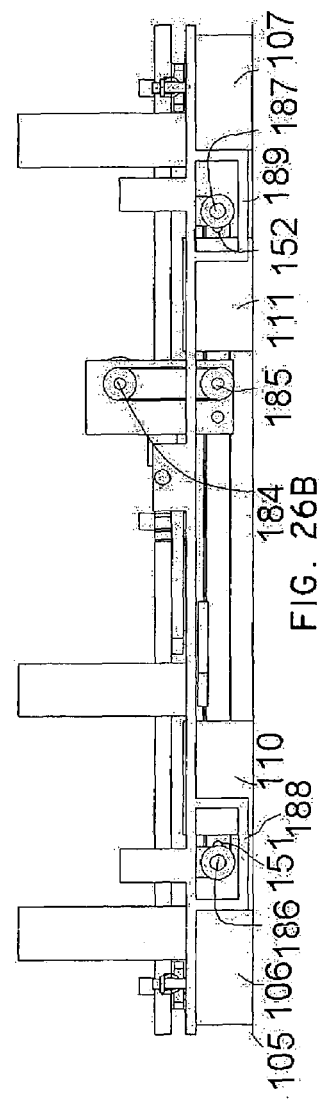
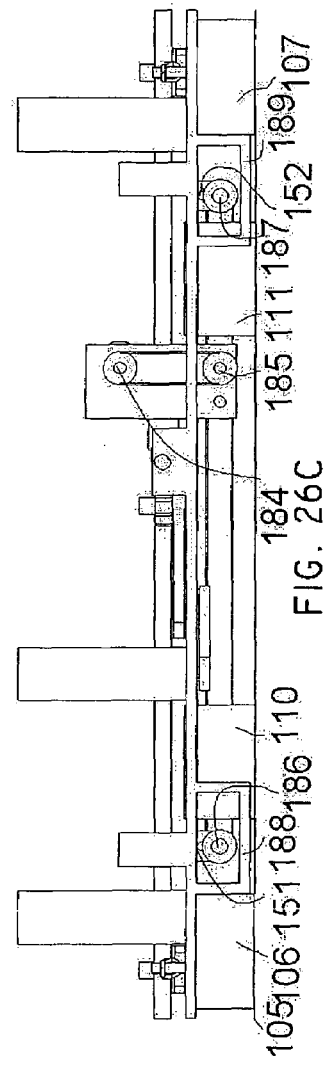

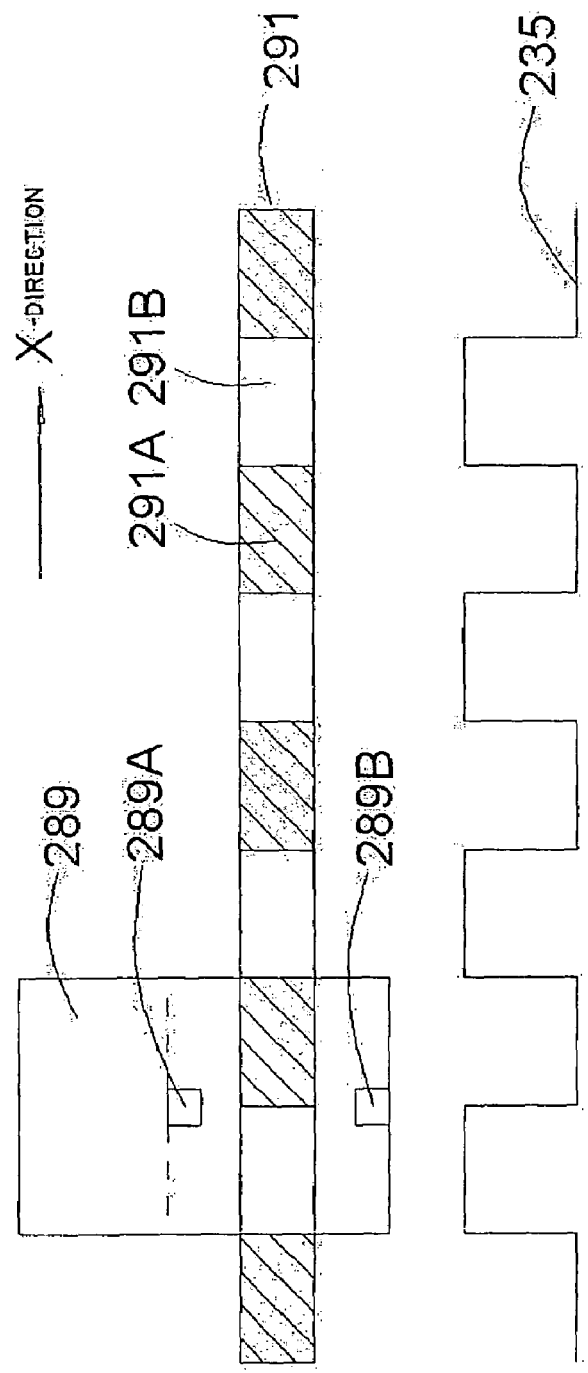

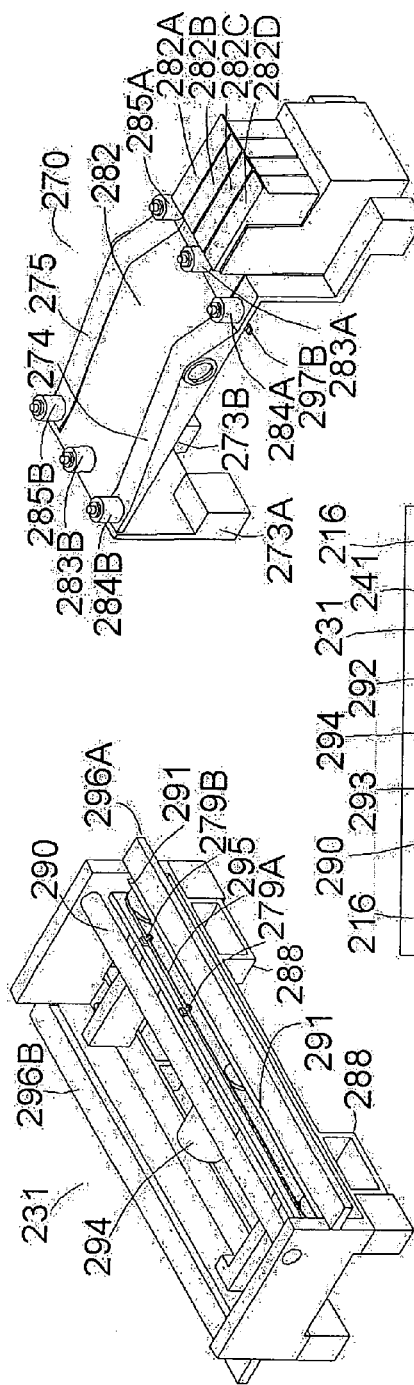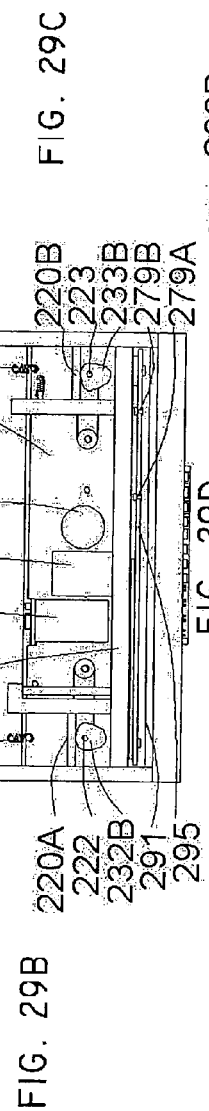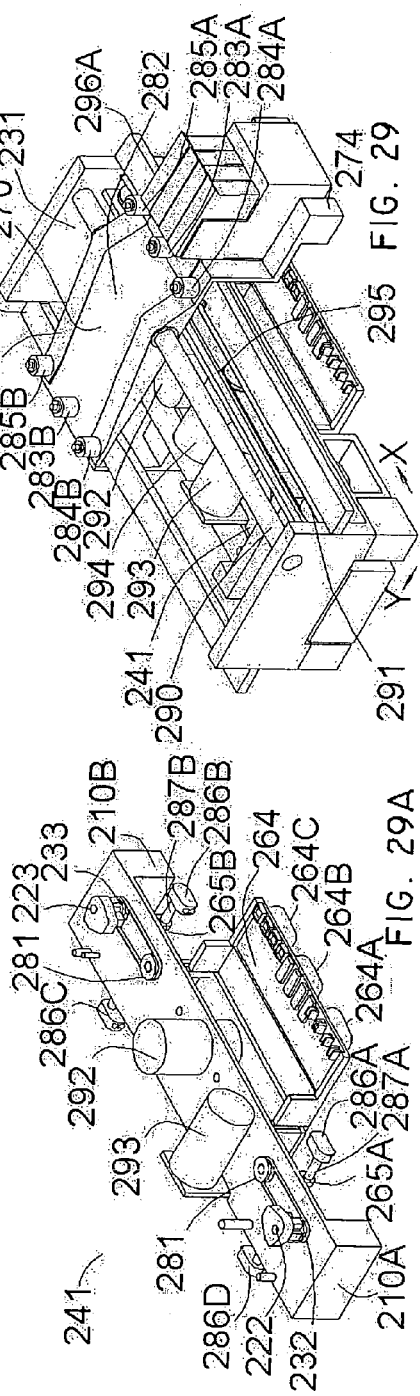

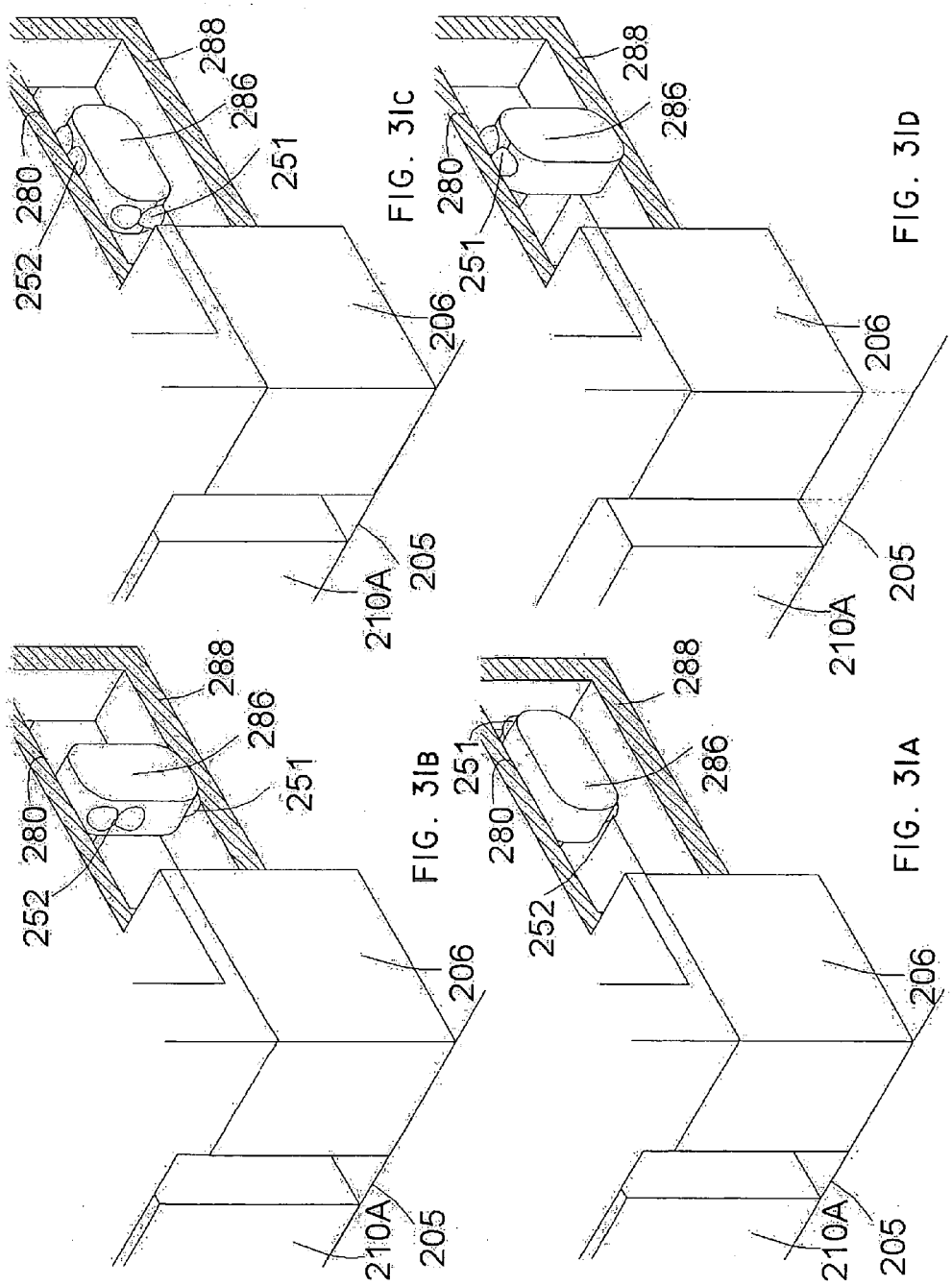

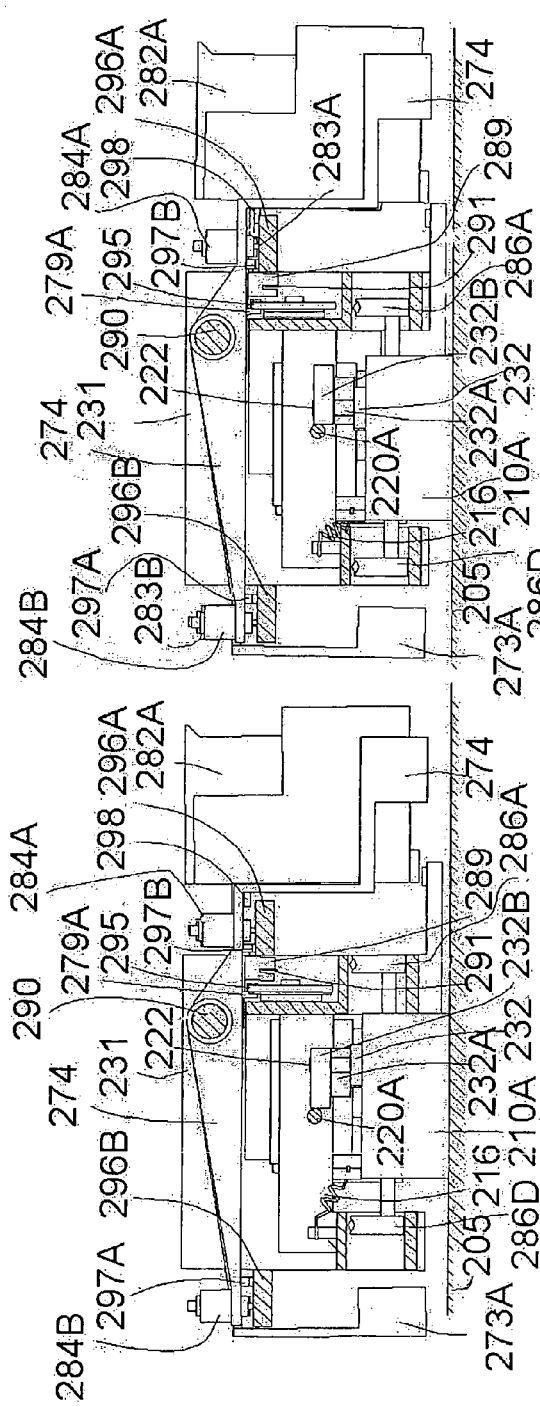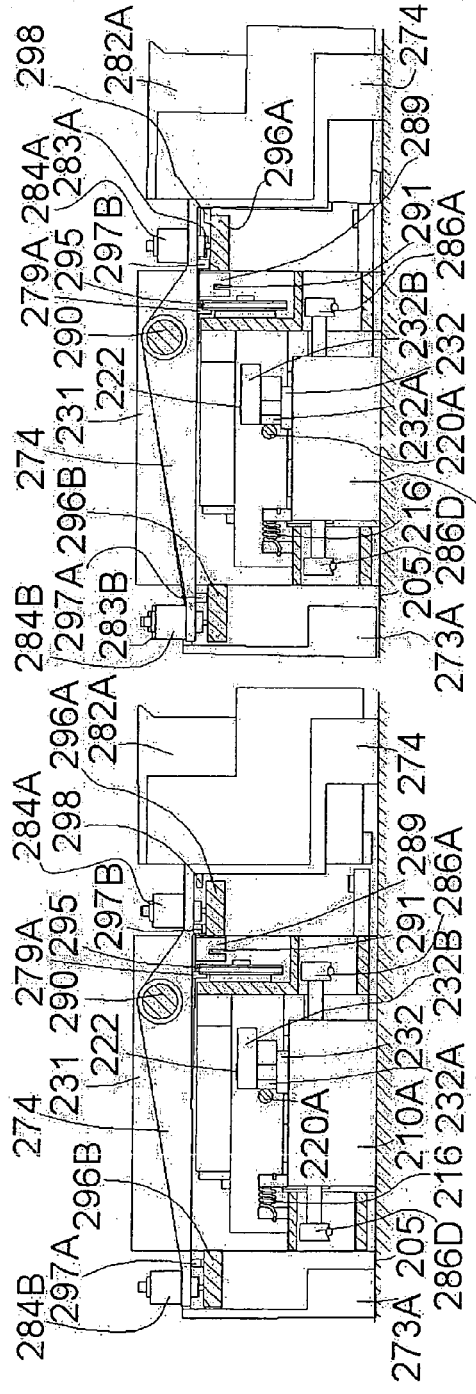

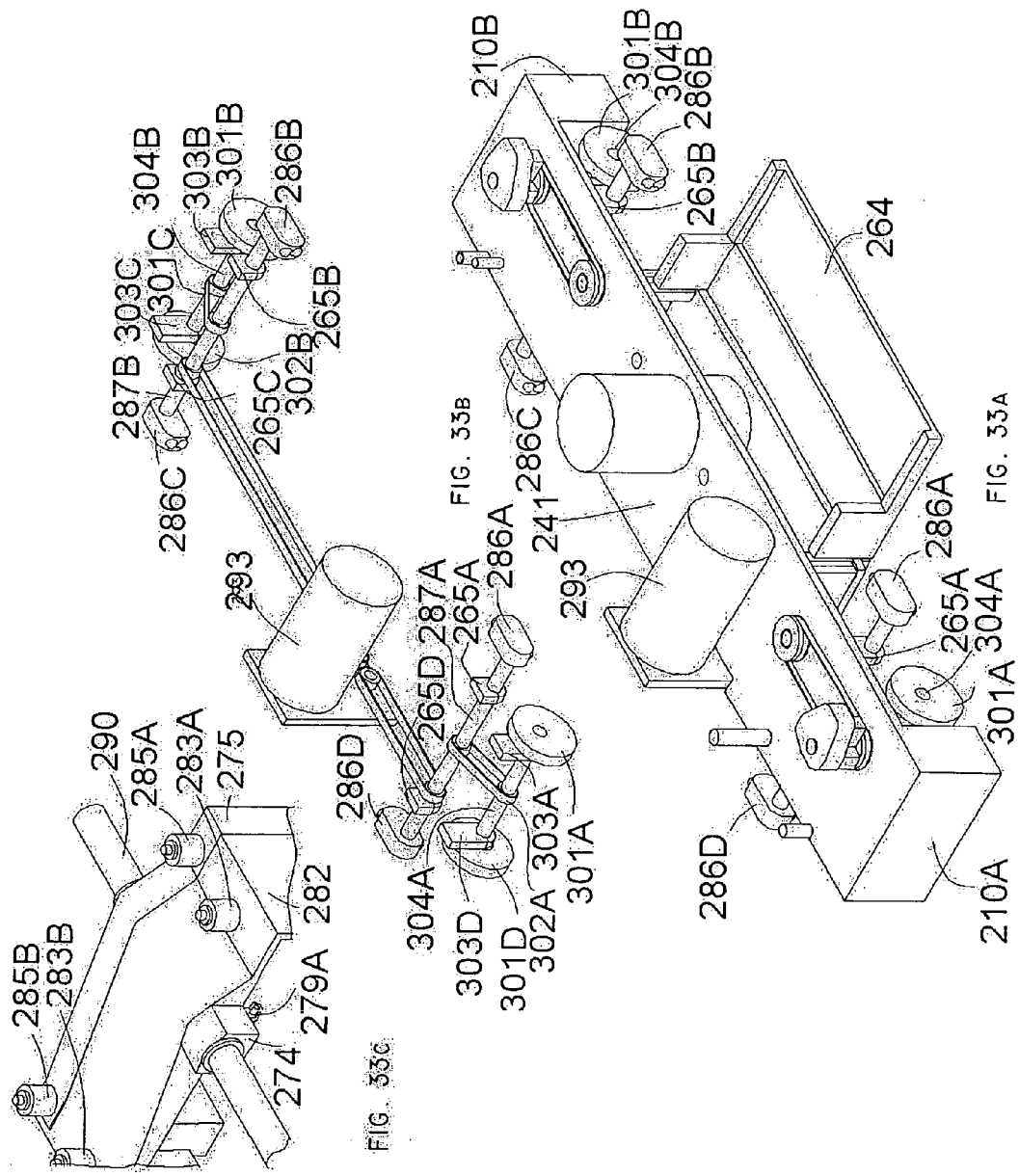

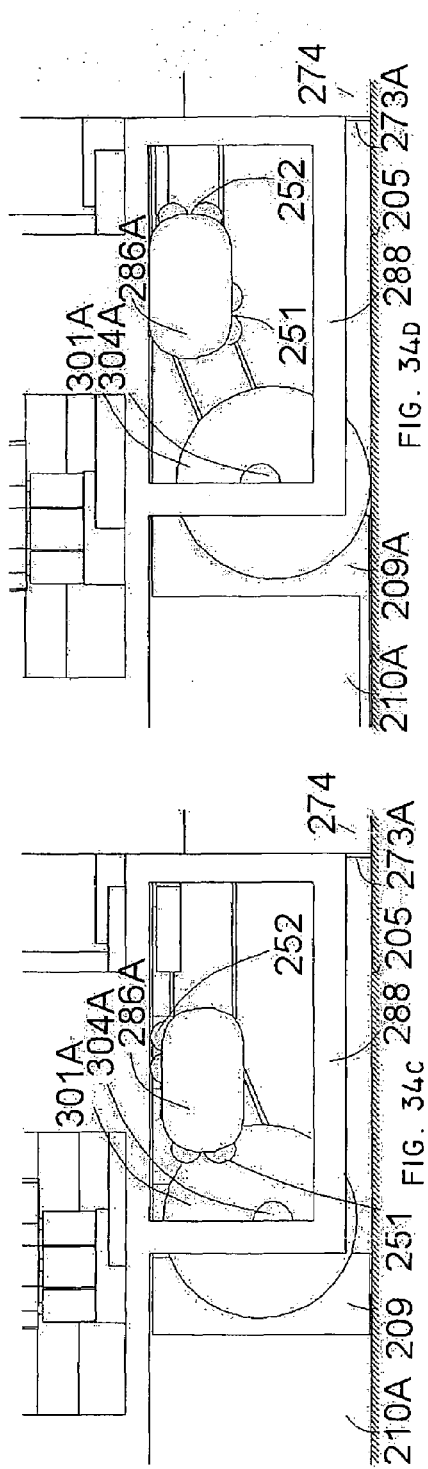
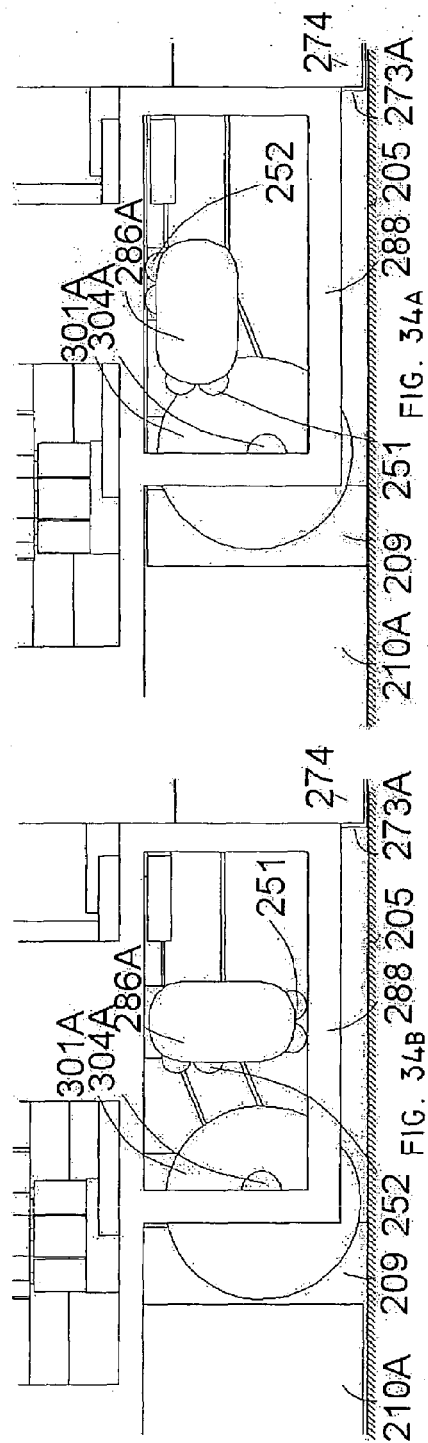

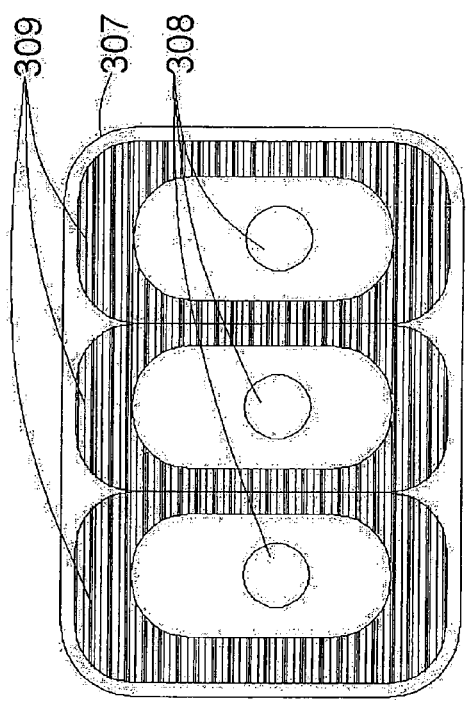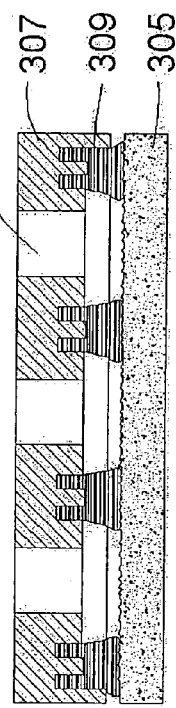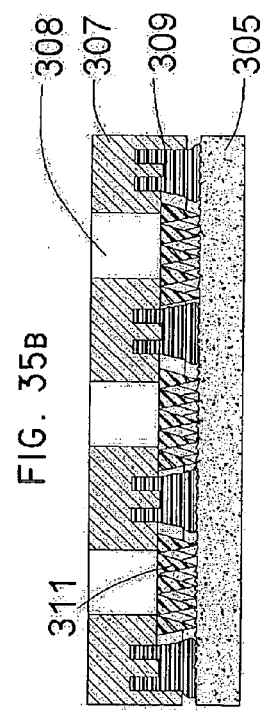
FIG. 35A
FIG. 35B
FIG. 35C

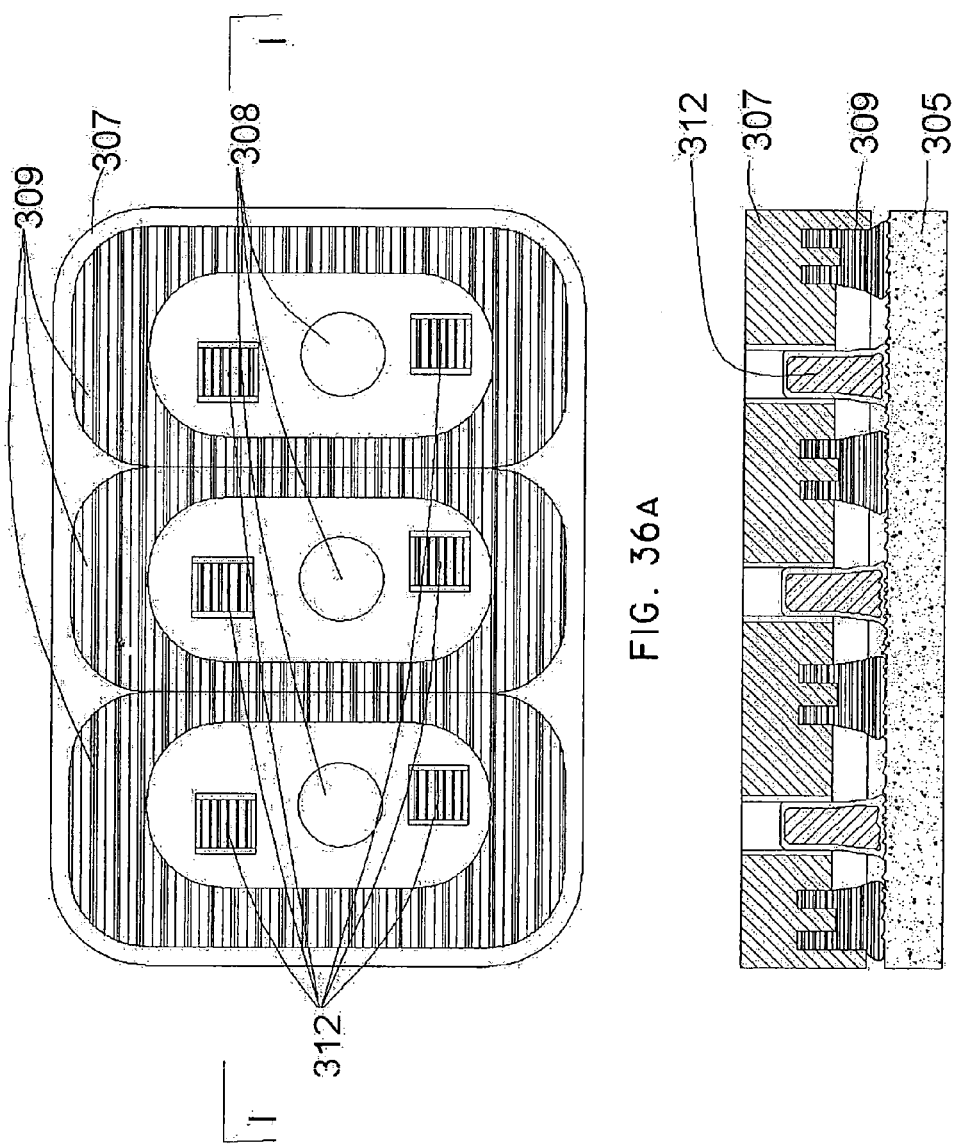

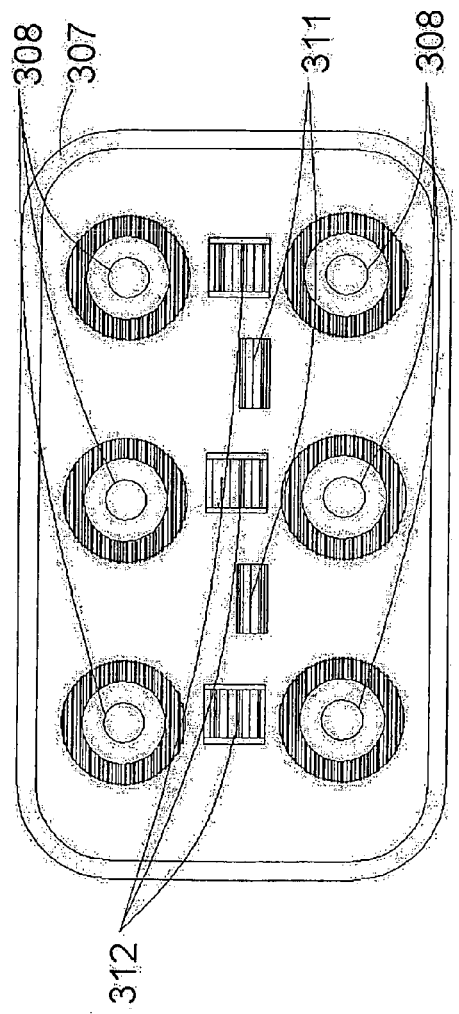
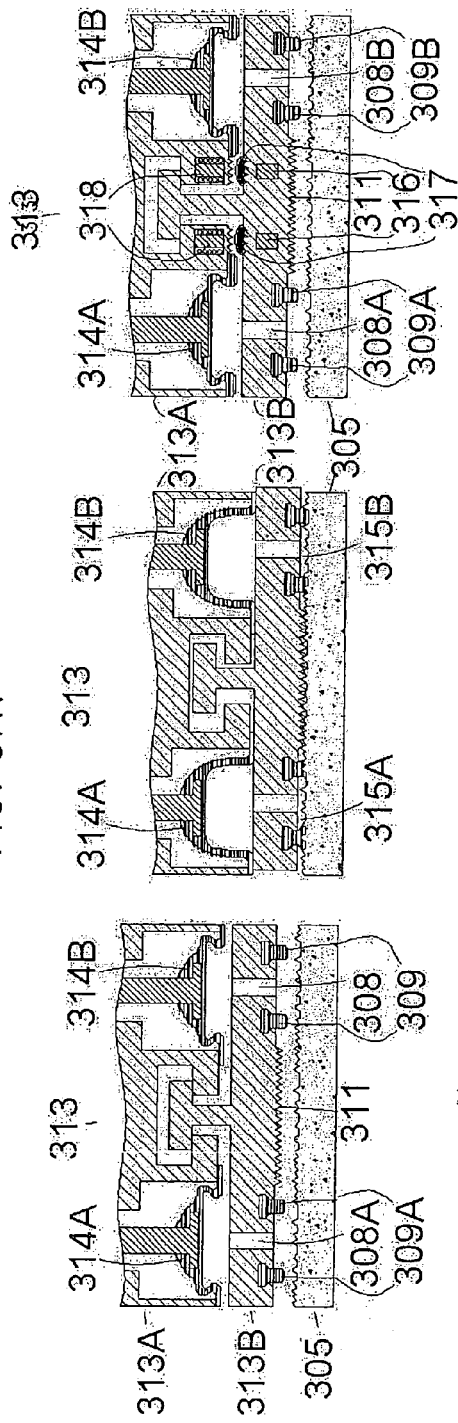
FIG. 37A
FIG. 37B
FIG. 37C
FIG. 37D

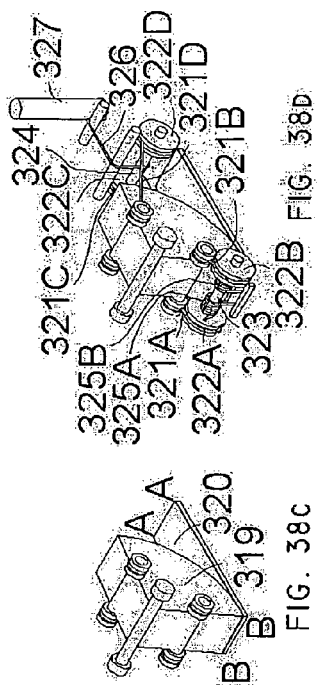
FIG. 38D
FIG. 38C
FIG. 38B
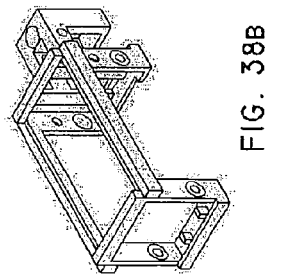
FIG. 38F
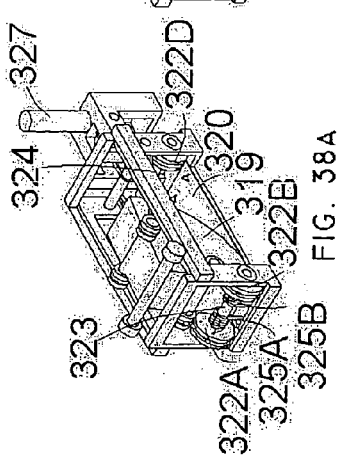
FIG. 38A
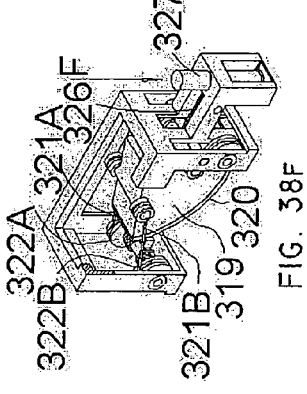
FIG. 38E
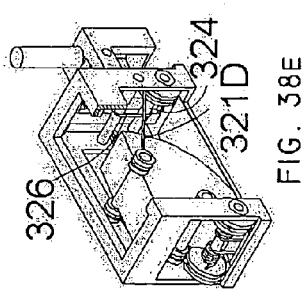
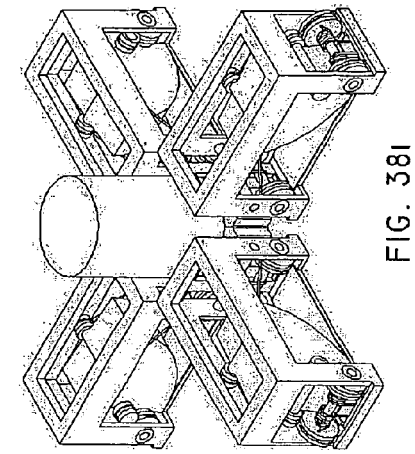
FIG. 38I
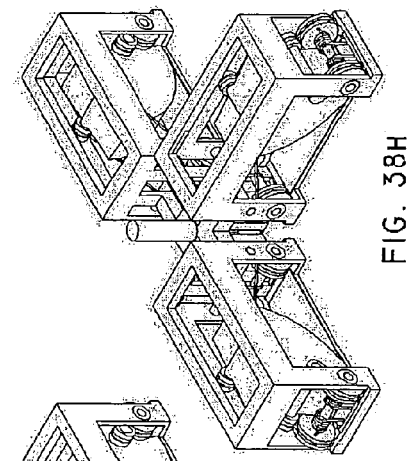
FIG. 38H
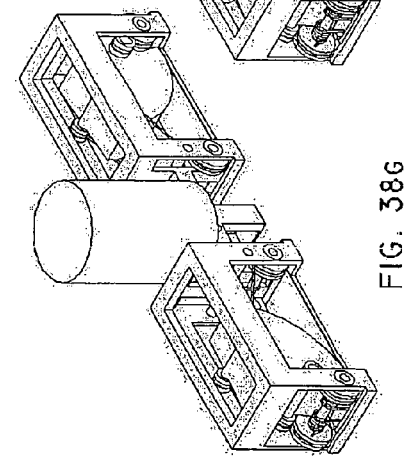
FIG. 38G

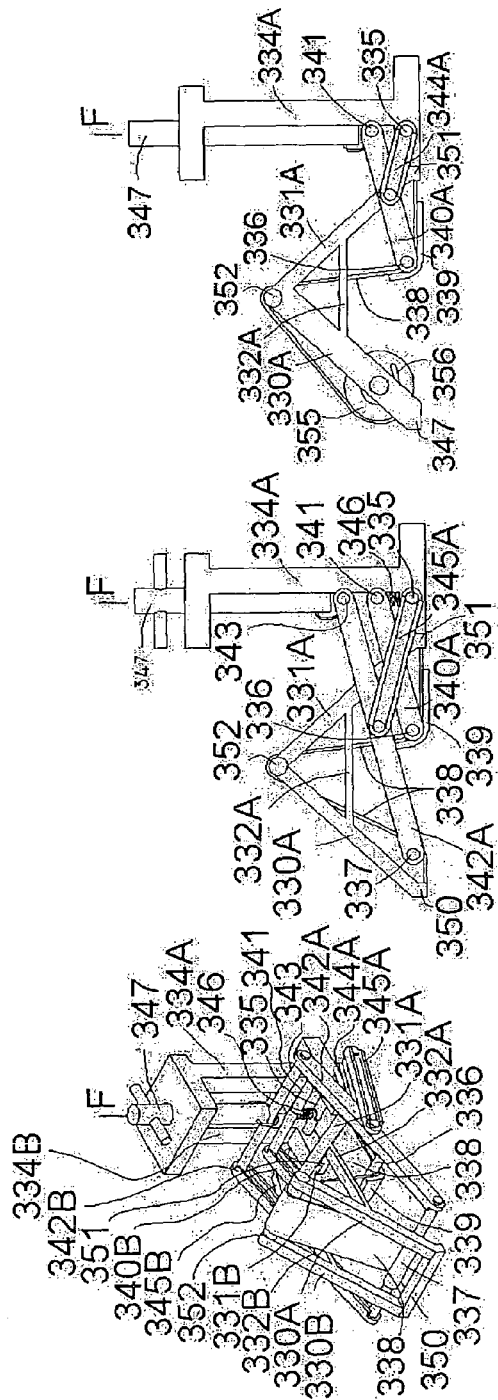
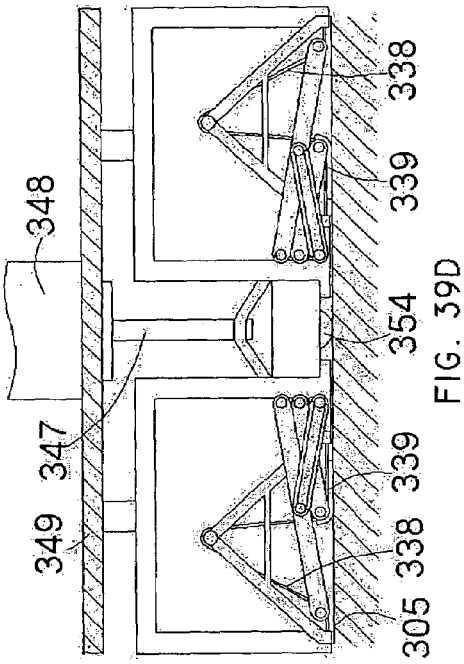
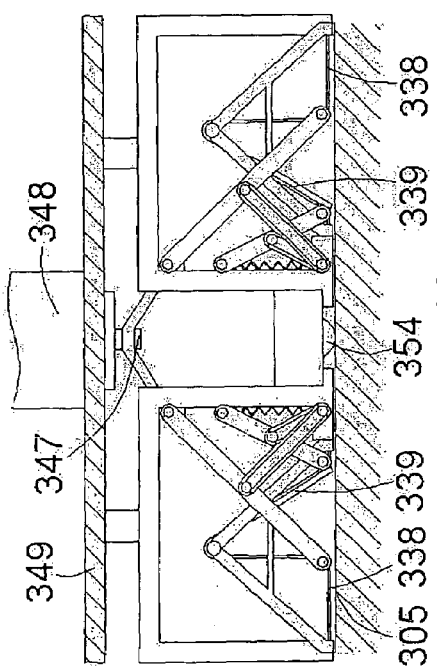
FIG. 39A
FIG. 39B
FIG. 39E
FIG. 39C
FIG. 39D

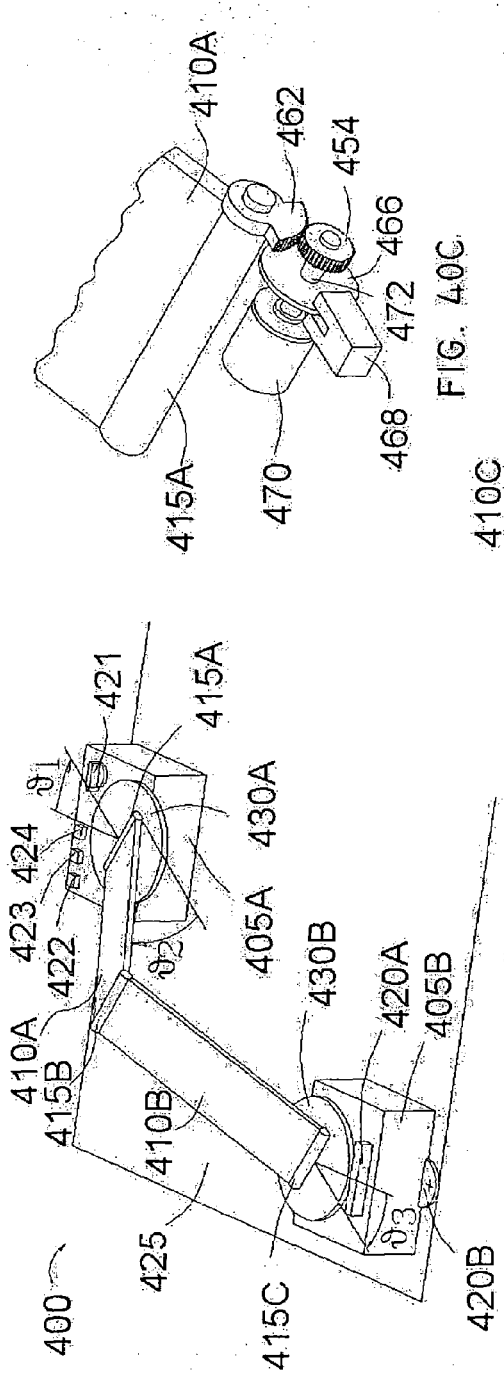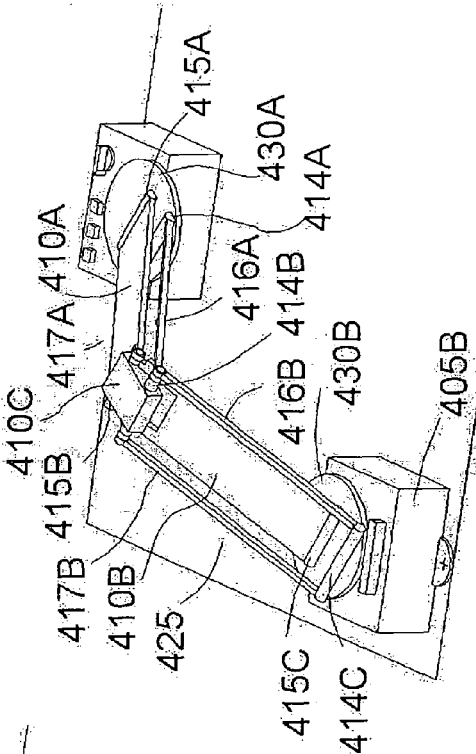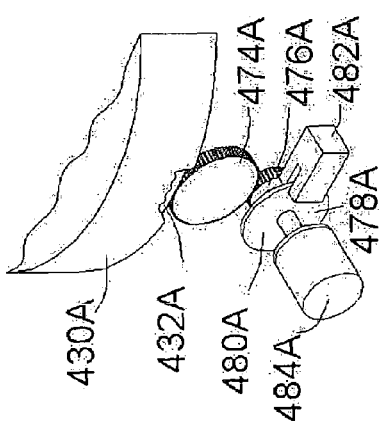
FIG. 40A FIG. 40B FIG. 40C FIG. 40D

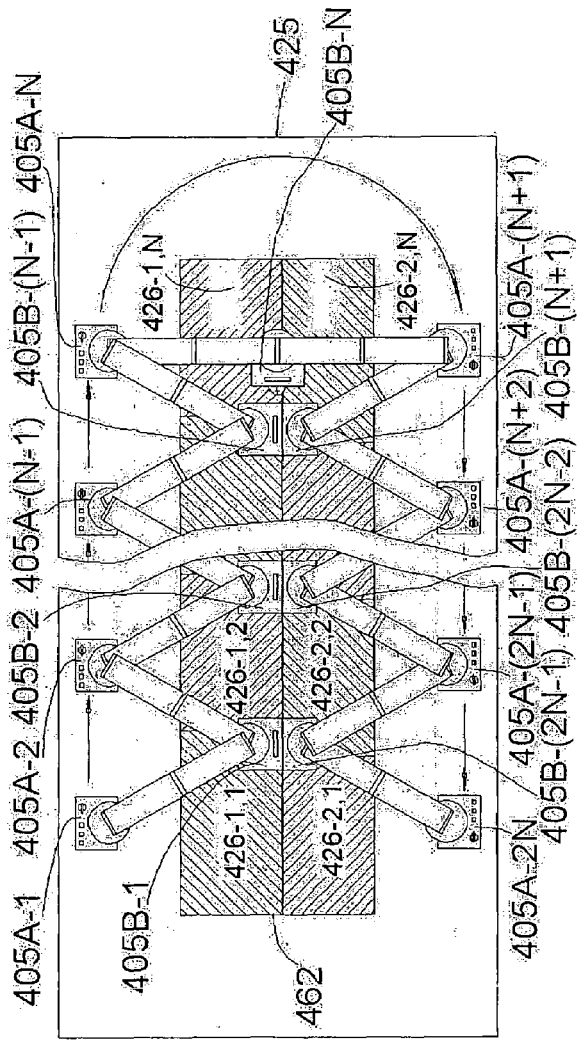
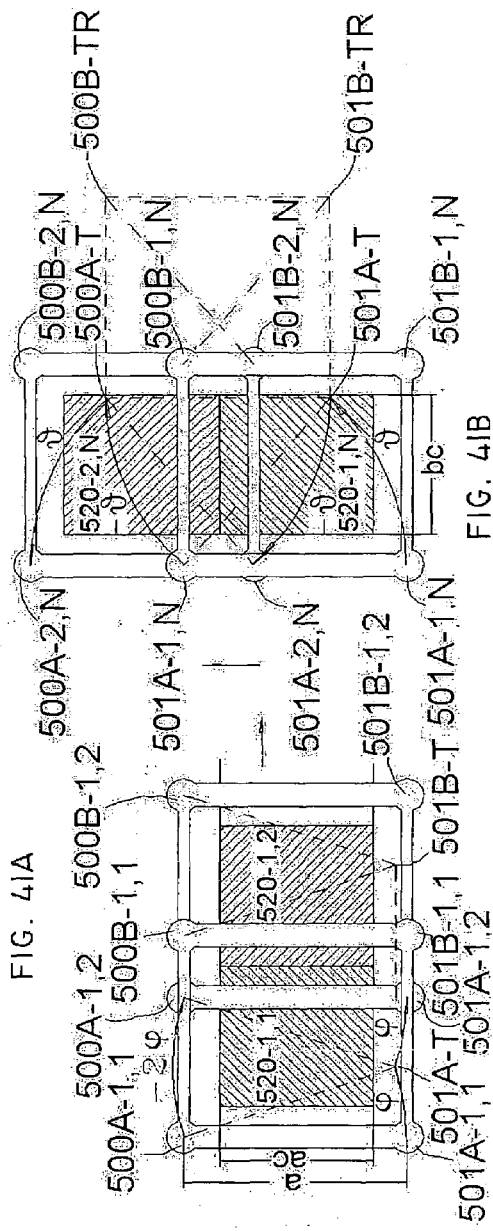
FIG. 41A
FIG. 41B

IMAGE FORMING DEVICE AND METHOD USING INTERMITTENT MOTION ACROSS A WORK SURFACE

REFERENCE TO RELATED APPLICATIONS

This application is a continuation of application Ser. No. 11/246,244, filed Oct. 11, 2004, now abandoned, which claims the benefit of provisional patent application 60/617,972, filed Oct. 12, 2004 by the present inventors.

FIELD OF INVENTION

The present invention relates to image forming methods, systems and devices like printers, scanners, engravers, marking devices and alike.

BACKGROUND OF THE INVENTION

When an area of an image to be treated is larger than the image forming device, or the image medium cannot be loaded or inserted into the device, the device must be moved relative to the medium.

Hereinafter the term "image forming device" includes a variety of scanners, different surface mapping devices, surface inspection devices, printers (including those using inkjet, thermal and laser printing), plotters, marking and engraving devices, image-wise material deposition or removal devices, which are intended to read an image from, or to apply an image to, an image medium, such as paper, transparencies, fabrics, plastics, glass, metals and the like.

The term "image forming means" is used hereinafter to include any of an operating means for: forming an image-wise surface marking or altering, or printing image on the medium, or making any image-wise material deposition on the surface or removal from the surface, or scanning surface image, or mapping surface structure, or measuring any local properties of the surface material and saving of an electronic image in the computer memory, etc, or combination thereof. Here "surface altering" denotes the chemical, physical or positional particle alteration of a medium at its surface.

Inkjet printing mechanisms print images using inkjet cartridges, often called "pens," to shoot drops of ink onto a page or surface of print media. In multi-color cartridges, several print heads and reservoirs are combined into a single unit, with each reservoir/print head combination being used for a given color. Each pen has a print head formed with very small nozzles through which the ink drops are fired.

Thermal printers typically interpose a donor sheet that includes donor material and a backing between a thermal print head and the printing surface. The thermal print head includes an array of thermal printing elements. The thermal print head prints by pressing the donor sheet against the printing surface and selectively energizing the thermal printing elements of the array, thereby selectively transferring pixels of donor medium from the donor sheet to the printing sheet.

To print an image, the print head is propelled through a print zone back and forth across a page and, by selectively energizing the printing array elements as the print head moves and the colorant is expelled in a pattern on the print surface to form a desired image. The printing elements (nozzles in inkjet printers and thermal elements in thermal printers) are typically arranged in linear arrays (in inkjet printers usually located side-by-side on the print head, parallel to one another), and perpendicular to the scanning direction of the print head, with the length of the arrays defining a print swath or band. Thus, if all the elements of one array were continually energized as the print head made one complete traverse through the print zone, a band or swath of pixels would appear on the sheet. The width of this band is known as the "swath height" of the pen, the maximum pattern of ink that can be laid down in a single pass. The print media, such as a sheet of paper, is moved through the print zone typically one swath height at a time, although some print schemes move the media incrementally by, for instance, halves or quarters of a swath height for each print head pass to enhance the appearance of the final image.

However a printing mechanism is configured, drop placement on the media must be coordinated with the incremental advance of the media through the print zone for sharp, vivid images and text, which are free of print defects, such as pixel banding, improper spacing, and printed line overlapping. Many types of printing mechanisms use a series of conventional paper drive rollers or tires to frictionally engage the print media and incrementally advance the media through the print zone, moving either a full or fractional swath width.

Other image forming devices include scanners which have a scan head with image receptors that "read" an image previously printed on media, and convert this image into a memory file, which may then be computer edited or sent to a selected destination. The image receptors in a scan head may be a series of discrete elements arranged in a linear array. These image forming scanning mechanisms may use the same media advance system as described above for an inkjet printing mechanism, and indeed, in many multi-function devices the same media advance system is used for both printing and scanning.

Using a more general concept, both inkjet print heads and scan heads may be considered "image forming heads," with print heads forming an image by printing that image on media or/and scan heads forming an image by "reading" an image that already exists on media. This generic image forming head may have one or more arrays of discrete interaction elements arranged, for instance, in a linear array, to selectively interact with media in an interaction zone of the image forming device. For an inkjet printing mechanism, the interaction elements are ink-ejecting nozzles and the interaction zone is a print zone. For a scanning mechanism, the interaction elements are image receptors and the interaction zone is a read zone.

Regardless of the technology utilized, a conventional image forming device is typically fed with a medium. The approach to feeding the medium dictates the minimum size of the image forming device. For example, in order to print onto a paper of letter size (e.g. 21.59 cm×27.94 cm), a stand-alone printer must be at least 21.59 cm wide to accommodate the letter-size paper. Since the medium must be fed into an image forming device, an image cannot be transferred to or received from a rigid substrate or other medium that cannot be fed into the stand-alone image forming device. Technologies for image forming on the rigid substrate are available.

For large surfaces, it is preferable to use an apparatus moving across the surface. An image forming device moving across the work surface can be made much smaller than the conventional image forming device and can operate on a greater variety of media.

The disclosures of all the referenced patents hereinafter are hereby incorporated herein by reference in their entirety as if set forth fully herein.

One type of a moving image forming device is a self-propelled precision device incrementally moving in predetermined fashion, for example, as described in U.S. Pat. No. 6,695,445 to Hagstrom, et al. This patent relates to a printer for printing large area sheets of print media or substrates, such as posters, where the print media remains on a flat support and a standard print head is driven across the surface as it prints. The print media or substrate remains stationary and can be supported on a suitable table. Once the printer frame, print head and print medium are oriented at a reference or home position, the frame moves across the print medium substrate uniformly to provide for transverse movement of the printer for printing the images (such as a poster or graphic print) under a printer control. The printer frame is incrementally driven along the entire length of the sheet to complete the print job. High friction material rollers are utilized for driving against the printing surface. The program control for the printing program can be a program in a personal computer or other computer operating in a known manner. The printer frame can be supported on or guided by rails and the drive members can engage the rails for driving.

This invention has some serious drawbacks. The frame engages the printing surface by rollers of high friction material. Any vibrations or other disturbances may produce small alterations in the frame position relative to the printing surface during printing process and prevent high accuracy printing. The sources of the vibrations and other disturbances may be exterior or interior (e.g. motors for driving the frame across the printing surface or the rather heavy print heads reciprocating over the frame shaft).

Also, there are no provisions for translational displacement of the frame from line to line. A small difference in roller friction in different locations of the long frame may alter the frame direction. Lateral guide rails may be used to help prevent drift of the beginning of the print line, but it cannot help small changing shaft directions, which is rather critical to proper printing. Presuming a printing resolution 200 DPI and poster width 24 inches, a change of 0.02 grads in shaft direction as the frame is moving to the next line, will lead to "white" gap between lines, which can be discerned by the eye. Such a printer has no service station for treating nozzles of inkjet print heads in the course of printing. The provision of the service station is essential, especially for printing a big size picture. Adding a service station to such a construction can be difficult, as it has to be on the moving frame and its operation will provide another strong disturbance source in the frame position stability, as the frame is not fastened to the work surface.

U.S. Pat. No. 6,805,504 to Nisnevich proposes a device for incrementally moving across a work surface and capable of carrying operating tools.

The term "operating tools" denotes any image forming means as well as cutting means, pointing means, digitizing means, means treating the surface at specific points, etc., and shall be used herein to denote same. The device is based on a motion engine using two cams to advance the device and an additional two eccentric cams to change the parts of the device that bear against the work surface and using telescopic legs supporting the device. The device comprises two parts reciprocating one relative to the other. One part carries the image forming device. Each part is advanced in turn by the pair of the cams. The advancing part is suspended over the bearing surface supported by another part resting on the surface.

SUMMARY OF THE INVENTION

The present invention relates to a device that can move across a surface with a high degree of accuracy to execute operations, including forming an image on a work surface or producing an image that exists on the work surface; and aspects of a method for accomplishing same. Novel self-propelled manually moved, or combination devices together with operation methods are presented.

The device of the present invention comprises an image forming device operating on a work surface and forming an image portion by portion in the course of incremental displacements of said device relative to said work surface comprising:

at least two parts such that a first part is operatively positioned on said surface and adapted to either be in holding contact immobilized relative to said surface or to be in non-holding contact with said work surface and a second part is movable relative to said first part and is adapted to be in holding contact immobilized relative to said surface or to be in non-holding contact with said work surface, the parts being rigid structures or becoming rigid structures when in holding contact with the work surface;

contact means for selectively bringing said first part and said second part to the holding contact with said work surface to become a rigid structure immobilized relative to said surface and for selectively bringing said first part or said second part to the non-holding contact with said work surface;

means for determining the position and orientation of said parts relative to each other when said parts are immobilized relative to said work surface at a stoppage between said displacements;

an image forming means for creating an image, portion by portion, each portion being formed while at least one of said parts is motionless relative to said work surface at the stoppages between said displacements.

Hereinafter the term "rigid structure" means a rigid body or a structure in which position and orientation of any of the structure's parts in the structure's local coordinate system does not change beyond the required tolerance under the operating conditions of the device.

According to one aspect, the method of the present invention comprises method of moving an operating tool for treatment of a work surface using a device, said device comprising first and second parts which are clamped to each other and movable relative to each other by at least one interposed spacer, and at least one of said parts is adapted to carry said operating tool, comprising the steps of:

bringing said first part into holding contact with said work surface;

bringing said second part into non-holding contact with said work surface;

displacing said second part relative to said first part whereby change in the position and orientation of said second part relative to said first part is determined by displacement of said at least one interposed spacer;

bringing said second part into holding contact with said work surface;

bringing said first part into non-holding contact with said work surface;

displacing said first part relative to said second part whereby the change in the position and orientation of said first part relative to said second part is determined by displacement of said at least one interposed spacer.

According to another aspect, the method of the present invention comprises method of intermittently moving at least two parts and determining their position and orientation in a reference coordinate system, the method comprising:

(a) starting at an initial state where at least one of said parts is motionless and its initial position and orientation in said reference coordinate system is determined;

(b) moving any of said at least two parts except for said at least one motionless part; and (c) stopping at least one of the moving parts and determining its position and orientation relative to one of said at least one motionless part, thereby determining the position and orientation of said stopped part in said reference coordinate system, said stopped part becomes said motionless part.

Using this invention, one can produce art objects having image created by a variety of arts including drawing, painting, photography, computer imagery, or a combination of these arts on the surfaces of a wide range of naturally occurring and man made materials including plaster, concrete, drywall, marble, stone, cork, glass, fabric, leather, plastic, metal, wood, paper, and/or paper products, ceramics and painted surfaces. This invention makes it possible to apply a laser for scribing graphics on materials including fabrics, leathers, vinyl, rubber, wood, metals, plastics, ceramics, glass and other materials on the surfaces of finished products.

Furthermore, artists can utilize computers so that original photographs and works of art could be duplicated and transferred to a new substrate material, and be modified in appearance, in creating unique art objects.

Proofing is the procedure used by the printing industry for creating representative images that replicate the appearance of printed images without the cost and time required to set up a high-volume printing press to print an example of the images intended. The proofs generated are judged for composition, screening, resolution, color, editing, and other visual content. It is possible to display the resulting image on a CRT display, but it is generally necessary to produce a "hard copy" (i.e. an image actually formed on a sheet of paper or other material) before it can be fully assessed for approval of the final printing operation. Therefore, the use of some form of output device or printer which can produce a hard copy of the image for actual evaluation is required. Using the present invention, an artist or a photo shop operator can quickly and inexpensively create a series of proofs, using different colors or artistic treatments, and allow a customer to preview the final art object prior to the step of permanently affixed to the substrate material.

The desire for electronic paper-like print means has recently prompted development of electronic paper technology, utilizing various techniques. The present invention makes it possible to work with an image forming device of the significantly smaller size than the printed rewritable sheet. The printing device may be built in or compatible to a palm computer or a cellular phone. A paper or paper-like sheet that can be electronically printed, erased and re-used is an irreplaceable addition to the cellular phone with Internet access. A variety of other products can be made using electromagnetically responsive particles. Such products include color-changing fabrics and decorative coverings (e.g., wallpaper, carpets, rugs, tapestries and the like). The present invention makes it possible to change the patterns of the end products of this kind, for example, the pattern of a dress, an interior or exterior decor, art reproductions on the walls, etc.

The method of the present invention can be divided into two aspects for moving an image forming device across the surface and design related to them.

The first aspect involves a new method for incremental translational displacements of the above-described device by predetermined increments, which is simpler than existing methods and allows a higher precision of translational displacement. The predetermined increment can be easily changed depending on operating means requirements.

The second aspect of the present method includes a stepwise motion of a device that tracks the change of its position and orientation at any step with high accuracy. The present image forming device produces an image portion by portion, each portion being produced while the device is motionless at stoppages between displacements.

In above-mentioned aspects a device comprises at least two components, or parts, movable one relative to another, in particular: a frame and shuttle; bases and auxiliary bases; a carriage and a frame with a shaft; a control unit and a unit carrying operating means; etc., are used as such parts in examples given below. At least one part is immobilized on the work surface while other parts change their position. In particular embodiments, these parts will be referred to as a base part and an auxiliary part, respectively.

In general terms, displacement of the base part is executed in two main steps. In the first aspect of the method, the first step is a predetermined displacement of the auxiliary part from the base part (i.e. displacement with a predetermined position and orientation change of the auxiliary part relative to the base part while the base part is immobilized) using displacements of the spacers clamped between the parts, and the second step is the displacement of the base part using different displacements of the spacers while the auxiliary part is immobilized at its new location.

For the second aspect of the method the first step is the displacement of the auxiliary part, its immobilization at a new location and measuring and determining its position and orientation relative to the base part while the both parts are immobilized, and the second step is the displacement of the base part to the new location measuring and determining its position and orientation relative to the auxiliary part. Using these two sets of measurements, the change of the position and orientation of the base part relative to its previous position and orientation is determined. This allows determining the position and orientation of the base part relative to its initial position on the surface. The part's immobilization and their release by various mechanisms to allow for free movement is accomplished by contact means.

The first and the second aspects of the present method may be used in combination in one device.

The contact means play a vital role in the accuracy achieved as they ensure holding contact between a part of the device and the part's bearing surface in the course of operation and for executing a displacement step. Several presented contact means are novel and make possible operations on different surfaces without loss in accuracy.

The present invention also provides a movement appliance for incrementally moving operating tools. The movement appliance can deliver tools or articles to specific locations on the surface with high accuracy.

Present invention permits producing less expensive means for creating large sized printed matters. The method and device may be used to create novel technology for architectural decorating and fast modeling devices.

The present invention allows manufacturing a high quality pocket-sized image forming device that may be used in the absence of mechanical constraints for A4, A3 size surface treatment. Such an image forming device may be used with a palm computer, mobile phones, notebook computers and as a printing appliance for digital cameras.

For large image treatment it is preferable to use an image forming device that combines printing, or engraving, or another medium altering operating means with a scanning operating means that are in a known spatial relationship. Scanning operating means may be used for evaluation of accumulated error and for correction of the position and orientation of the device using special marks with known position and orientation on the work surface or using part of the image created earlier on the work surface.

Suggested design methods of moving image forming parts differ one from another in their manner of coverage of an image area and in ways and means to achieve a desired precision in image forming. The following description of exemplary embodiments will be regarded as merely illustrative of the present invention. A commonality to these embodiments is the determination with appropriate accuracy of the position and orientation of the device and its operating means with respect to their initial position during the device's travel. Most of the embodiments comprise means to keep the same orientation of linear operating element arrays that execute image forming actions. By operating elements we mean nozzles of inkjet print heads, thermo elements of thermo printers, fiber optic ends or laser diodes of laser marking, engraving heads, and the like.

DETAILED DESCRIPTION OF THE DRAWINGS

The invention may be more clearly understood upon reading of the following detailed description of non-limiting exemplary embodiments thereof, with reference to the following drawings, in which:

FIGS. 2A-2C are schematic drawings illustrating phases of the movement of the device in the main direction (top views).

FIGS. 3A-3C are schematic drawings illustrating phases of backward movement of the device.

FIG. 11 shows the contact means with the use of a magnetic field (sectional view).

FIG. 12 shows the contact means with use of an elastic material (sectional view).

FIG. 13 shows the contact means with use of a pressure sensitive adhesive (sectional view).

Figure 17A:
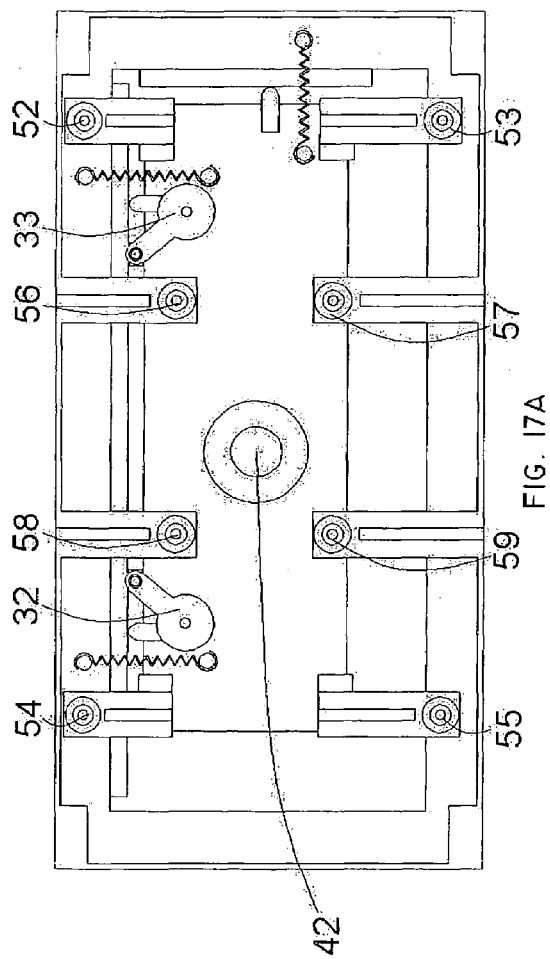

FIG. 17A (Top view)-17B (Bottom view) show an embodiment of the device with a rotary solenoid as an actuator for the spacer holders rotation.

FIGS. 18A-18B show a pulse sequence timing diagram to produce intermittent movement of the device with supports provided by the pressure-sensitive adhesives.

FIGS. 19A-19B show a pulse sequence timing diagram to produce intermittent movement of the device with supports provided by the suction cups of type shown in FIG. 15 (A, B, C) and in FIG. 16 (A, B).

Figure 20A:
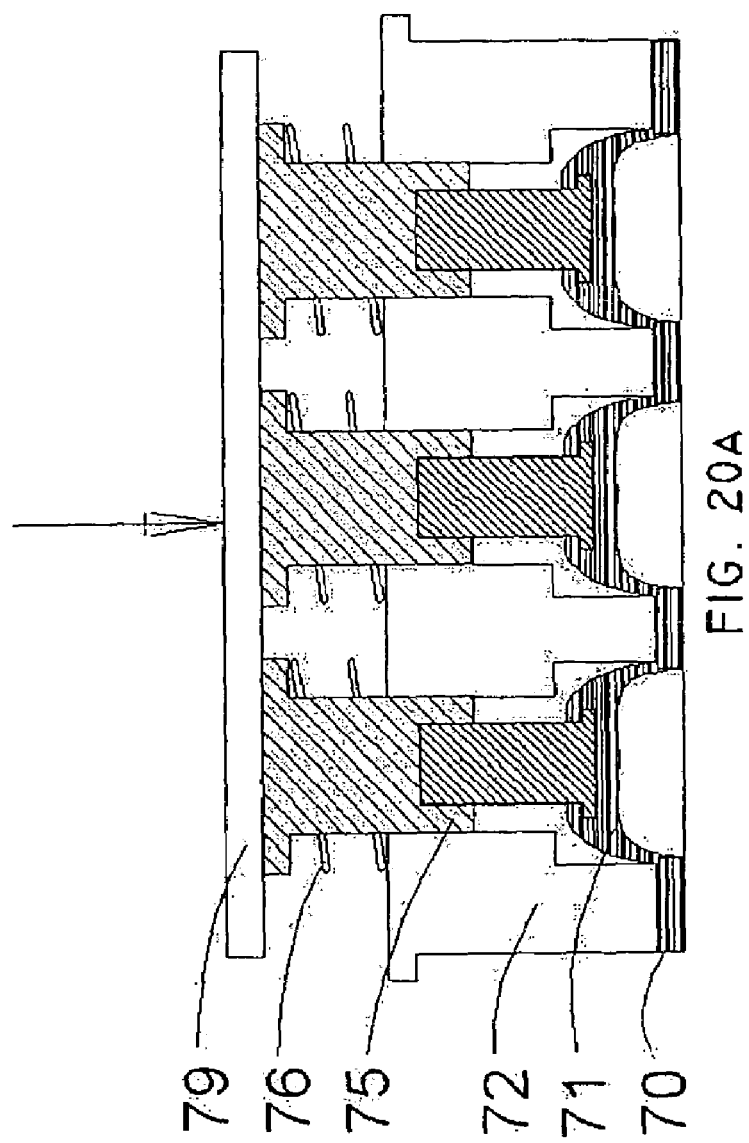

FIGS. 20A (sectional view) and 20B-20C (isometric view) show modifications of a suction holder capable of acting as a stand alone engagement means.

Figure 21:
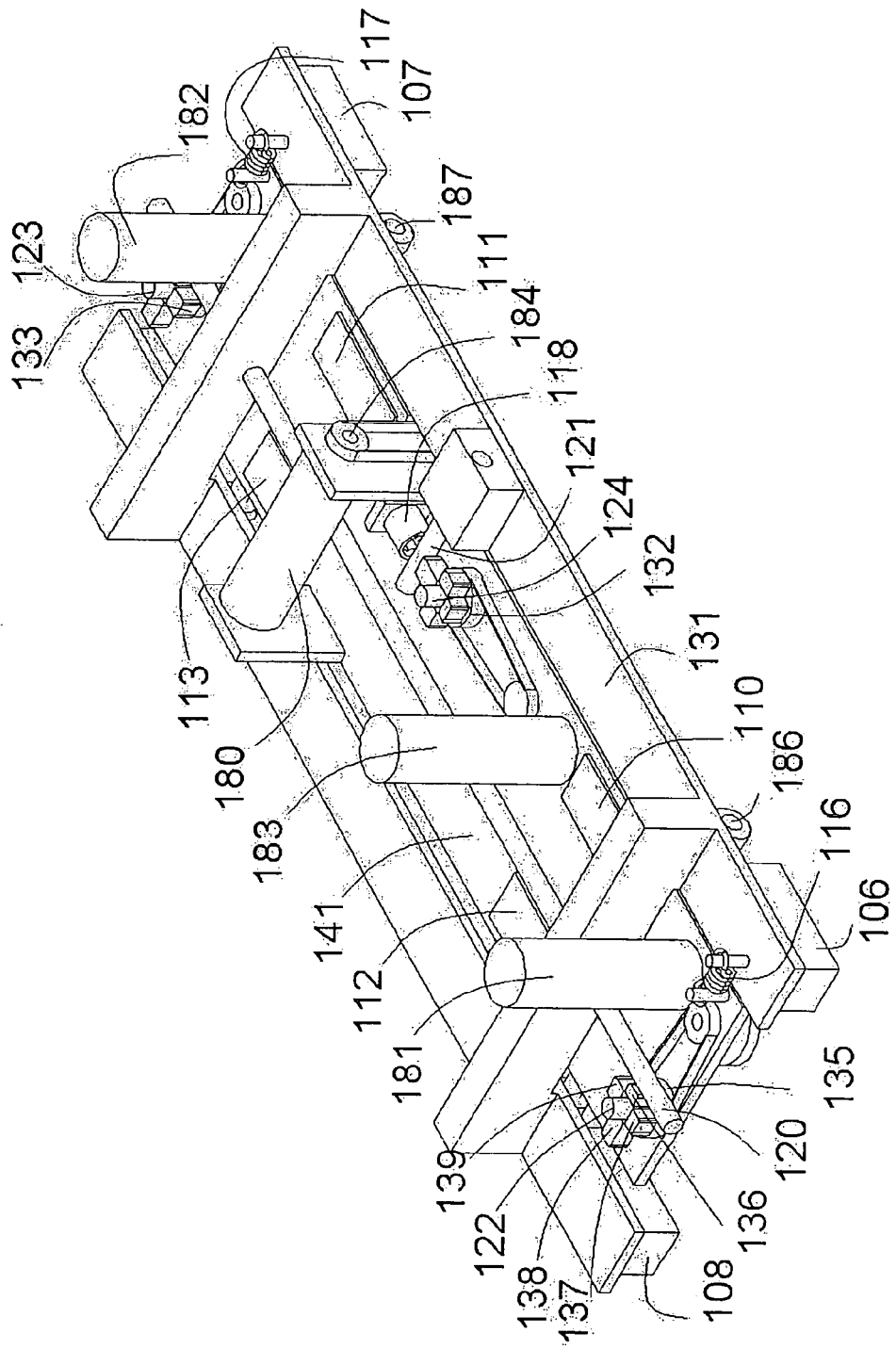

FIG. 21 is an isometric view of a second embodiment of the device for accurate incremental displacements.

FIGS. 22A-22D show top view of spacers, orientation of which determines relative position of a frame and a shuttle in the second embodiment of the device.

Figure 23A:
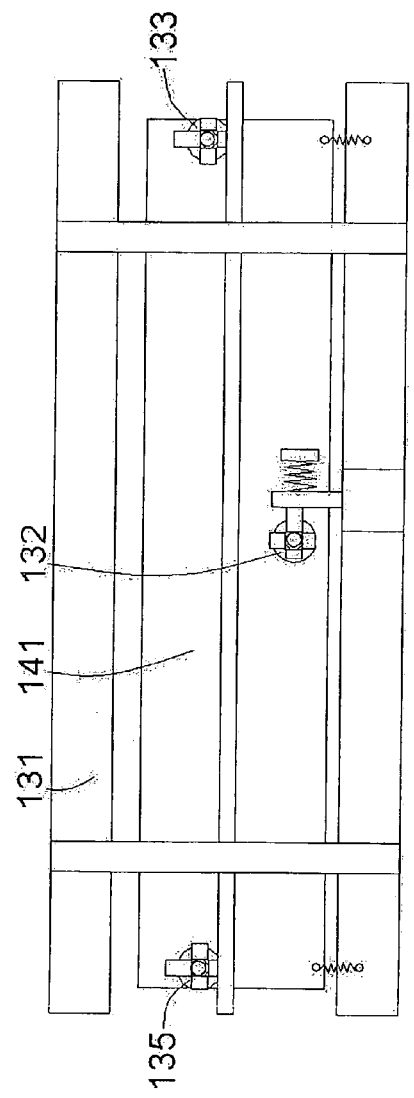
Figure 23B:
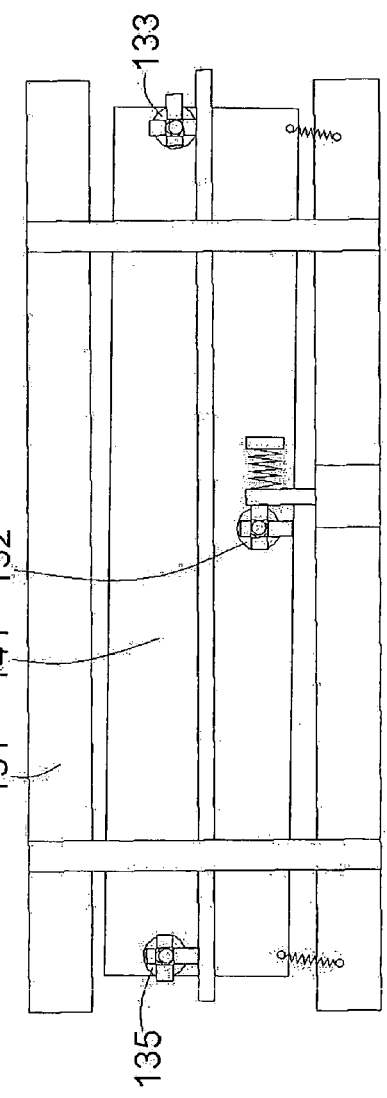

FIGS. 23A-23B schematically show the frame's position and orientation change by angular displacement (changing orientation) of the spacers.

FIGS. 24A-24B schematically show a modification of the second embodiment of the device, which can serve as a self-propelled platform moving step-wise with predetermined steps in a main direction and moving step-wise (with larger steps) with position pick-up during movement in a longitudinal (transversal) direction.

Figure 25:
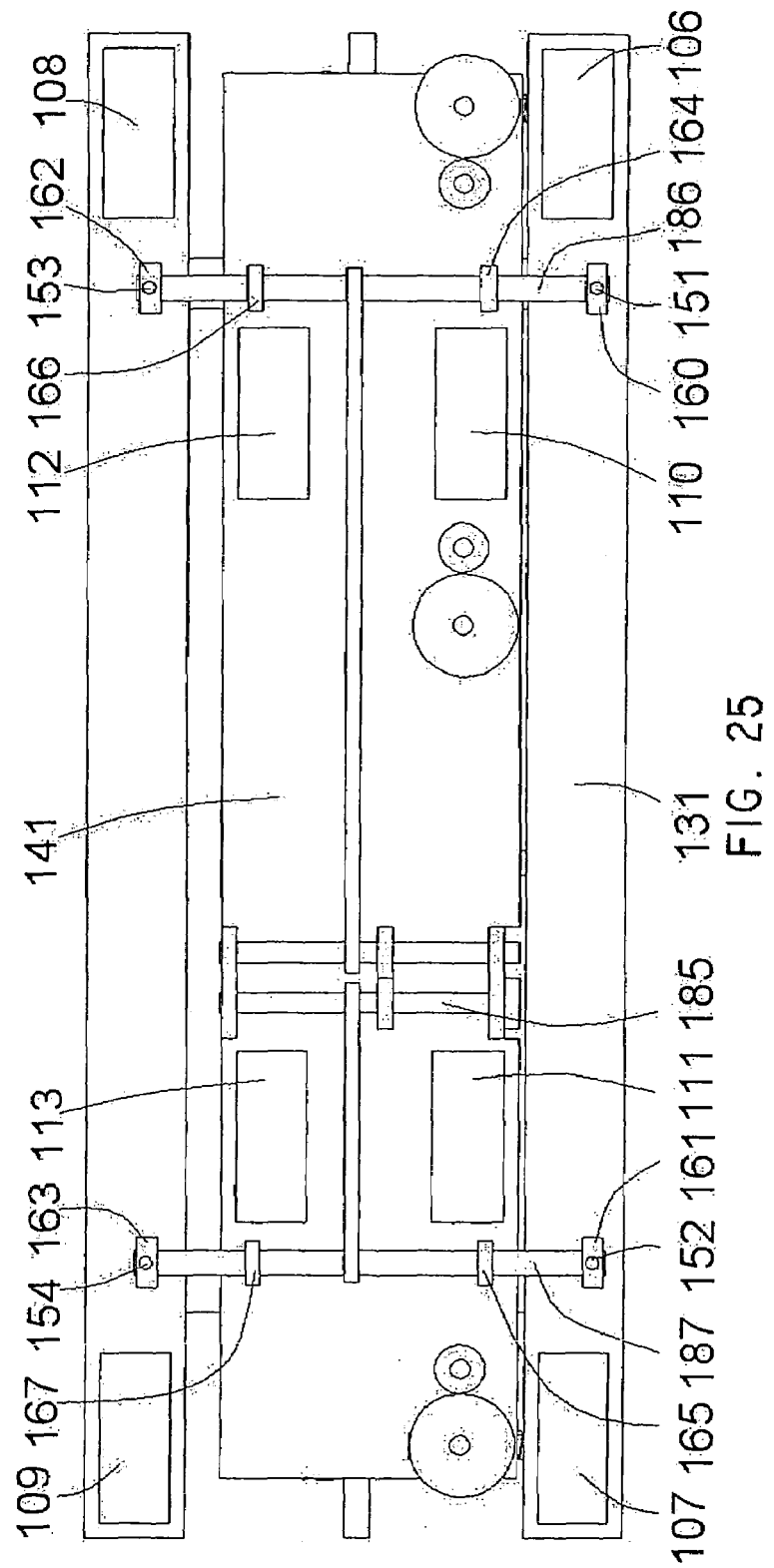

FIG. 25 shows a bottom view of the second embodiment of the device.

FIGS. 25A-25C show front views of three stable positions of the mechanism for changing relative vertical position of the frame, the shuttle and the work surface, where: in the first position (FIG. 25A) the frame supports are engaging the work surface and the shuttle supported by bearing balls is free to move across the work surface; in the next stable state position (FIG. 25B) the supports of the frame and of the shuttle engage the work surface; in the third position (FIG. 25C) the shuttle supports engage the work surface, the frame is suspended over the work surface, and the shuttle supports the frame with the ball bearing contact.

FIGS. 26A-26C show a modification of the second embodiment of the device, in which at the first stable position of the shafts the bearing balls are supported by the frame surface, so the shuttle is suspended over the work surface.

Figure 27:
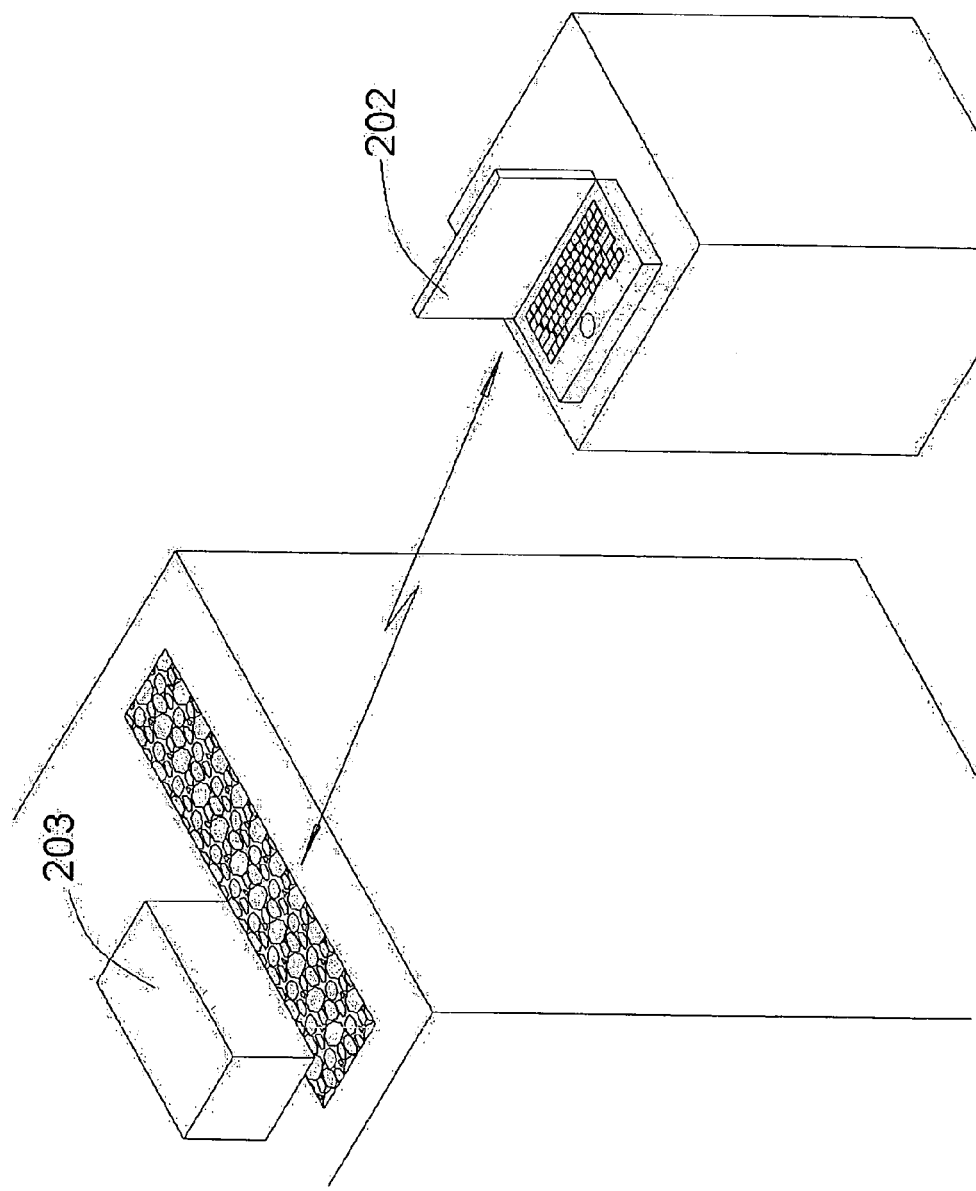

FIG. 27 shows a portable image forming workstation.

FIG. 28 shows a schematic diagram of the carriage position sensing system and resultant sensing signals.

FIG. 29 shows an isometric view of a third embodiment of the device which is an incrementally moving printer.

FIG. 29A shows an isometric view of a y-shuttle of the printer.

FIG. 29B shows an isometric view of a frame of the printer.

FIG. 29C shows an isometric view of an x-shuttle of the printer.

FIG. 29D shows a top view of the frame with the y-shuttle.

Figure 30:
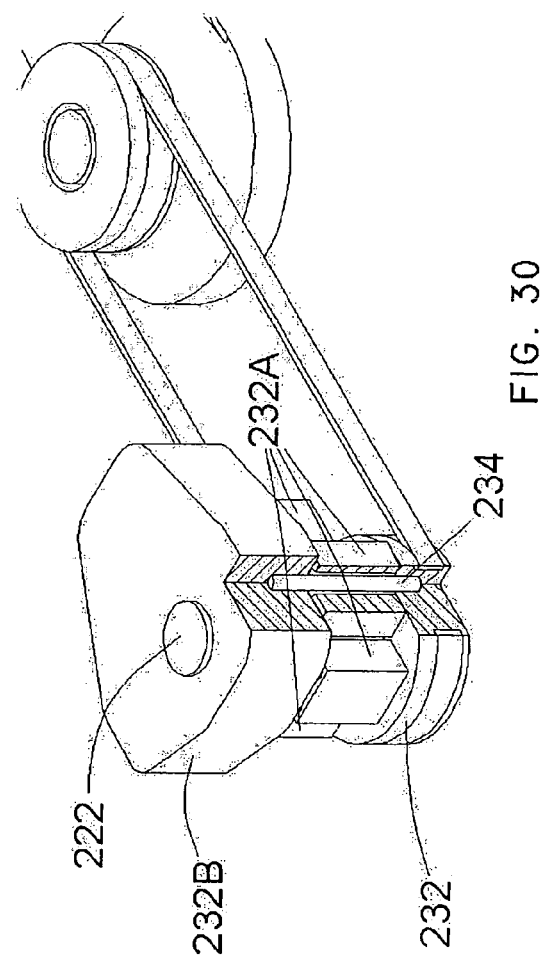

FIG. 30 shows an isometric view of the printer spacer.

Figure 31:
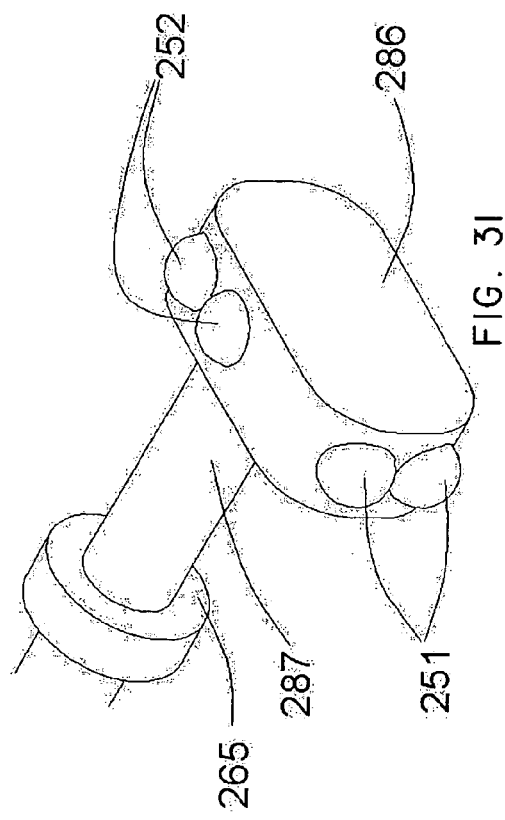

FIG. 31 shows an isometric view of a mechanism for changing relative vertical position of the frame, the shuttle and the work surface with four stable positions.

FIGS. 31A-31D show four stable positions of a bearing housing, each determining a corresponding vertical position of the y-shuttle and the frame, where: in a first position (FIG. 31A) of the bearing housing the y-shuttle supports and the frame supports are resting on the work surface; in a second position (FIG. 31B) the y-shuttle is lifted up and is suspended over the work surface, the y-shuttle is in ball bearing contact with the frame and the frame rests on the work surface; in a third position (FIG. 31C) of the bearing housing the frame is lifted up and is suspended over the work surface, the y-shuttle supports the frame with the ball bearing contact so the frame is free to move in any direction relative to the y-shuttle, and the y-shuttle rests on the work surface; in a fourth position (FIG. 31D) of the bearing house the frame with the x-shuttle is lifted up over the y-shuttle to the height adequate to clean print heads, the frame with the x-shuttle is free to roll in any direction across the y-shuttle and y-shuttle rests on the work surface.

FIGS. 32, 32A, 32B and 32C show a left view of the printer with sectional view of the frame illustrating shifts of the frame with a carriage relative to the y-shuttle with a service station.

FIGS. 33A-33B show a modification of the third embodiment used as the inkjet printer (isometric views of the frame and of the y-shuttle), in which the sliding of the frame with y-shuttle across the work surface is replaced by rolling when the x-shuttle is in hold contact with the work surface.

FIG. 33C shows a partial isometric view of the x-shuttle of the modification of the main version of the inkjet printer, where only one of the complimentary supports is anchored to the driving belt to transfer motion from the motor to the x-shuttle and another has capability of free independent rotation, similar to the carriage in the main version, and is used as part of the contact means for the x-shuttle.

FIGS. 34A-34D show fractional front views of the modification of the main printer version with four stable positions of the bearing housing and with additional wheels implementing the rolling of the frame with y-shuttle across the work surface.

FIG. 35A is a bottom view and FIGS. 35B and 35C are sectional front views of suction means for contact with uneven work surface.

FIG. 36A is a bottom view and FIG. 36B is a sectional view of suction means with pads or bumps capable of controlling a change its state from liquid to solid and vice versa.

FIG. 37A shows a bottom view of the modification of the suction means shown in FIG. 35A, 35B, 36A, 36B.

FIGS. 37B and 37C show sectional views of a first double story holding means, where: FIG. 37B shows said double story holding means in the non-holding state with the bearing surface and FIG. 37C shows said double story holding means in the holding state with the bearing surface.

FIG. 37D shows a sectional view of a second double story holding means in a non-holding state with the bearing surface.

FIGS. 38A-38I present a first alternative of releasable holding means (and number of variations of this means) comprising a flexible strip capable of multiple fastening to and releasing from work surface.

FIGS. 39A-39D present a second alternative of releasable holding means comprising a flexible strip and number of variations of these means.

FIG. 39E shows a side view of a third alternative of releasable holding means comprising a flexible strip.

FIG. 40A shows diagrammatically a fourth embodiment of an image forming device moving step-wise across a working surface and determining its position and orientation relative to the work surface.

FIG. 40B shows an isometric view of a modification of the image forming device shown in FIG. 40A, where operating means holder is supported by ball support and parallelogram structures keeping the holder parallel to the planar work surface.

FIG. 40C is a view of a mechanical apparatus for determining the vertical angular position of the first articulated arm segment of the fourth embodiment of image forming device determining its position and orientation relative to the work surface.

FIG. 40D is a view of a mechanical apparatus for determining horizontal angular position of a first articulated arm segment of the fourth embodiment of image forming device.

FIG. 41A shows an exemplary pre-programmed route for creating a rectangle image of a large size on a work surface by the fourth embodiment of the image forming device.

FIG. 41B shows an exemplary pre-programmed route for creating a rectangle image of a large size on a work surface by a fifth embodiment (FIG. 42) of image forming device determining its position.

Figure 42:
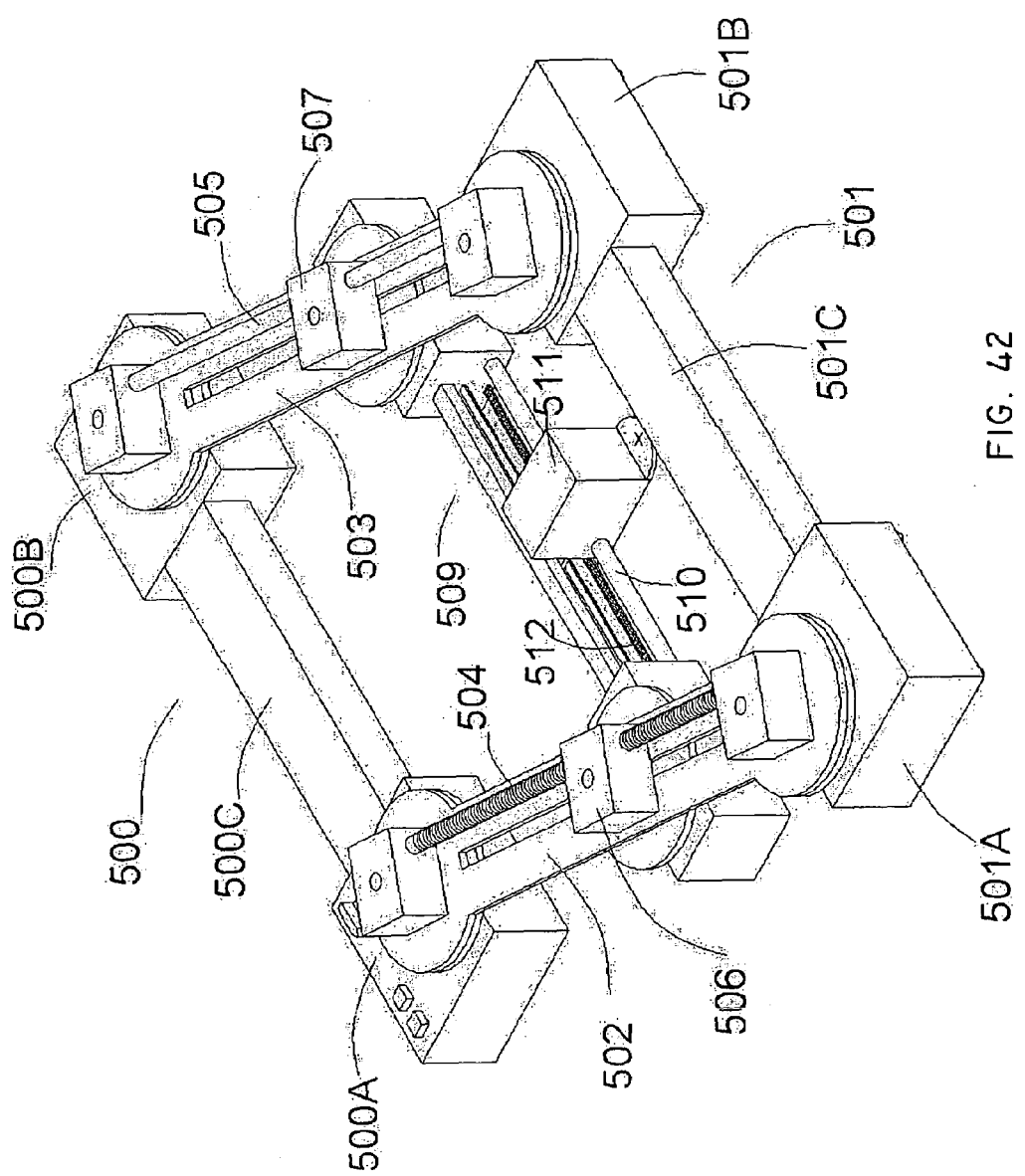

FIG. 42 shows a diagram of the fifth embodiment of image forming device determining its position, which comprises parallelogram structures for keeping certain orientation of the operating means array along the entire image forming process.

Figure 43:
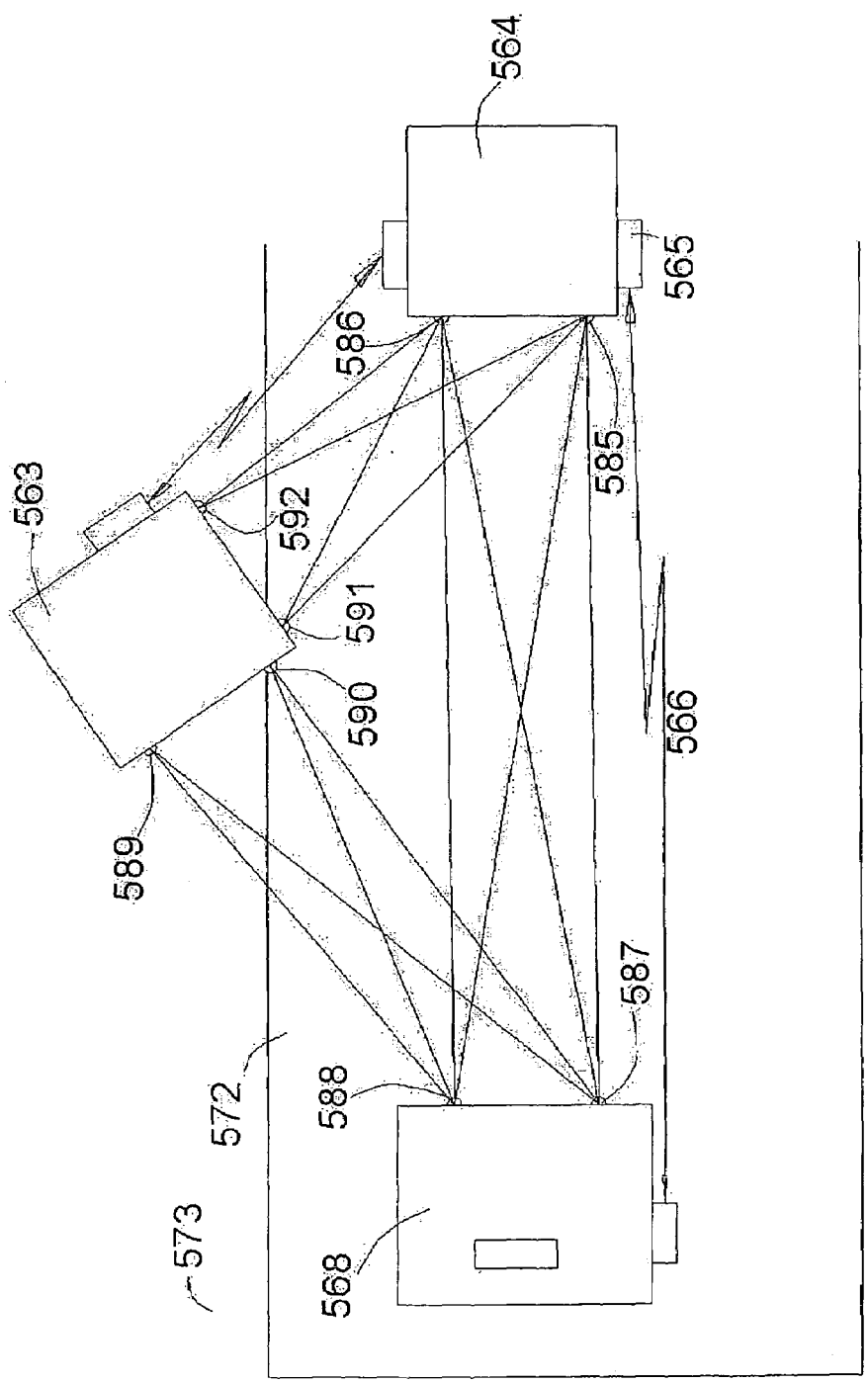

FIG. 43 shows a diagram of a top view of a sixth embodiment of image forming system determining its position and orientation, which consists of several unconnected parts.

DETAILED DESCRIPTION OF THE INVENTION

Figure 1:
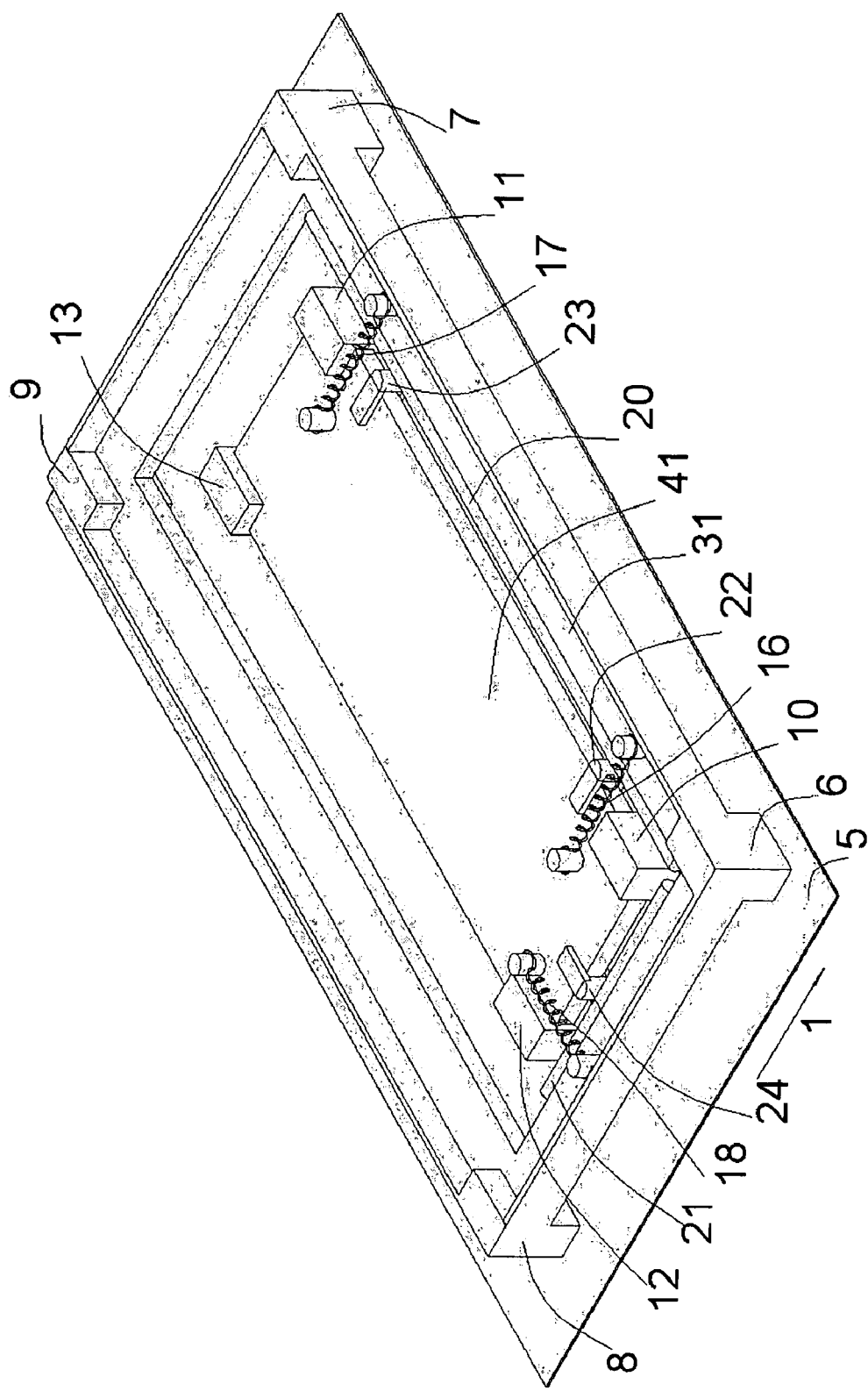
FIG. 1 shows basic elements of a first embodiment of a device of the present invention for accurate incremental displacement translating itself step-wise across a work surface (isometric view).

Referring first to FIG. 1, there are basic elements of the first embodiment of the device for accurate incremental displacement that step-wise translates itself across a work surface. Two main parts of this embodiment are the frame 31 and the shuttle 41. The Supports 6, 7, 8, 9 are rigidly fixed to the frame 31. The Supports 10, 11, 12, 13 are rigidly fixed to the shuttle 41. The shuttle and the frame are clamped to each other by springs or by other elastic bodies 16, 17 and 18. The springs 16, 17 pull the main rod 20 (a horizontal cylinder rigidly fixed to the inner edge of the frame 31) to pins 22, 23 (a vertical cylinders rigidly fixed to the outer edge of the shuttle 41). Let an axis of the rod 20 be perpendicular to the printer movement direction 1. The spring 18 of the shuttle pulls the side rod 21 (a horizontal cylinder rigidly fixed to the inner edge of the frame 31) to the pin 24 (a vertical cylinder rigidly fixed to the outer edge of the shuttle 41). Let an axis of the rod 21 be parallel to the device movement direction. As can be seen the 3-point contact is achieved between the frame and the shuttle. It completely determines their relative position and orientation along the work surface and gives simple way to adjust the device movement as will be shown later. The cylinders 20, 21, 22, 23, and 24 may be of any cross-section. They are shown as round cylinders but this is not essential. So the frame 31, the rods 20, 21, and the supports 6, 7, 8, 9 form an integral rigid structure. The shuttle 41, the pins 22, 23, 24, and the Supports 10, 11, 12, 13 form an integral rigid structure as well.

Each step of the device movement in the direction 1 (hereinafter main direction) consists of six phases.

In the initial position, shown in FIG. 2A by top view, the frame 31 of the device engages the surface 5 by its supports (engagement means are not shown and will be described later). A contact between the frame and the surface prevents movement of the frame across the surface. We shall call such contact a holding contact. The supports of the shuttle 41 do not engage the surface 5 and may be freely moved across the surface. We shall call such contact a non-holding contact. So frame is motionless relative to the surface and the shuttle is free to move relative to the frame and to the surface. At all phases of the device movement the shuttle and the frame are clamped to each other by the springs 16, 17 and 18 (or by other clamping means).

Phase 1:

The shuttle supports engage the surface. At this phase, both the frame 31 and the shuttle 41 are motionless on the surface 5.

Phase 2:

The frame supports disengage the surface 5. Now the shuttle 41 stands motionless on the surface and the frame 31 is free to move.

Phase 3: (FIG. 2B)

The frame 31 is pushed forward from the shuttle 41 by inserting the spacers 14, 15 between main rod 20 of the frame and the shuttle pins 22, 23, so the frame moves across the surface 5 in the direction 1. (The frame movement and a spacers' insertion mechanism is not shown and will be described later). The step size of the frame movement relative to the shuttle is determined by the thickness of the spacers 14, 15.

Phase 4:

The frame supports engage the surface 5. Now the surface 5 is engaged by supports of the frame and the shuttle and both, the frame 31 and the shuttle 41, are motionless relative to the surface.

Phase 5:

The shuttle supports disengage the surface 5. Now the frame stands motionless on the surface and the shuttle is free to move.

Phase 6: (FIG. 2C)

The spacers are removed and the shuttle 41 draws LIP to the frame 31 being pulled by the springs 16, 17 so that the pins 22, 23 abut against the rod 20. So the shuttle and the frame are in their relative initial position, and the device is moved one step forward.

If the spacers are of equal thickness then the movement is translational. Their thickness has to be precisely equal to the swath height of the printer.

Precision translational movement of the device may be accomplished by using precise parallel-sided blocks as spacers. These spacers should have some movement freedom after their insertion so they can be aligned by horizontal frame rods and vertical shuttle pins, by precise directions of the frame rods, and by the contact means ensuring holding/non-holding contact to the surface. Since each step is performed in a simple way without intermediate joints between support contacts with the work surface and guide rods it increases precision.

The device can move in the backward direction by changing the sequence of the 6 phases described above.

The phases of the movement in the backward direction are shown in FIGS. 3A-3C.

In the initial position, shown in FIG. 3A, the device is in the same state as in FIG. 2A. The frame 31 of the device engages the surface 5 by its supports. Contact between the frame and the surface prevents movement of the frame across the surface. The supports of the shuttle do not engage the surface 5 and may be freely moved along the surface. So frame is motionless relative to the surface and the shuttle is free to move relative to the frame and to the surface. At all phases of the device movement the shuttle and the frame are clamped to each other by the springs 16, 17 and 18 with or without spacers between them.

Phase 1: (FIG. 3B)

The shuttle 41 is pushed backward from the frame 31 by having spacers 14, 15 inserted between the main frame rod 20 and the shuttle pins 22, 23, so the shuttle moves across the surface 5 in the direction shown by an arrow.

Phase 2:

The shuttle supports engage the surface. At this phase both, the frame 31 and the shuttle 41 are motionless on the surface 5.

Phase 3:

The frame supports disengage the surface 5. Now the shuttle 41 stands motionless on the surface and the frame 31 is free to move.

Phase 4: (FIG. 3C)

The spacers are removed and the frame 31 draws up to the shuttle 41 being pulled by the springs 16, 17 so that the pins 22, 23 abut against the rod 20.

Phase 5:

The frame supports engage the surface 5. Now the surface 5 is engaged by supports of the frame and the shuttle and both, the frame 31 and the shuttle 41 are motionless relative to the surface.

Phase 6:

The shuttle supports disengage the surface 5. Now the frame stands motionless on the surface and the shuttle is free to move. So the shuttle and the frame are in their initial position, and the device is moved one step backward.

The device for accurate incremental displacement can perform a step in the transversal directions. For this purpose spacers are not inserted between the main rod and the main pins, but one spacer is inserted between the side rod of the frame and the side pin of the shuttle.

Figure 4A:
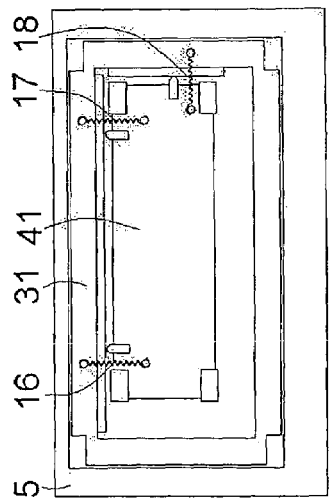
FIGS. 4A-4C are schematic drawings illustrating phases of the device's movement in the rightward direction.
Figure 4B:
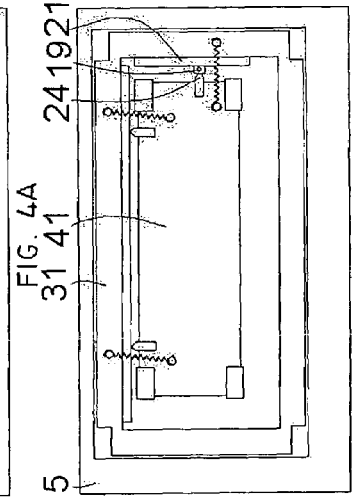
Figure 4C:
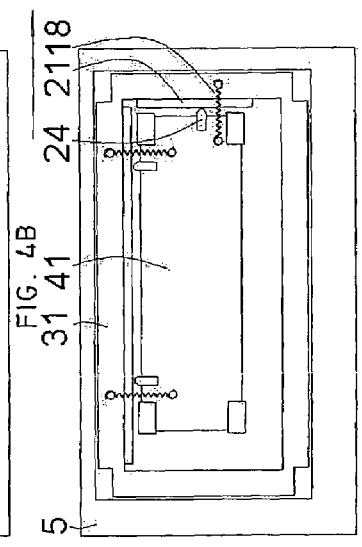

The movement in the right direction is shown in FIGS. 4A-4C.

In the initial position, shown in FIG. 4A by top view, the frame 31 of the device engages the surface 5 by its supports. Contact between the frame and the surface prevents movement of the frame along the surface. The supports of the shuttle do not engage the surface 5 and may be freely moved across the surface. So frame is motionless relative to the surface and the shuttle is free to move relative to the frame and to the surface. At all phases of the device movement the shuttle and the frame are clamped to each other by the springs 16, 17 and 18.

Phase 1:

The shuttle supports engage the surface. At this phase both, the frame 31 and the shuttle 41 are motionless on the surface 5.

Phase 2:

The frame supports disengage the surface 5. Now the shuttle 41 stands motionless on the surface and the frame 31 is free to move.

Phase 3: (FIG. 4B)

The frame 31 is pushed right from the shuttle 41 by inserting the spacer 19 between the side frame rod 21 and the vertical cylindrical shuttle pin 24, so the frame moves across the surface 5 in the arrow direction. The step size of the frame movement relative to the shuttle is determined by the thickness of the spacer 19.

Phase 4:

The frame supports engage the surface 5. Now the surface 5 is engaged by supports of the frame and the shuttle and both, the frame 31 and the shuttle 41 are motionless relative to the surface.

Phase 5:

The shuttle supports disengage the surface 5. Now the frame stands motionless on the surface and the shuttle is free to move.

Phase 6: (FIG. 4C)

The spacer 19 is removed and the shuttle 41 draws up to the frame 31 being pulled by the spring 18 so that pin 24 abuts against the side rod 21. So the shuttle and the frame are in their initial position, and the device is moved one step to the right.

For the movement in the left direction the device has to act as in the backward movement where insertion and removing of the spacers 14 and 15 (FIGS. 3A-3C) are replaced by insertion and removing of the spacer 19 (FIG. 4B).

Figure 5A:
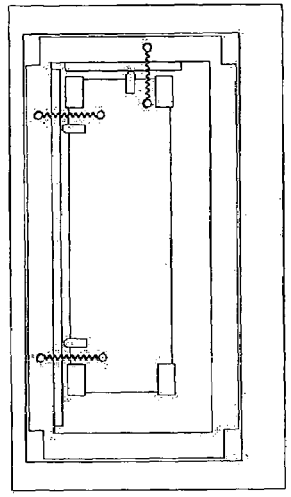
FIGS. 5A-5C are schematic drawings illustrating phases of angled movement of the device.
Figure 5B:
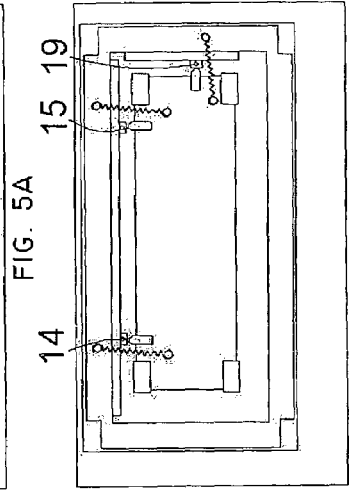
Figure 5C:
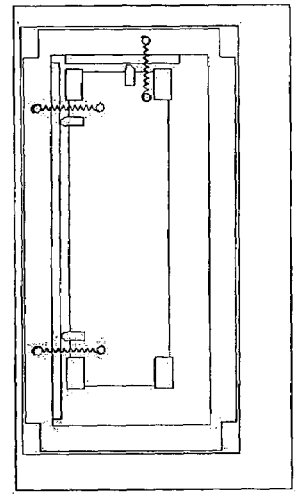

If, while the shuttle is in the holding contact and the frame is in the non-holding contact (FIG. 5A), three spacers 14, 15 and 19 are inserted together between the frame and the shuttle (FIG. 5B), and, after the shuttle is turned to the non-holding contact and the frame is turned to the holding contact, all three spacers are withdrawn (FIG. 5C), the device translates itself corner wise as shown by an arrow. It is easy to see that the device can be moved in the 8 directions: four—up, down and thwart to main direction and four—corner wise directions by a proper combination of insertion and removing of the spacers.

Figures 6, 7:
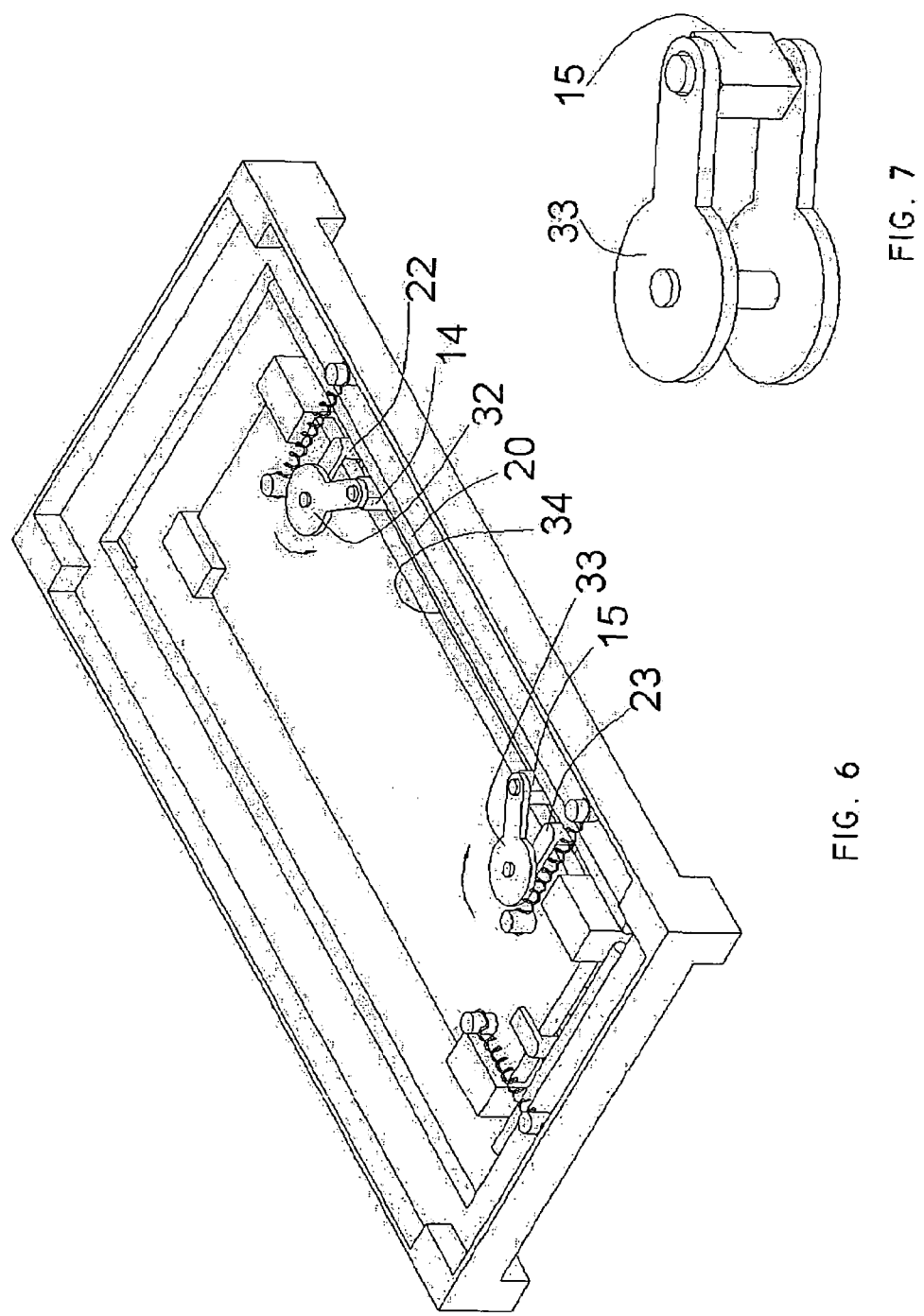
FIG. 6 shows the first embodiment of the device with a spacer insertion mechanism, wherein spacers are not inserted between a frame and a shuttle of the device.
FIG. 7 shows a spacer with a spacer holder.

An Interposed Spacer Insertion Mechanism:

FIG. 6 shows an insertion mechanism for the spacers 14, 15 between the frame rod 20 and the shuttle pins 22, 23 for translating the device forward and backward. It includes spacer holders 32, 33 that are shown in the position when the spacers 14, 15 are not clamped between the frame and the shuttle. At this position clamping means force the shuttle vertical pins 22, 23 to the horizontal rod 20 of the frame and there is gap 34 between the shuttle edge and the frame rod. The spacers being fixed in the holders are kept within this gap, which is greater than the thickness of the spacers. When the spacers have to be inserted between the frame and the shuttle, drive means (not shown) rotate the holders in the direction of the arrows. The spacers push the frame and the shuttle one from another and are inserted between the frame rod and the shuttle pins at the end of the revolution. It should be emphasized that it is not important by what way the frame is pushed from the shuttle. The position of the frame relative to the shuttle at the end of the movement is of importance.

The spacer 15 (here it is a parallel-sided block) is fixed in the holder 33 (FIG. 7). The fixing of the spacer in the holder has to be with a sufficient clearance. It enables the spacer, which is in the form of the block, to have a line contact with both the frame rod and the shuttle pin at the end of the movement when clamped between them.

Figure 8:
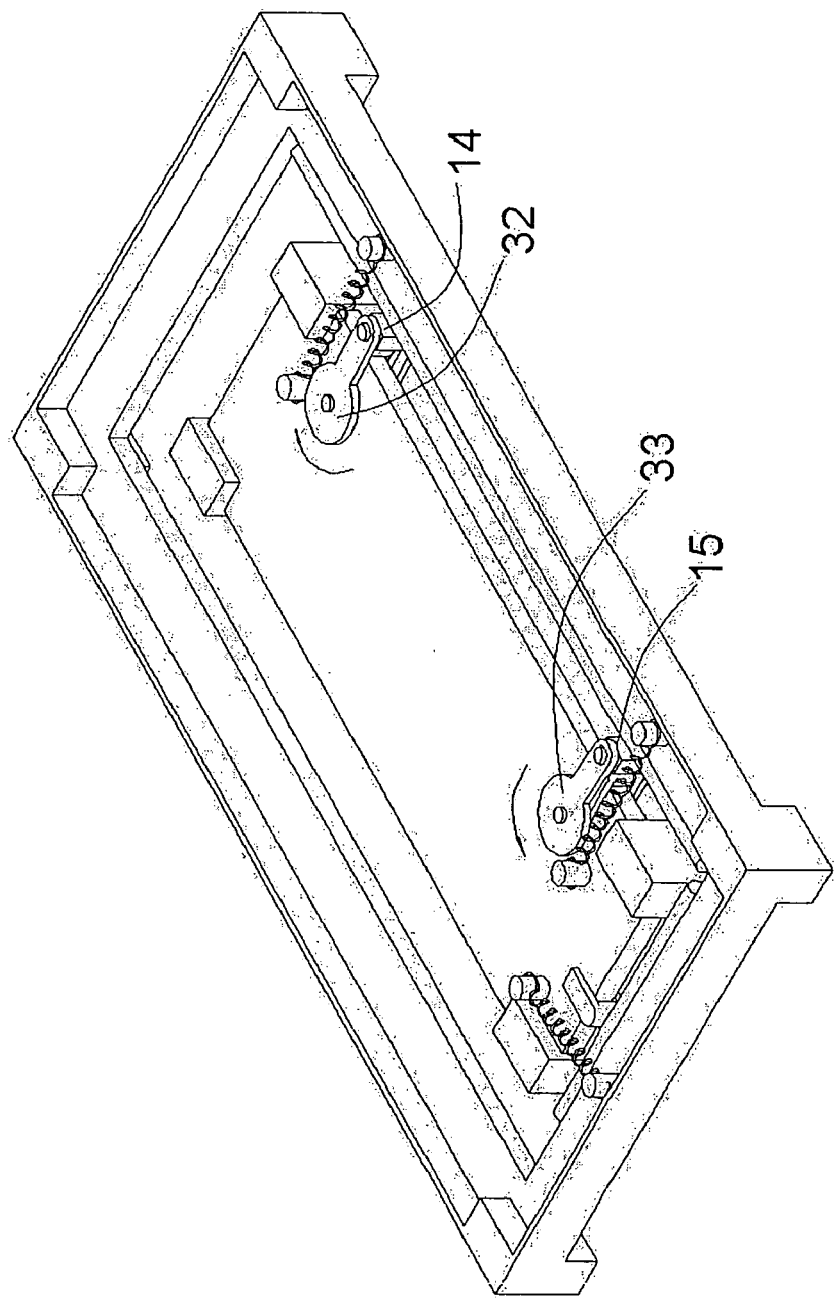
FIG. 8 shows the first embodiment of the device with a spacer insertion mechanism, wherein spacers are inserted between the frame and the shuttle.

FIG. 8 shows the insertion mechanism (drive means are not shown) in the position when the spacers 14 and 15 are inserted between the frame and the shuttle. When the spacers have to be withdrawn drive means rotate the holders 32, 33 in the direction of the arrows.

Drive means may be a motor, a stepping motor, a rotary solenoid and the like imparting motion to the holders.

In place of the main horizontal rod two shorter rods can be used. Each of them is rigidly fixed to the frame. One of the rods is pulled to one of the shuttle pins and the other rod is pulled to the other shuttle pin by clamping means.

Delicate adjustment of the device steps can be made by slightly changing the directions of the frame rods 20, 21 and the shuttle pins 22, 23, 24 (FIG. 1).

Figure 9B:
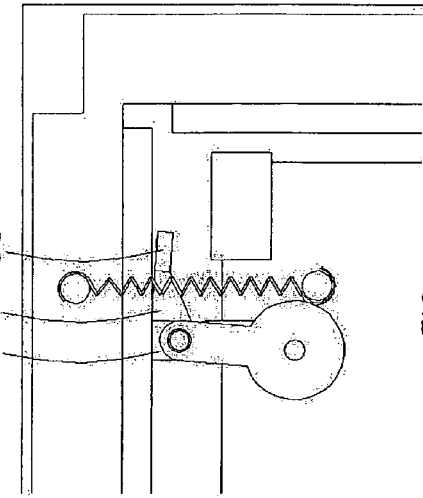
FIGS. 9A-9B show a version of a spacer permanently interposed between the frame and the shuttle (top view).
Figure 9A:
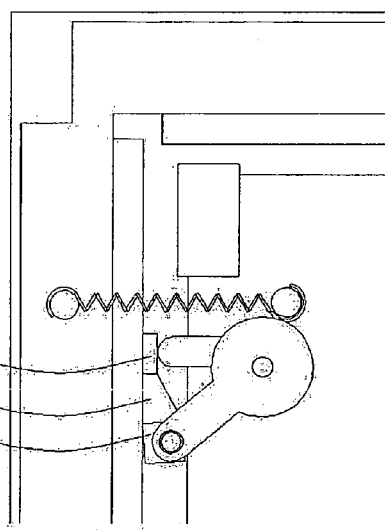

The spacers may be clamped between the shuttle and the frame permanently without insertion and withdrawing them. Displacement may be done by changing their positions and orientation, and thereby the position and orientation of the movable part of the device relative to the motionless part is determined by the displacements of the spacers clamped between the shuttle and the frame. In place of inserting parallel-sided blocks we can use two identical spacers of another form. They are clamped between the frame rod and the shuttle pins throughout the movement. FIGS. 9A-9B show (in top view) one such spacer 35 on the right side of the device (another, symmetrically positioned on the left side of the device is not shown). Shifting the frame and the shuttle one from another is performed by displacements (changing the position and orientation) of the spacers. The spacers are composed of two rigidly jointed parallel-sided plates 36, 37 of different thickness. At one position, shown in FIG. 9A, thin plates 36 of the spacers are clamped between the frame and the shuttle. At another position and orientation of the spacers, shown in FIG. 9B, thick plates 37 are clamped between the frame and the shuttle. The frame and the shuttle are shifted one from another in these two positions by thickness difference of said parallel-sided plates.

Figure 10B:
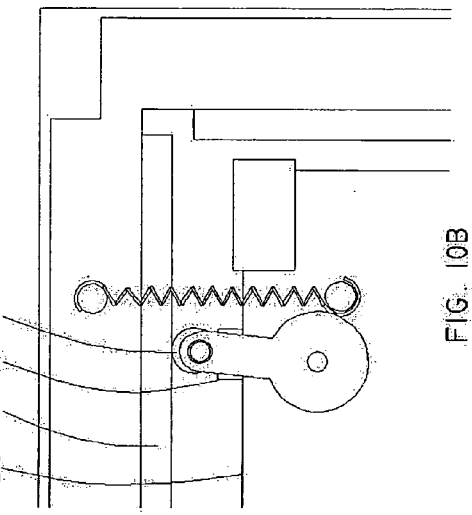
FIG. 10A-10B show another spacer version.
Figure 10A:
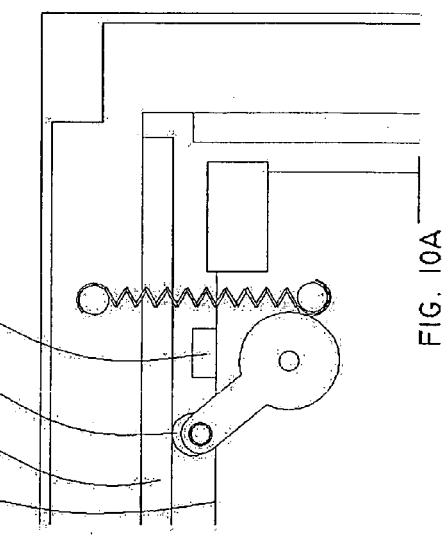

FIG. 10A-10B shows (in top view) a part of the device embodiment described above with slight changes. In place of cylindrical pins two parallel-sided blocks 38 (only one shown; another is symmetrically positioned on the left side of the device) of the same thickness are fixed to the shuttle edge 25. The edge is flat. Vertical cylinders 39 are used as spacers (one is shown; another with its holder symmetrically positioned at the left side). Diameters of the cylinders are greater then thickness of the parallel-sided blocks. FIG. 10A shows a position of the spacer 39 where the spacers are clamped between the frame rod 20 and the shuttle edge 25. FIG. 10B shows the spacers 39 in another position where the spacers are clamped between the parallel-sided blocks 38 of the shuttle and the frame rod 20. A distance between the frame and the shuttle in those positions differs by the thickness of the parallel-sided blocks 38.

These versions can perform all device translations described above by the similar sequences of actions.

The frame and the shuttle may be pushed one from another prior to the spacer position change and may close the gap after the spacer position change using additional linear actuator to prevent shuttle, frame and spacer wear at the contact line, which can decrease the accuracy of the predetermined displacement.

The contact means may be of different types.

If the work surface includes a magnet attractable material it is possible to use controlled magnetic field (FIG. 11) for engaging and disengaging the surface, like for example in U.S. Pat. No. 5,094,311. The support 46 comprises a core 48 made of soft iron and having a minimal residual magnetism. This core is wrapped within the wire coil 47 composed of several layers of coiled wire terminated at the ends and enclosed in a casing. To set a support to the holding contact the coil has to be energized. The core is magnetized and thus attracted to engage the work surface. The electromagnet can be designed to provide holding force to the work surface 5 large enough to withstand shifting forces and pull forces of gravity if the work surface is inclined.

Another way is to use a substrate of elastic materials at the bottom of the supports 50 (FIG. 12) if the surface is smooth and rigid, like glass, polished wood or metal. Elastic material clings to it, when pressed down, and releases it when pulled up. Non-holding contact may be accomplished by minimal lifting of the frame or the shuttle over the surface. It should be noted that the bottom surface of the supports may be covered (or partly covered) by releasable adhesive or by substrate capable to change its adhesiveness in order to increase holding. Such substrate may include phase-changeable materials that can be controllably changed between liquid and solid phases. Phase-changeable materials include, for example, electro-rheologic fluids and magneto-rheologic fluids. Electro-rheologic and magneto-rheologic fluids are fluids that may contain small polar or ferromagnetic particles that can stick together when exposed to either an electrical or magnetic field, respectively. When the particles stick together, the viscosity of fluid is increased. Design and operation of all of these phase-changeable technologies are well known to those having skill in the art, and need not be described further herein. The contact means may comprise a flat piece of flexible material capable to be in the holding state with said surface by magnetic forces, or by electrostatic forces, or by vacuum, or by molecular forces, in particular Van der Waals forces, or by any cohesive forces. The flat piece of flexible material can be turned to the holding state with the work surface and then turned to the non-holding state with the work surface by being rolled onto and pulled off from the work surface. It may be done using special mechanisms that are described later.

It is possible, for example, to cover the bottom of the supports with layer of releasable pressure-sensitive adhesives 51 (FIG. 13), like for example in U.S. Pat. No. 5,346,766, or layer of other low tack adhesives, or with contact responsive non-tacky layer, like in U.S. Pat. No. 6,004,670. It is preferable to use the layers fastening to the work surface with low 90 degree peel strength and higher shear strength.

The term "releasable" denotes that the layer can release the work surface without damaging that surface.

The cited releasable pressure-sensitive adhesive contains a mixture of adhesive resin, releasing resin, releasing particles and tackifying resin. Support with layer of this adhesive exhibits low tack and low initial bond when pressed in places. The adhesive coated supports slide freely when removed and set down to the work surface.

The fastening component of the multi-cycle refastenable contact responsive non-tacky fastener system comprises a contact responsive fastening layer, which has a surface that possesses essentially no surface tack, is multiply releasable and refastenable against a non-tacky target surface. Numerous polymeric materials may be used as a contact responsive layer. The polymeric material may be a homopolymer, a random copolymer, a block copolymer, or a graft copolymer. It may be cross-linked or uncross-linked. Specific examples of polymers useful as a fastening layer include ethylene-containing copolymers, urethane, acrylic and acrylate polymers, butyl rubber. Blends and mixtures of polymeric materials may be used if desired. Various other materials may be incorporated into the polymeric material. For example, tackifiers may be used if desired.

In order to take hold on the work surface, the supports described above have to be pressed downwardly against the surface. When it is required to release the surface it is necessary to raise the supports from the surface.

Figure 14:
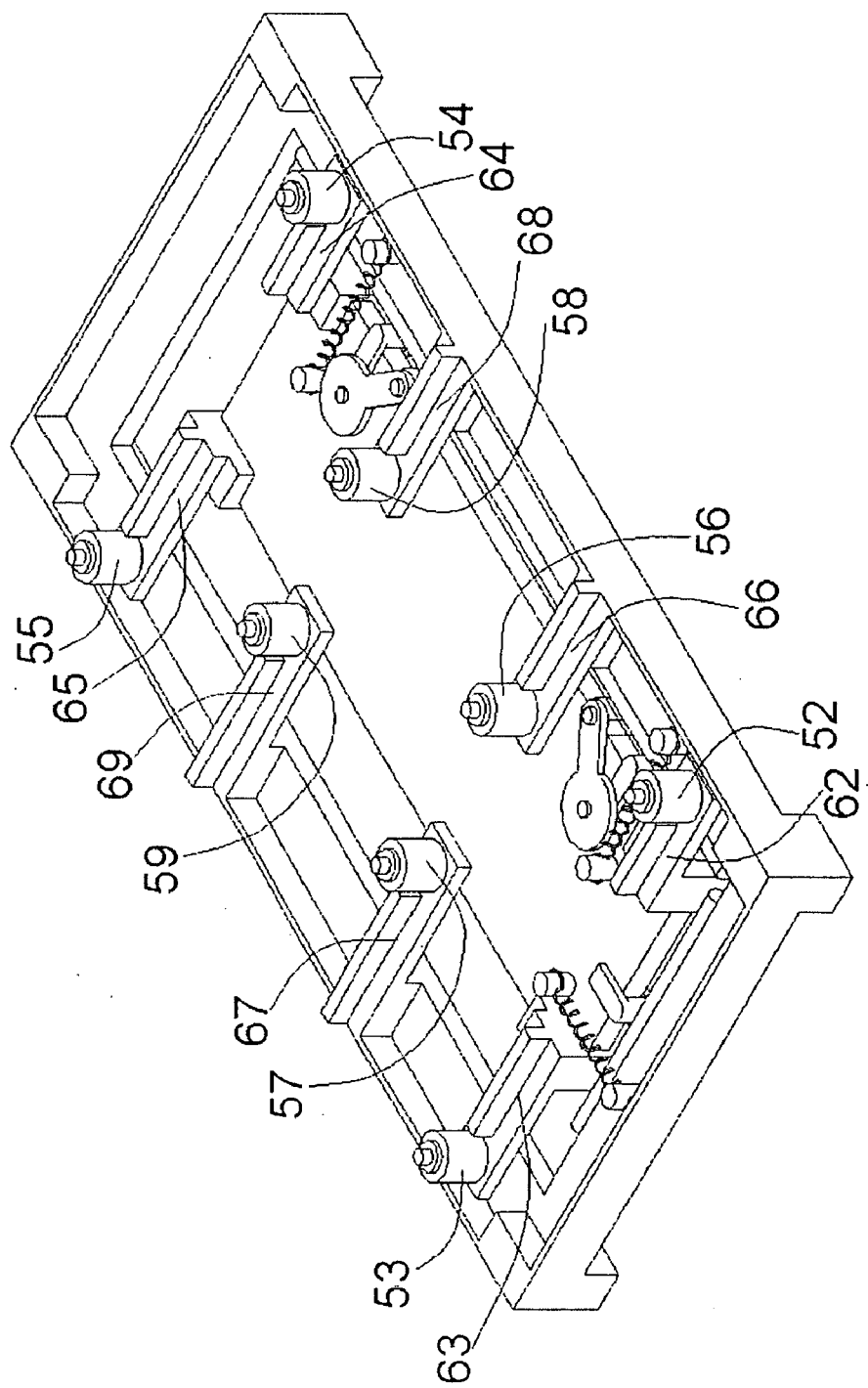
FIG. 14 shows the first embodiment of the device using solenoids for pressing device parts against the work surface and pulling them from the work surface (isometric view).

In this embodiment pressing the supports to the surface and pulling them up is performed by push solenoids shown in FIG. 14. The solenoids 52, 53, 54, 55 are fixed to the end of the shuttle beams 62, 63, 64, 65 that are protruding over the frame. When the solenoids are not energized their push rods rest on the frame. If the shuttle supports engage the work surface and it is required to change hold to the frame supports the solenoids 52, 53, 54, 55 are energized by DC voltage. When the solenoids are energized their rods press the frame to the surface and the frame supports engage the work surface. After that the shuttle is pulled up disengaging the work surface and suspending over it being supported by the frame while solenoids are still energized. Now the frame engages the surface and the shuttle supports are in non-holding state, so the solenoids 52, 53, 54, 55 may be de-energized. The solenoids 56, 57, 58, 59 are fixed to the end of the frame beams 66, 67, 68, 69 that are protruding over the shuttle. When the solenoids are not energized their push rods rest on the shuttle. When the solenoids are energized, their rods press the shuttle to the surface and the shuttle supports engage the work surface. After that, the frame is pulled up disengaging the work surface and suspending over it being supported by the shuttle while solenoids are still energized.

So in this embodiment the contact means comprise the supports with surface engagement means, the shuttle and frame solenoids capable to push one another against the surface providing surface engagement by the engagement means, and DC source with control (not shown) enabling energizing and de-energizing the solenoids according to six phases of the displacement step described above. Control and DC source may be fitted up in the device and may be incorporated into operating means that are mounted on the device and used for controlling the device for incremental movement across the work surface.

The contact means of the supports may be based on suction cup that have base of elastic substance sliding by the even work surface if the suction cup is releasing the surface. Contact means control forces them to cling to the surface when the holding contact has to be performed and forces them to release the surface when the non-holding contact has to be carried out.

Figure 15A:
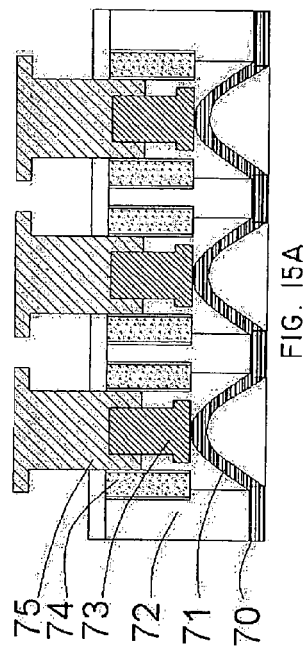
FIGS. 15A-15C are sectional views of the holders based on suction cups used as the contact means.
Figure 15B:
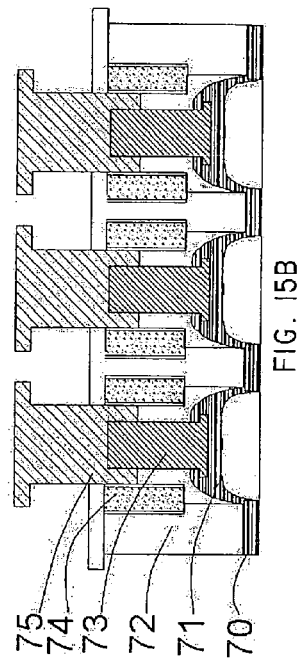
Figure 15C:
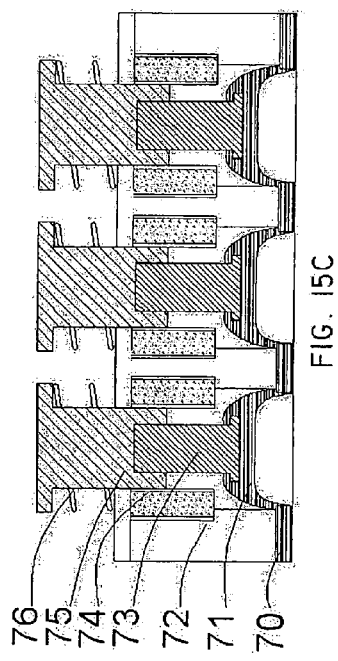
Figure 16B:
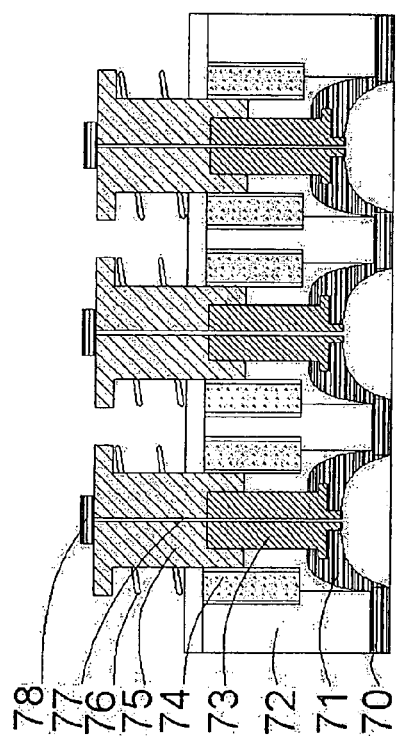
FIGS. 16A-16B show modifications of the suction cup holders (sectional views).
Figure 16A:
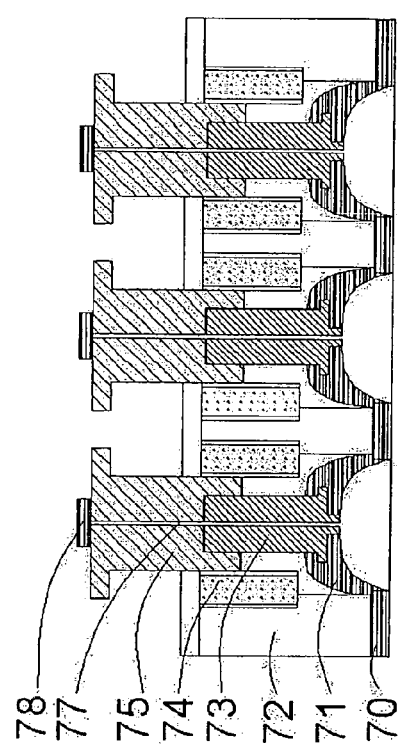

Some embodiments of the novel type of suction holder mechanisms are shown in FIG. 15A, 15B, 15C and in FIG. 16A, 16B.

A suction holder comprises the solid body 72 with an array of vertical cylindrical holes. The base of the body is covered with a thin layer of the elastic substrate 70 (one example is silicon rubber). The elastic substrate is flat on the flat parts of the body and it has an array of the elastically deformable cups 71 placed into the body holes (FIG. 15A). The coils 74 with slidable cylindrical plungers 75 are fixed at the top portion of the holes above the cups. The cylindrical pushing rods 73 are fixed to the bottom of the plungers. The bottom portion of the rod is enlarged and rests on the top of the cup when the coil is not energized.

The engagement of the illustrated suction holder to the surface is executed in three phases. First, the coils 74 are energized. The plungers 75 are pushed down and the rods 73 push the suction cups 71. This causes deformation of the suction cups 71 and consequent expulsion of air from their interior, the air escaping between the cup and the surface. After that the suction holder body is pressed against the surface. The last phase is de-energizing the coils while keeping the suction holder body pressed against the surface. The elastic cups being free of the pressure reshape themselves creating under pressure within the cups, engage the surface, and return the rods with the plungers to the initial state. After that the pressure on the body may be released. When it is required to release the surface it is necessary to energize the coils 74. The rods 73 push on the suction cups 71, deform them and remove the under pressure within the cups. It releases the surface if the body is not pressed against the surface. After that the coils 74 may be de-energized.

In place of the rod 73 any member positioned above or integral with the suction cup 71 and pressing top of the suction cup by controllable force application or change of magnetic/electric field, which causes deformation of the suction cup, may be used.

The only difference between the suction holder illustrated in FIG. 15B and FIG. 15A is that the rods 73 are integrated with the cups 71. It may be done by inserting the enlarged portion of the rod into the cup of the suitable form after the substrate with the cups is made or by forming the cup array with the rod insertion during the forming process.

The suction holder shown in FIG. 15C comprises the biasing springs 76 between enlarged top portions of the plungers 75 and the top face of the body 72. The springs 76 speed up the reshaping of the cups 71 and stretch them slightly increasing under pressure within the cups when the coils 74 are de-energized.

If the interior of cups is not hermetically secured then under pressure within the cups in the described above suction holder can be kept for limited period. If this period is not long enough for application requirements then modifications of those suction holders shown in FIG. 16A and FIG. 16B can be used. They differ from the means illustrated in FIG. 15B and FIG. 15C with an addition of the vent passages 77 and the valves

78. Any of the cups 71 may release the surface engagement by energizing its coil without producing disengaging forces for the other cups of the same array because an air from its interior can be expelled through the vent passage 77 if the pressure within the cup is increased. The valves 78 prevent the air passage from the atmosphere into the interior of the CLIPS when they are under negative pressure. After the initial surface engagement cups of these means may release the surface and immediately re-engage it one after another in cyclical manner in time-shifting so that at any moment some cups engage the surface. Technology for manufacturing two-dimensional array caps of elastic material with or without insertion of other items, like core in our case, is well established.

Figure 17B:
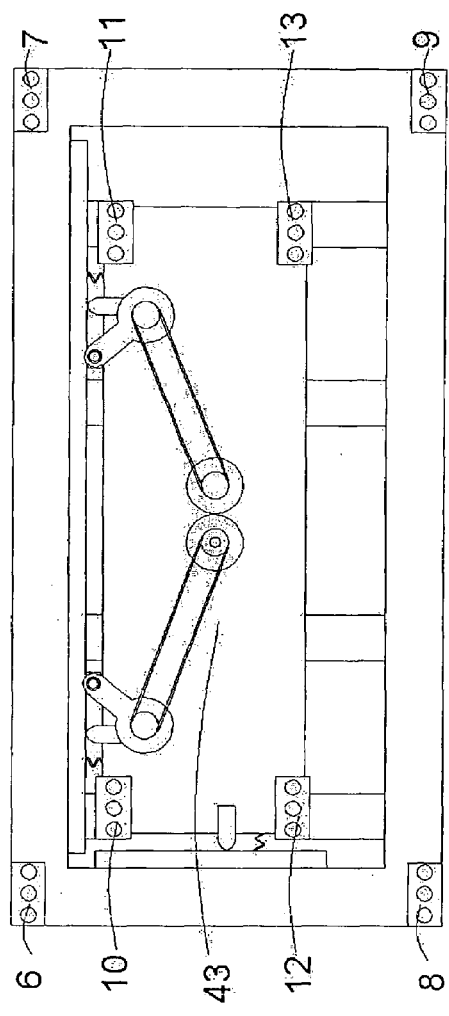

FIG. 17A (top view) and FIG. 17B (bottom view) show the device embodiment capable of moving forward and backward by using the rotary solenoid (with return spring) 42 as an engine with the belt-and-gear drives 43 transferring rotation to the spacer holders. The suction holders, which are fixed at all supports, are used as the engagement means.

To effect displacements of the device shown in FIG. 17 voltage pulses are fed from the control unit to the solenoids and to the suction holder coils. The pulses and their phase relationship for moving the device forward and backward are qualitatively shown in FIG. 18A, FIG. 18B, FIG. 19A, and FIG. 19B wherein the x-axis is time t, and the y-axis is a voltage v. In initial state the frame supports are engaging the work surface and the shuttle supports are in the non-holding contact with the surface.

FIG. 18A and FIG. 18B shows the pulse sequences producing forward and backward movement of the device which supports are equipped with the pressure-sensitive adhesives shown in FIG. 13.

FIG. 19A and FIG. 19B shows the pulse sequences producing forward and backward movement of the device which supports are equipped with the suction holders of type shown in FIG. 15 (A, B, C) and in FIG. 16 (A, B).

Pulses 81 are fed to a rotary solenoid 42 in FIG. 17A; pulses 82 are fed to the frame solenoids 56, 57, 58, 59 in FIG. 17A; pulses 83 are fed to the shuttle solenoids 52, 53, 54, 55 in FIG. 17A; pulses 84 are fed to the suction holder coils at the frame supports 6, 7, 8, 9 in FIG. 17B; pulses 85 are fed to the suction holder coils at the shuttle supports 10, 11, 12, 13 in FIG. 17B.

The pattern of pulses shown in FIG. 18A corresponds to the forward displacement of the device. Voltage 82 applied to the frame solenoids causes them to press the shuttle downward against the work surface. Shuttle supports are fastened to the surface. Then the frame is pushed-up off the shuttle by the same solenoids and its supports disengage the work surface. Then voltage 81 applied to the rotary solenoid 42 (FIG. 17A) causes its rotation through an angle of 45 degrees. The rotary solenoid 42 rotates the holders 32, 33 with parallel-sided blocks. The rotating holders push the frame from the shuttle and insert the parallel-sided blocks as spacers between the vertical pins of the shuttle and the horizontal rod of the frame, so the frame is displaced forward across the work surface. After the frame is displaced voltage 83 is applied to the shuttle solenoids and voltage 81 is keeping the holders with spacers motionless in their position. Voltage 83 applied to the shuttle solenoids causes them to press the frame downward against the work surface. So the frame supports are fastened to the surface. Then the shuttle is pushed-up off the frame by the same solenoids and its supports disengage the work surface. Now voltage 81 is relieved and the return spring pulls the rotary solenoid back to its zero-state thus rotating holders with spacers and returning them into a gap between the frame and the shuttle. When it happens the shuttle is pulled to the frame by the clamping springs completing the displacement step of the device.

The pattern of pulses shown in FIG. 18B corresponds to the backward displacement of the device. Voltage 81 applied to the rotary solenoid 42 (FIG. 17A) causes its rotation through an angle of 45 degrees. The rotary solenoid 42 rotates the holders 32, 33 with parallel-sided blocks as spacers. The rotating holders push the shuttle from the frame and insert the spacers between the vertical pins of the shuttle and the horizontal rod of the frame, so the shuttle is displaced backward across the work surface. Voltage 82 applied to the frame solenoids causes them to press the shuttle downward against the work surface. So the shuttle supports are fastened to the surface. Then the frame is pushed-up off the shuttle by the same solenoids and its supports disengage the work surface. Then voltage 81 is relieved and return spring pulls the rotary solenoid back to its zero-state thus rotating holders with spacers and returning them into a gap between the frame and the shuttle. When it happens the frame is pulled to the shuttle by the clamping springs completing the displacement step of the device. After the frame is displaced voltage 83 is applied to the shuttle solenoids. Voltage 83 applied to the shuttle solenoids causes them to press the frame downward against the work surface. So the frame supports are fastened to the surface and after that the shuttle is pushed-up off the frame by the same solenoids and its supports disengage the work surface. So the device is displaced backward and is turned to the initial state.

The pattern of pulses shown in FIG. 19A corresponds to the forward displacement of the device. Voltage 85 is applied to the shuttle support suction holder coils 74 (FIG. 15B). The plungers 75 are pushed down and the rods 73 push on the suction cups 71. This causes deformation of the suction cups 71 and consequent expulsion of air from their interior. Then voltage 82 is applied to the frame solenoids causing them to press the shuttle downward against the work surface. Voltage 85 is relieved and elastic cups being free of the pressure reshape themselves creating under pressure within the cups and engaging the surface. Then voltage 84 is applied to the frame support suction holder coils producing deformation of the suction cups and pressure rising in their interior causes the frame supports to disengage the surface. The frame solenoids are still energized so the frame is pushed-up off the shuttle. Now voltage 84 is relieved and elastic cups of the frame support suction holders that are floating over the surface are reshaped. Then voltage 82 is relieved too. So now the surface is engaged by the shuttle supports and the frame supports are in the non-holding contact with the surface. After that voltage 81 applied to the rotary solenoid 42 (FIG. 17A) causes its rotation through an angle of 45 degrees. The rotary solenoid 42 rotates the holders 32, 33 with parallel-sided blocks. The rotating holders push the frame from the shuttle and insert the parallel-sided blocks as spacers between the vertical pins of the shuttle and the horizontal rod of the frame, so the frame is displaced forward across the work surface. After the frame is displaced voltage 84 applied to the frame support suction holder coils causes deformation of the suction cups and consequent expulsion of air from their interior. Then voltage 83 applied to the shuttle solenoids causes them to press the frame downward against the work surface. Voltage 84 is relieved and the elastic cups being free of the pressure reshape themselves creating under pressure within the cups and engaging the surface. Then voltage 83 applied to the shuttle support suction holder coils produces deformation of the suction cups and pressure rising in their interior causes the shuttle supports to disengage the surface. The shuttle solenoids are still energized so the shuttle is pushed up from the frame. Now voltage 85 is relieved and the elastic cups of the shuttle support suction holders, which are floating over the surface, are reshaped. Then voltage 83 is relieved too. After that the surface is engaged by the frame supports and the shuttle supports are in the non-holding contact with the surface. Now voltage 81 is relieved and return spring pulls rotary solenoid back to its zero-state rotating holders with spacers and returning them into a gap between the frame and the shuttle. When it happens the shuttle is pulled to the frame by the clamping springs completing the displacement step of the device. The pattern of pulses shown in FIG. 19B corresponds to backward displacement of the device. Voltage 81 applied to the rotary solenoid 42 (FIG. 17A) causes its rotation through an angle of 45 degrees. The rotary solenoid 42 rotates the holders 32, 33 with parallel-sided blocks as spacers. The rotating holders push the shuttle from the frame and insert the spacers between the vertical pins of the shuttle and the horizontal rod of the frame, so the shuttle is displaced backward across the work surface. Then voltage 85 is applied to the shuttle support suction holder coils. This causes deformation of the suction cups 71 and consequent expulsion of air from their interior. Then voltage 82 applied to the frame solenoids causes them to press the shuttle downward against the work surface. Voltage 85 is relieved and elastic cups being free of the pressure reshape themselves creating under pressure within the cups and engaging the surface. Then the voltage 84 applied to the frame support suction holder coils produces deformation of the suction cups and pressure rising in their interior causes the frame supports to disengage the surface. The frame solenoids are still energized so the frame is pushed-up off the shuttle. Now the voltage 84 is relieved and elastic cups of the frame support suction holders that are floating over the surface are reshaped. Then voltage 82 is relieved too. So now the surface is engaged by the shuttle supports and the frame supports are in non-holding contact with the surface. Then voltage 81 is relieved and return spring pulls rotary solenoid back to its zero-state rotating holders with spacers and returning them into a gap between the frame and the shuttle. When it happens the frame is pulled to the shuttle by the clamping springs completing displacement of the device. It is still necessary to restore the device initial state, namely to turn the frame supports to the holding state and the shuttle supports to the non-holding state. For this purpose voltage 84 is applied to the frame support suction holder coils. This causes deformation of the suction cups and consequent expulsion of air from their interior. Then voltage 83 is applied to the shuttle solenoids causing them to press the frame downward against the work surface. Voltage 84 is relieved and elastic cups being free of the pressure reshape themselves creating under pressure within the cups and engaging the surface. Now voltage 83 applied to the shuttle support suction holder coils produces deformation of the suction cups and pressure rising in their interior causes the shuttle supports to disengage the surface. The shuttle solenoids are still energized so the shuttle is pushed-up off the frame. Now voltage 85 is relieved and elastic cups of the shuttle support suction holders, which are floating over the surface, are reshaped. Then voltage 83 is relieved. Now the surface is engaged by the frame supports and the shuttle supports are in the non-holding contact with the surface.

To achieve the device's initial state at the beginning of the movement one has to press down the frame of the device against the work surface by hand or by any acceptable tool when the device is mounted on the surface. It is sufficient for the device which supports are equipped with pressure-sensitive adhesives or the like.

If the device supports are equipped with the suction holders one of the ways to engage the surface is to energize the coils of the frame suction holders and to press the frame against the surface by hand or by any applicable tool while the coils are still energized. After that the coils are de-energized and the pressure onto the frame has to be kept until the suction cups are reshaped and the frame supports engages the work surface. It may be done in another way. The plungers 75 of the frame suction holders are pressed downward mechanically by force applied to the plate 79 as shown in FIG. 20A. At this state the device is placed on the work surface. Then the pressure is applied to the frame by hand or by any applicable tool, the mechanical pressure on the suction holder plungers is removed, and after that the pressure onto the frame has to be kept until the suction cups are reshaped and the frame supports engage the surface. To remove the Suction holder from the surface the plunger 75 is pressed downward and the body 72 is lifted of the surface. Similar stand-alone suction holder (FIG. 20B) may be used as auxiliary tool for precise mounting the device onto the work surface. Three suction holders of this type engage the work surface as guides for the device placement. Two of them govern the forward edge of the device and the third governs the side edge. The device is placed onto the surface abutting the suction holder spacers and the device frame engages the surface. Then the guiding suction holders are removed.

A suction holder with plurality of suction cups may have no coils for each suction cup but a solenoid or several solenoids 80A, 80B (FIG. 20C) that press the suction holder plungers by plate like in the previous example (FIG. 20B) or by other mechanical means.

The second embodiment of the device for accurate incremental displacement is shown in FIG. 21. Two main parts of this embodiment are the frame 131 and the shuttle 141. The supports 106, 107, 108, 109 are rigidly fixed to the frame 131. The supports 110, 111, 112, 113 are rigidly fixed to the shuttle 141. The shuttle and the frame are clamped to each other by the tension springs 116, 117, or by the compression spring 118 (elastic material, or couple of magnets, or the like can be used in place of springs). The springs 116, 117 clamp spacers 133, 135 between the horizontal rod 120 (rigidly fixed above the shuttle to the upper beams of the frame) and pins 122, 123 (vertical pins rigidly fixed to the shuttle). The spring 118 is fixed to the shuttle and pulls the horizontal rod 121 (rigidly fixed to the frame and protruding above the shuttle) to the vertical pin 124 rigidly fixed to the shuttle thus clamping the spacer 132 between the rod 121 and the pin 124. Each spacer is driven by a separate stepping motor which changes an orientation of the spacer in different phases of the device step. The stepping motor 181 rotates the spacer 135. The stepping motor 182 rotates the spacer 133. The stepping motor 183 rotates the spacer 132.

Each spacer (FIG. 22A) comprises four blocks 136, 137, 138, 139 which are parallel-sided blocks of a different thickness. The motors transfer rotation to the spacers 132, 133, 135 (FIG. 21) through their bases. The block fixture in the base has to be of sufficient clearance in order for the block to obtain the line contact with both the frame rod and the shuttle pin when clamped between them.

A step of the device movement consists of the six phases. In the initial position the frame of the device is in the holding contact with the surface. The shuttle is in the non-holding contact with the surface. So the frame is motionless relative to the surface and the shuttle is free to move relative to the frame and to the surface. The spacers are in an initial orientation.

Phase 1:

Each of the stepping motors 181, 182, 183 (FIG. 21) independently rotates the spacers 135, 133, 132 through angle of 0, 90, 180, or 270 degrees changing their orientation in response to a control means (not shown). The orientation of the spacers dictates the shuttle position relative to the frame at the beginning of the step execution since the shuttle is clamped to the frame. The position is determined by the thickness of the spacer blocks that are clamped between horizontal rods of the frame and the vertical pins of the shuttle in the established orientation. As an example FIG. 22A, FIG. 22C show spacer 135 in the orientation where the block 136 is clamped between the frame and the shuttle pins, and the spacer 132 in the orientation where the block 198 is clamped between the frame and the shuttle pins. FIG. 23A schematically shows the shuttle position relative to the frame.

Phase 2:

The shuttle supports engage the surface. At this phase, both the frame and the shuttle are motionless on the surface.

Phase 3:

The frame supports disengage the surface. Now the shuttle stands motionless on the surface and the frame is free for movement.

Phase 4:

Each of the stepping motors 181, 182, 183 (FIG. 21) once more turns the spacers 135, 133, 132 changing their orientation in response to the control means (not shown). That places the frame in the prescribed position relative to the shuttle position since the frame is clamped to the shuttle. The position is determined by the thickness of the spacer blocks that are now clamped between the horizontal rods of the frame and the vertical pins of the shuttle in the new orientation. As an example, FIG. 22B and FIG. 22D show the spacer 135 in the orientation where the block 138 is clamped between the frame and the shuttle pins, and the spacer 132 in the orientation where the block 197 is clamped between the frame and the shuttle pins. FIG. 23A and FIG. 23B show schematically the change of the frame position and orientation. So the displacement of the frame across the surface is determined by the orientations of the spacers in the end of the first phase and their orientation at the end of this phase.

Phase 5:

The frame engages the surface. Now the frame and the shuttle are motionless relative to the surface.

Phase 6:

The shuttle disengages the surface. Now the frame stands motionless on the surface and the shuttle is free for movement. The spacers are returned to their initial orientation.

FIG. 22A, FIG. 22B show displacement of the frame at its point of contact with the spacer 135 after phase 4. The arrow 101 shows positive direction of a displacement. The displacement size is equal to the block thickness (138 in the FIG. 22B) which is clamped between the frame and the shuttle in a considered point of contact at the end of the phase 4 minus the block thickness (136 in the FIG. 22A) which is clamped between the frame and the shuttle in a considered point of contact at the end of the phase 1. Given that the spacers 133 and 135 are identical and at the same orientation at all phases of the step the frame displacement is translational.

TABLE 1

Displacement vs. Block combination

| Displacement | Block combination | |
|---|---|---|
| (mm) | Phase 1 | Phase 4 |
| 1 | 136 | 137 |
| 2 | 137 | 139 |
| 3 | 136 | 139 |
| 4 | 137 | 138 |
| 5 | 136 | 138 |
| 0 | 136 | 136 |
| −1 | 137 | 136 |
| −2 | 139 | 137 |
| −3 | 139 | 136 |
| −4 | 138 | 137 |
| −5 | 138 | 136 |

As example, Table 1 shows the applicable device displacements at every step if thickness of the block 136 equals 3 mm., thickness of the block 137 equals 4 mm., thickness of the block 138 equals 8 mm., and thickness of the block 139 equals 6 mm. The device displacement in transversal direction is illustrated in FIG. 22C and FIG. 22D. The arrow 104 shows positive direction of the displacement. The displacement size is equal to the thickness of the block (197 in the FIG. 22D), which is clamped between the frame and the shuttle in a considered point of contact at the end of the phase 4, minus the thickness of the block (198 in the FIG. 22C), which is clamped between the frame and the shuttle in a considered point of contact at the end of the phase 1.

Spacers' orientation control may be executed by a master unit using the device as a slave for its movement across the work surface. If the master unit uses different tools requiring different steps across the surface, the needed translational step may be chosen by the spacers' orientation control. Such spacer with multiple blocks may be used for a position correction, a trajectory change, and an initial position adjustment according to position sensors of the master unit. Number of blocks and their thickness may be set depending on an application. For example, a printer may use device spacers with the block thickness that enable it to execute main step equal to the swath height during printing, to execute the position correction during printing with needed accuracy, and to adjust the initial position with coarse and fine steps.

It should be noted that a simple modification of this embodiment can serve as a self-propelled platform moving step-wise with predetermined steps in the main direction and moving step-wise (with larger steps) with position pick-Lip during movement in the longitudinal (transversal) direction (FIGS. 24A and 24B). The main modifications are:

replacement of the motor and the spacer performing steps in the longitudinal directions by the linear actuator 132A with the precision sensor 150 providing the device control with position of the frame relative to the shuttle during longitudinal movement;

replacement of the tension springs 116, 117 by compressed springs 116A and 117A, which move along the rod and remain right opposite the spacers during longitudinal movements of the frame relative to the shuttle; and replacement of the compressed spring 118 by the longer spring 118A.

The frame or the shuttle in any of described above incrementally moving devices is applicable to support or to engage tools or articles to be moved. This device modification may serve as a platform for scanning tools mounted on the frame without need for additional actuators moving scanning tool along the work surface. The rod 120 in this modification serves as a guide for movement of the scanning tool and the linear actuator serves as a motion source. This embodiment modification may serve as the platform for small size scanning devices.

Surface contact means in this embodiment are different from the previous embodiment and more sufficient for a heterogeneous or a rough hard surface and for a surface of soft materials like textile. A retractable ball bearing may be used in order to reach the non-holding contact in case of rough surfaces that are difficult for sliding. A bur layer or a hard-face of needles at the bottom of the supports may be used for textile. If the state to be achieved is the holding contact then the supports have to be forced down to textile. If the state to be achieved is the non-holding contact then the supports have to be lifted up.

The considered device embodiment comprises mechanisms for the retractable ball bearing and for lifting one part (the frame or the shuttle) of the surface. The selected part is brought to the suspended position in which the selected part is supported by another part. This mechanism consists of two shafts 186, 187 (in FIG. 21 and in FIG. 25 that shows bottom view of the device) with bearing housings 160, 161, 162, 163 (FIG. 25) attached fixedly at each side of the shafts. Each bearing-housing comprises the ball bearing (151, 152, 153, 154) that is free to rotate in any direction and appears to be the ball bearing support for the shuttle or for the frame when the device is moving. The shafts 186, 187 are fixed to the shuttle with bearing housings 164, 165, 166, 167 (FIG. 25). The stepping motor 183 (FIG. 21) rotate the shafts 186, 187 synchronously in the opposite directions in response to the control (not shown) using a shaft 184 (FIG. 21), the shaft 185 (FIG. 25) and a gearing-system. The shafts 186 and 187 are stable in three positions (FIG. 25A, FIG. 25B, FIG. 25C—front views of the device). In the initial (first) Phase of the device step the bearing balls 151, 152, 153, 154 of the shafts 186, 187 are at the bottom (FIG. 25A) and the shuttle supports 110, 111 are lifted. In this position the frame supports 106, 107 are engaging the surface 105 and the shuttle is free to move across the surface by means of the bearing balls of the shafts 186, 187.

To get to the second Phase of the step, the bearing balls 151, 152 are retracted by turning the shafts 186, 187 through 90 degrees to the next stable state (FIG. 25B). In this position of the shafts, the supports of the frame 106, 107 and the supports of the shuttle 110, 111 engage the surface. To get to the third Phase of the device step, the shafts 186, 187 are turning through 90 degrees more so that the bearing balls are moved to the top of the shafts (the third stable state). In this position (FIG. 25C) the balls 151, 152 abut against the under surface of the frame and lift the frame up. In this position the frame is suspended over the surface 105 and the shuttle supports the frame with the ball bearing contact so the frame is free to move in any direction relative to the shuttle. To get to the fifth and the sixth Phases of the device step the shafts 186, 187 have to be turned back through 90 degrees to the fifth Phase and through 90 degrees more to the sixth Phase.

FIG. 26A, FIG. 26B, FIG. 26C show the embodiment described above with a small modification. The frame is modified by fitting it up with four bed-frames with additional bottom flat supports (two of which—188, 189—may be seen in the figures) for the balls 151, 152, 153, 154. In the first Phase of the shafts 186, 187 the bearing balls 151, 152, 153, 154 are at the bottom (FIG. 26A). In this position the balls 151, 152 abut against the additional frame supports 188, 189 and lift the shuttle up. The shuttle is suspended over the surface 105 and it is in a bearing ball contact with the additional frame supports 188, 189. So the shuttle is free to move in any direction relative to the frame. To get to the second Phase of the step the shafts 186, 187 are turned through 90 degrees (FIG. 26B) and the bearing balls 151, 152 are set in the position where they don't touch the frame. In this position the supports of the frame 106, 107 and the supports of the shuttle 110, 111 engage the surface. To get to the third phase of the device step the shafts 186, 187 are turning through 90 degrees more so the bearing balls are moved to the top of the shafts. In this position (FIG. 26C) the balls 151, 152 abut against the under surface of the frame and lift the frame up. The frame is suspended over the surface 105 and the shuttle supports the frame with the bearing ball contact so the frame is free to move in any direction relative to the shuttle. To get to the fifth and the sixth Phases of the device step the shafts 186, 187 have to be turned back through 90 degrees to the fifth Phase and through 90 degrees more to the sixth phase.

As an example of an image forming device based on the device for accurate incremental displacement we present an inkjet printer. Printing devices, such as inkjet printers, use printing composition, referred generally as "ink", to print images (text, graphics, etc.) onto a print medium. Inkjet printers may use print cartridges, which deposit printing composition; each pen has a print head that includes a plurality of nozzles. Each nozzle has an orifice through which the printing composition is ejected. To print an image, the print head is propelled back and forth across the print medium by, for example, a carriage while ejecting printing composition in a desired pattern as the print head moves. The particular ink ejection mechanism within the print head may take on a variety of different forms, such as thermal print head technology. For thermal print heads, the ink may be a liquid, with dissolved colorants or pigments dispersed in a solvent. The printer also has a controller that receives instructions from a host device, typically a computer, such as a personal computer. A monitor coupled to the computer host may also be used to display visual information to an operator, such as the printer status or a particular program being run on the host computer. Personal computers, their input devices, such as a keyboard and/or a mouse device, and monitors are all well known to those skilled in the art. The control and data exchange with host computer may be executed through wireless communication.

Special purpose palm computer with additional control functions may be used as a remote control unit for self-propelled printer to supervise and control the printer. Remote control unit may perform control and data exchange with the printer using wireless communication. Another possibility is loading printing data defining an image to be printed from the host computer to the printer, then breaking the image data communication link, and placing the printer for printing session on the work surface remote from the host computer. The portable personal computer 202, as a host, with the portable self-propelled image forming device 203 can comprise a portable image forming workstation to do the job at a client site (FIG. 27).

FIG. 29 shows a front-left isometric view of the third embodiment of the device which is an exemplifying version of the incrementally moving inkjet printer. It comprises three basic parts: the y-shuttle 241, shown separately in FIG. 29A, the frame 231, shown separately in FIG. 29B and the x-shuttle 270, shown separately in FIG. 29C. Top view of the frame with the y-shuttle is shown in FIG. 29D and FIG. 32, 32A, 32B, 32C show left view of the printer with a sectional view of the frame.

The Y-Shuttle:

The y-shuttle 241 and its interoperation with the frame 231 are designed like a modified second embodiment of the device with some changes.

The y-shuttle comprises two supports that are at the left and right ends of the shuttle. There are two identical and symmetrically positioned spacers, 232 and 233, each of which is driven synchronously but in the opposite directions through the transmission system 281 by the stepping motor 292.

Each spacer (FIG. 30) of the printer has two levels. The bottom level includes four changeable blocks 232A, which are parallel-sided blocks of a different thickness. The cam 232B is an upper level of the spacer. The motor 292 rotates the spacer holder 232. The 90 degrees turn changes the block clamped between the frame rod and the shuttle pin by another block. The cam 232B is positively connected to the spacer holder 232 by four pins 234 which retain blocks 232A with the sufficient clearance to make the blocks gain the line contact with the frame rod 220A (FIG. 29D) and the shuttle pin 222 when clamped between them.

The form of the bearing housing 286 (FIG. 31) is different from the form of the bearing housing 161 (FIG. 25) of the second embodiment and has two pairs of bearing balls (251 and 252). The shafts 287 (287A, 287B) are carried by bearings 265 (265A and 265B are shown in the FIGS. 29A and 265C, 265D are obscured) which housings are fixed to the y-shuttle 241 (FIG. 29A). The four basic positions of the bearing housing 286 (FIG. 31A, FIG. 31B, FIG. 31C and FIG. 31D) determine a relative vertical position of the y-shuttle and the frame. In the first position (FIG. 31A) of the bearing housing 286 the bearing balls 251, 252 don't touch the bed-frame 288 and both, the y-shuttle supports 210 and the frame supports 206 (see also FIG. 29), are resting on the work surface 205. To get to the second position of the bearing housing, the shaft 287 (FIG. 31) is turned by the second motor 293 (FIG. 29A) through 90 degrees and the bearing balls 251 are at the bottom (FIG. 31B). In this position the balls 251 abut against the bottom of the bed-frame 288 and lift the y-shuttle up. The y-shuttle is suspended over the surface and it is in the ball bearing contact with the bed-frame 288. The frame rests on the work surface. To get to the third position (FIG. 31C) of the bearing housing the shaft is once more turned through 90 degrees and the bearing balls 252 are set in the position where they abut against the under surface 280 of the frame and lift the frame up. Now the frame is suspended over the surface and the y-shuttle supports the frame with the ball bearing contact so the frame is free to move in any direction relative to the y-shuttle. The y-shuttle rests on the work surface. Subsequent 90 degrees turn sets the bearing housing to the fourth position (FIG. 31D). In this position the bearing balls 251 abut against the under surface 280 of the frame and lift the frame up over the y-shuttle to the height adequate to clean a print head that will be explained later. The frame with the x-shuttle is free to roll in any direction over the y-shuttle and y-shuttle rests on the work surface.

The Frame:

It is not obligatory to have one frame rod in x-direction clamped to the y-shuttle pins as in the second embodiment. The frame 231 comprises two parallel frame rods in the x-direction 220A, 220B (FIG. 29B, FIG. 29D, FIG. 32). Springs 216, like in the previous embodiments, clamp blocks 232A and 233A between horizontal rods 220A and 220B (rigidly fixed above the y-shuttle to the upper ledges of the frame) and pins 222 and 223 (FIG. 29A) rigidly fixed to the shuttle.

The guide shaft (with a round cross-sectional form) 290 which is fixedly mounted to the side blocks of the frame 231 at its opposite ends in parallel with the two parallel frame rods 220A and 220B with the work surface 205. For moving the x-shuttle 270, the third driving source (a stepping motor) 294, which drives the x-shuttle through gears, and the driving belt 295 are mounted to the frame (FIG. 29, FIG. 29B).

The driving belt 295 is tensioned in parallel with the axis of the guide shaft 290. The belt 295 is securely attached to the x-shuttle 270 by belt hooks 279A, 279B (FIG. 29B, FIG. 29D).

The guide rail ledges 296A, 296B (FIG. 29, FIG. 29B, FIG. 30) confine capability of the x-shuttle rotation about guide shaft axis.

The encoder strip 291 fixed to the frame and the encoder sensor 289 (FIG. 29) fixed to the inner upper side of the x-shuttle carriage 282 are used to determine carriage position and velocity data.

The X-Shuttle:

The basic parts of the x-shuttle 270 (FIG. 29, FIG. 29C and FIG. 32) are the carriage 282 and the complimentary supports 274, 275 which are conjointly movable along the shaft and the supports 274, 275 are free to turn about the shaft 290 independently of the carriage 282. The carriage, carrying an operating means (in this embodiment operating means is inkjet print head with four cartridges 282A, 282B, 282C, 282D), comprises two supports 273A, 273B. The motor 294 forces the x-shuttle 270 to reciprocate relative to the frame 231 by rotating the driving belt 295, which is fixedly attached to the support 274 by the hook 279A and to the support 275 by the hook 279B. The belt 295 permits only small rotations of the complimentary supports 274, 275 around the shaft 290 but the rotation of the carriage 282 is not constrained by the driving belt. Protruded ledge 298 of the carriage 282, biased by the spring 297A, leans against the guide rail 296A of the frame, which confines capability of the carriage rotation thus maintaining the carriage position in the tangential direction of the guide shaft axis.

Two solenoids 283A, 283B are fixedly mounted to the upper plate of the carriage 282, two solenoids 284A, 284B are fixedly mounted to the upper plate of the complementary support 274, and two solenoids 285A, 285B are fixedly mounted to the upper plate of the complementary support 275. When the solenoids are not energized the solenoid rods rest on the upper surface of the frame ledges 296A, 296B (FIG. 32). When the supports 273A, 273B, 274 and 275 are in the non-holding contact with the work surface, the x-shuttle is supported by the frame, and the ledge 298 is retained against the guide rail 296A forced by spring 297A. It is the state of the device when the operating means control forces the motor 294 to perform needed carriage movement for scanning and pixel forming operations on the work surface provided that the frame is in holding contact with the work surface.

If a line length is greater than an effective run of the carriage 282 then in order to continue printing it is necessary to perform three additional steps. The first step is turning the y-shuttle to the holding contact with the work surface and turning the frame to the non-holding contact with the work surface, with turning the bearing housings 286 to position shown in the FIG. 31C. In this position the frame is suspended over the work surface being supported by the y-shuttle. The second step is turning the x-shuttle supports to the holding contact with the work surface. To turn the x-shuttle supports to the holding contact with the work surface, the solenoids 283A, 284B, 285B are energized. The solenoid rods push against the frame ledges 296A, 296B, levering the carriage supports 273A, 273B and the complimentary supports 274 and 275 down to the work surface. Being pressed against the work surface, the supports engage it using one of the engagement means presented in the description of the first and the second embodiments of the device. After the supports have turned to the holding contact the solenoids 283A, 284B, 285B are de-energized. The third step is turning the y-shuttle supports to the non-holding contact with the work surface and turning the bearing housings 286 to the position shown in the FIG. 31A. Now the x-shuttle is motionless and the frame with the y-shuttle is free to slide along the shaft 290 across the work surface (FIG. 32A). The frame with the y-shuttle is now ready to move in the needed direction for prolongation of the line length.

After the frame and the y-shuttle have moved in the specified direction and to the specified distance, the frame is turned to holding contact with the work surface and the x-shuttle is turned to non-holding contact with the work surface; this is done by energizing the solenoids 283B, 284A, 285A of the x-shuttle. The solenoid rods push against the frame ledges 296A, 296B, pressing the frame against the work surface, and the frame supports engage the work surface using one of the engagement means presented in the description of the first and the second embodiments of the device. After that the x-shuttle supports 273A, 273B, 274 and 275 disengage the work surface, springs 297A, 297B, 297C force the x-shuttle to be lifted over frame and to be suspended over the work surface. The spring 297A forces the ledge 298 to be retained against the guide rail 296A. Now the device is in the state ready to perform carriage movement for scanning and pixel operations on the work surface.

Handling the Carriage Position:

The driving belt 295 forces the carriage 282 to move left and right along the shaft 290. The device has a carriage position sensing system. The sensing system comprises the encoder strip 291 and the optical sensor 289. A schematic diagram of the sensing system and resultant sensing signals are shown in FIG. 28. The encoder strip 291 is made from a series of alternating opaque regions 291A and transparent regions 291B. The optical sensor 289 runs left and right along the code strip 291. The alternate encoder strip 291 may also be of an alternating reflecting or non-reflecting material. The sensor 281 includes the light emitting diode 289B (positioned along one side of the strip 291), which illuminates the light detector 289A (positioned along the other side of the strip) that detects the transparent regions 291B and the opaque regions 291A of the strip 291. If the strip 291 is of the reflective/non-reflective type, then the sensor will be mounted on the same side as the led. The optical sensor 289 outputs a first signal (i.e., "high") when it detects a transparent region 234, and outputs a second signal (i.e., "low") when it detects an opaque region 233. The sensor 281 thus outputs a square waveform 235 that can be plotted against the encoder strip 291.

With each transition of the positioning waveform 235, the control circuitry (not shown) increments or decrements a counter A (not shown) depending upon the direction of motion of the carriage 282. The counter A thus holds a value that tracks the absolute position of the carriage 282 on the device shaft 290.

Another counter, counter B (not shown), is incremented and decremented depending upon the direction of motion of the carriage 282 with each transition of the positioning waveform 235, only if the frame is motionless and the x-shuttle is moving along the surface. The counter B thus holds a value that tracks the absolute position of the carriage 282 in x-direction.

A translational displacement of the printer in y-direction is implemented as in the second modified embodiment of the device using the first three positions of the bearing housings 286A, 286B, 286C and 286D.

The fourth position of the above mentioned bearing housings is dedicated for maintaining print heads fitness to work using service station 264. The service station 264 is arranged on the pallet, which is situated at lower part of the y-shuttle. When there is a need of using service station the motor 293 turns the bearing housings 286A, 286B, 286C and 286D to the fourth position (FIG. 32B) when the y-shuttle engages the work surface and the frame with the x-shuttle is in the non-holding contact with the surface. The frame 241 with the x-shuttle 270 is lifted over the y-shuttle 231 so that the print heads of the cartridges 282A, 282B, 282C and 282D, are over the service station 264 and the horizontal rods 220A, 220B of the frame are clamped to the upper levels (cams) of the spacers 232, 233. Now the service station is ready to be positioned under the print heads to execute service functions.

The service station 264 (FIG. 29A) includes the wipers 264A, the pre-fire receptacles (spittoons) 264B and the print head caps 264C. The print head caps 264C cover print heads to protect nozzles from drying out during periods of non-use. The wipers 264A may comprise blades or the like to wipe excess ink from the print heads which are driven by the motor 294 over the wipers for this purpose. Specifically, the wipers 264A are brought to contact with the print heads after a predetermined condition has occurred; for example, after a predetermined number of dots have been printed by a print head. The inkjet print head driven by the motor 294 reciprocally passes over the rubber blades or wiper, which wipe and clean nozzles excess ink. Pre-fire occurs when data to be printed requires driving nozzles that have not been driven for a specific time interval. The print head is put over pre-fire receptacles 264B. The print head ejects ink from its nozzles into receptacles so as to clear drying or coagulating ink from the nozzles.

Positioning of the print heads over specific area of the service station (wipers or pre-fire receptacles) is executed in three steps. First, the x-shuttle 270 (FIG. 29) is displaced by the motor 294 along the shaft 290 to the location facing the needed zone of the service station. Second, the bearing housings 286A, 286B, 286C, 286D are turned through 180 degrees to the fourth position lifting the print head (FIG. 32B). Third, the motor 292 turns the spacers 232, 233 (FIG. 29A, FIG. 32C). The cams 232B, 233B of the spacers shift horizontal rods 220A, 220B of the frame 231 (and the frame 231 with them) toward the service station and position the print heads over the chosen service station zone. Positioning of the print heads over print head caps shown in FIG. 32C is executed the same way except that before turning the spacers 232, 233 the solenoid 283A is energized lifting print heads over the print head caps. When the print heads are over the caps the solenoid 283A is de-energized and the spring 297A forces the caps to cover the print heads.

Functions of service station, therefore, require relative motion between service station and the inkjet print heads in both, x and y, directions. Motion in y-direction is performed by rotation of the cams 232B and 233B. Motion in x-direction is performed by moving x-shuttle with print head cartridges.

Printing Process:

One version of algorithms for implementation printer control functions is given in U.S. Pat. No. 6,404,507 to Hamainoto, et al. The described printer may work using conventional printing control with special interpretation and execution of some functions given below.

At the beginning of the printing work a self-propelled printer is put down on the work surface by hand or by any adequate tool at initial position (the beginning of the first line with the guide shaft 290 parallel to the line direction) and conversion the y-shuttle supports to the holding contact with the bearing surface. Printer placing and alignment may be done like the placement of the embodiment of the device for accurate incremental displacement explained earlier.

The next stage is the printer power-up initialization.

After placing the printer onto work surface the y-shuttle engages the work surface and the frame with the x-shuttle supported by the y-shuttle is suspended over the work surface. The service station caps still cover the print heads (FIG. 32C). At this stage the print heads are uncapped by energizing the solenoid 283A. Next by turning the cams 232B, 233B through 180 degrees the frame with the x-shuttle is shifted from the service station and the solenoid 283A is de-energized. After that the frame with the x-shuttle comes down to the "Print state" by turning the bearing housings 286A, 286B, 286C, 286D through 180 degrees with needed actions to bring the frame to the holding contact and bringing the y-shuttle to the non-holding contact with the work surface. The x-shuttle is moved to the home position and all hardware is initialized, the counter A and the counter B are zeroed. Next the x-shuttle is moved to the pre-fire zone (recognized by the "Pre-fire value" of the counter A) and the solenoid 283A. The Print heads spit some ink to the spittoons. After that the x-shuttle is moved to the wiper zone (recognized by the "Wiper value" of the counter A). The frame with the x-shuttle comes down to the wipers and the nozzles of the print heads are cleaned. When print heads initialization process is finished, the x-shuttle returns to the home position. Now the printer is ready to print the first line.

The Line Printing Stage:

The x-shuttle is moved in x-direction and prints pixel after pixel until the line length (the number of the pixels in the line) is equal to the counter B value or the counter A is equal to its maximal value (the x-shuttle in its run reach another end of the shaft 290) but the counter B value is less then the line length. In this case the x-shuttle engages the work surface and the frame disengages it (FIG. 32A). The frame (with the y-shuttle) is moved along the line to be printed sliding across the work surface, stops achieving the end of the shaft 290, and the frame engages the work surface.

After that the x-shuttle disengages the work surface and is moved in x-direction until the line length (the number of the pixels in the line) is equal to the counter B value or the counter A is equal to its maximal value. It recurs again and again until the line length is equal to the counter B. It completes printing of the line swath. If there is a need for another swath on the same line the x-shuttle returns to the home position and the line printing procedure is repeated. After the line is printed there is a check if the printed line is the last line. If it is not a last line the printer moves one step in y-direction to the beginning of the next line.

The Stage of the Printer Moving to the Next Line:

In the Print state the blocks 232A, 233A of the spacers 232, 233 bottom level abut against the frame rods 220A, 220B. Each of the bottoms of the spacers 232, 233 includes four blocks 232A, 233A that are parallel-sided blocks of a different thickness. In the Print state the blocks with the minimal thickness abut the frame rods. The opposite block thickness is line height more then the minimal thickness. At first the motor 293 turns the bearing housings 286A, 286D through 90 degrees and the bearing housings 286B, 286C through −90 degrees and during this turn the y-shuttle engages the work surface and the frame disengages the work surface respectively. Next the motor 292 turns the spacers 232, 233 through 180 degrees, displacing the frame relative the work surface by the line height on the y-direction by changing the clamped blocks. After that the motor 293 by rotation in the opposite direction turns the bearing housings 286A, 286D through −90 degrees and the bearing housings 286B, 286C through 90 degrees and during this turn the frame engages the work surface and the y-shuttle disengages the work surface respectively. At the last action the motor 292 turns the spacers 232, 233 through 180 degrees once more changing the clamped blocks and displacing the y-shuttle relative to the frame by the swath height on the opposite to y-direction returning the printer to Print state.

The Stage of the Finishing Print Job:

Once the last line is printed and print job is completed, the carriage is moved to the Service position. The print heads are wiped and capped. The x-shuttle is moved along the shaft 290 till the "Wiper value" of the counter A. The frame with the x-shuttle are lifted by turning the bearing, housings 286A, 286B, 286C, 286D through 180 degrees, then the frame with the x-shuttle are shifted in y-direction by turning the spacers 232, 233 through 180 degrees and print heads appears over the wipers. A small turn of the bearing housings 286A, 286B, 286C, 286D brings the print heads down to the wipers and the nozzles of the print heads are cleaned. After that the print head is lifted over the caps by energizing the solenoid 283A, x-shuttle is moved along the shaft 290 till the "Cap value" of the counter A and the print heads are capped as it is explained above.

The printer may move itself in y-direction on the fraction of the swath height according to the chosen printing method. The swath height fractions can be of different size. It may be done by using an appropriate set of blocks to the spacers 232, 233 and choosing proper spacer orientations at the different phases of the y-shuttle and the frame relative displacement.

A modification of this printer version, which will be presented now, replaces the sliding of the frame with y-shuttle across the work surface by the rolling of the frame with y-shuttle when the x-shuttle is in the holding contact with the work surface. It is important if the work surface is uneven. For such work surface it may be also needed to lift the supports for the greater distance from the work surface for turning them to the non-holding contact. In the last described embodiment complimentary supports of the x-shuttle can be lifted to a very small distance from the work surface as they are anchored to the driving belt. Only one of the complimentary supports may be anchored to the driving belt to transfer motion from the motor to the x-shuttle and will be used strictly for that purpose. Another may have capability of free independent rotation, like the carriage has in the described embodiment, and will be used as part of the contact means for the x-shuttle.

The frame in this modification is the same as in the considered embodiment.

The fractional isometric view of the x-shuttle in this modification is shown in FIG. 33C.

The complimentary support 274 of the x-shuttle is anchored to the driving belt by the hook 279A, but it has another form to fulfill only motion transmission function and in this modification there are no solenoids 284A, 284B and no spring 297B. Only the driving belt limits rotation of the complimentary support 274 over the shaft 290. The complimentary support 275 of the x-shuttle is not anchored to the driving belt and there is no hook 279B in this modification. The rest of the x-shuttle is the same (We should mention another possible modification, where the driving belt is anchored to the carriage 282 only and not to the complimentary supports, the supports of the carriage are withdrawn together with solenoids 283A, 283B, and complimentary support 274 is inverted so that its surface holder is situated at another side of the device and fulfils functions of the carriage supports).

The y-shuttle is slightly modified. Two shafts 304A, 304B with the pair of wheels eccentrically coupled to each of them are added to the bearing subsystem (FIG. 33B) of the y-shuttle (FIG. 33A). The shafts 304A, 304B are carried by the bearings 303A, 303B, 303C, 303D which housings are fixed to the y-shuttle 241. The stepping motor 293 rotates the shaft 304A with the wheels 286A, 286D in synchronism with the shaft 287A through the belt transmission 302A and rotates the shaft 304B with the wheels 286B, 286C in synchronism with the shaft 287B through the belt transmission 302B. Now we shall give correctives to the previous explanation of the device actions for this modification.

Four basic positions of the bearing housing 286 and the wheels 301 (FIG. 33B, FIG. 34A, FIG. 34B, FIG. 34C and FIG. 34D) determine a relative vertical position of the y-shuttle, the frame and the work surface. In the first position of the wheels 301 and the bearing housings 286 shown in the FIG. 34D the bed-frames 288 are supported by the bearing housings (so the frame is resting on the y-shuttle), the y-shuttle wheels 301 are resting on the work surface 205. To get to the second position of the bearing housing, the shaft 287 (FIG. 32B) is turned by the motor 293 through 90 degrees and the bearing balls 251 are at the bottom (FIG. 34B). In this position the balls 251 abut against the bottom of the bed-frame 288 and lift the y-shuttle up. The y-shuttle is suspended over the surface and is in the ball bearing contact with the bed-frame 288. The frame supports are resting on the work surface. To get to the third position (FIG. 34C) of the bearing housing, the shaft is once more turned through 90 degrees and the bearing balls 252 are set in the position where they abut against the under surface 280 of the frame and lift the frame up. Now the frame is suspended over the work surface, the y-shuttle supports the frame with the ball bearing contact so the frame is free to move in any direction relative to the y-shuttle, and the y-shuttle supports are resting on the work surface.

If a line length is greater than an effective run of the carriage 282 then x-shuttle is turned to the holding contact with the work surface, y-shuttle is turned to the non-holding contact with the work surface so it is bearing on the wheels 301 and carrying the frame on itself for moving on the work surface along the line. It is done in three steps. The first step is turning the y-shuttle to the holding contact with the work surface and turning the frame to the non-holding contact with the work surface with turning the bearing housings 286 to the position shown in the FIG. 34A. This figure shows a front view of the portion of the device (the left front frame support is removed as it screens off the shuttle support). In this position the frame is suspended over the work surface being supported by the y-shuttle. The second step is turning the x-shuttle supports into the holding contact with the work surface. To turn the x-shuttle Supports into the holding contact with the work surface, the solenoids 283A, 284B, 285B are energized. The solenoid rods push against the frame ledges 296A, 296B, levering the carriage supports 273A, 273B and the complimentary supports 274 and 275 down to the work surface. Being pressed against the work surface the supports engage it using one of the engagement means presented in the description of the first and the second embodiments of the device. After the supports have turned to the holding contact the solenoids 283A, 284B, 285B are de-energized (FIG. 34B). The third step is turning the y-shuttle supports to the non-holding contact with the work surface and turning the bearing housings 286 and the wheels 301 to the position, shown in FIG. 34D. So now the x-shuttle is motionless and the y-shuttle with the frame is bearing on the wheels 301 and is free to slide along the shaft 290 and to roll across the work surface. The frame with the y-shuttle is now ready to move in the needed direction for prolongation the line length.

After the frame and the y-shuttle have moved in the specified direction and to the specified distance, the frame is turned into the holding contact with the work surface and carries the y-shuttle on itself, the x-shuttle is turned into the non-holding contact with the work surface. It is done in three steps. The first step is turning the bearing housings 286 and the wheels 301 to the position, shown in FIG. 34B. The second step is turning the y-shuttle to the holding state with the work surface and the x-shuttle to the non-holding state. For this purpose, the solenoids 283B, 284A, 285A of the x-shuttle are energized. The solenoid rods push against the frame ledges 296A, 296B, pressing the frame against the y-shuttle and the y-shuttle against the work surface. The y-shuttle supports engage the work surface using one of the engagement means presented in the description of the first and the second embodiments of the device. After that the x-shuttle supports 273A, 273B, 274 and 275 disengage the work surface, the bias springs 297A, 297B, 297C force the x-shuttle to be lifted over the frame and to be suspended over the work surface. The spring 297A forces the ledge 298 to be retained against the guide rail 296A. The third step is to turn the frame to the holding contact with the work surface and the y-shuttle to the non-holding state when it is supported by the frame (FIG. 34B), as explained earlier. Now the device is in the state ready to perform carriage movement for scanning and pixel operations on the work surface.

It is worthy to note that the ball bearing in the housings 286 may be replaced by slide bearing and in the dusty environment the bed-frames may be closed. For preventing accuracy disturbance in the dusty environment, assembly of the shuttle, the frame and the spacer can be easily protected from dust with elastic coverings.

An incrementally moving printer may be equipped with an additional operating means like an optical scanner as described in U.S. Pat. No. 6,523,920, which is mounted on the print cartridge receptacle in fixed spatial relationship with the print head, and a cutter as described in U.S. Pat. No. 6,499,840. The cutter may be used to cut the printed product. It may turn the fine initial alignment to be dispensable.

Scanning the printing with a lag of several lines may be used for the accumulated error evaluation and for fine correction in the printing quality and the device movement. It can be done by comparing chosen items of the scanned printed image with the portions of the original memory image in the locality of the chosen items and determining offset and rotation of one image with respect to another by finding shift value of the chosen items to maximum coincidence with the memory image portions. In place of the scanner any other optical means can be used, for example the navigation unit, as proposed in U.S. Pat. No. 6,568,777 to Anderson, et al. The offset of one chosen item of the scanned image with respect to the original image can be determined by the correlation of several shifting of the scanned item with an overlapped original image portion. One way to obtain correlation values is to make the trial item shifts by a distance of half printed pixel (for more accurate offset calculation ¼ pixel shifts may be used), successively in x-direction and for each shift in x-direction several shifts in y-direction. Assuming that offset is not more than the pixel dimension, 2 shifts in positive x-direction plus 2 shifts in negative x-direction plus one zero shift in x-direction times 2 shifts in positive y-direction plus 2 shifts in negative y-direction plus one zero shift in y-direction give 25 shifts of the trial item. If ¼ printed pixel shifts are used then it totals to 81 trial item shifts. After each shift the trial item and item of the original image that overlap each other are subtracted and the resulting differences are squared and summed to form a measure of similarity, which can be used as a correlation, within that region of overlap. A few words about the image subtraction: for each pixel of the original image, which is overlapped by the particular trial pixel, the overlapped pixel portion is determined (for simplification, in case of ½ pixel shifts the overlapped pixel portions can be 1, ½, ¼ of the pixel area, in case of ¼ pixel shifts the overlapped portions can be 1, ½, ¼, ⅛ of the pixel area); a "generalized" original image pixel overlapped by the particular trial pixel is the sum of the pixel area portion multiplied by the pixel value for all overlapped image pixels; the subtraction is made between the trial image pixel and the generalized original image pixel for all trial image pixels. A single trial shift with the least sum of squared differences (greatest correlation) is taken as an offset. The procedure is repeated for several scanned items. The average of the offsets is taken as an accumulated shift error evaluation of the image for printing period from the scanned line to the latest printed line. Image rotation coarsely evaluated as the angle between the line connecting two scanned items (preferably located at the opposite ends of the printed line) and the line connected the same items shifted by determined offsets.

A scanner may be applied for correction of the print quality by using the work surface marks with the known coordinates. Removable marks may be superimposed on the medium. The scanner may be used for measuring accumulated error by comparing determined location of the scanned items with known coordinates of the same items. Special marks with known coordinates may serve as the patterns. They may be located within the image area or outside, on the periphery, of the image. Determined coordinates of the scanned pattern of the image printed on the work surface earlier may be compared with the coordinates of the same pattern when it was printed. The print quality correction can be done by changing the image forming device's position and orientation. The image forming device's position and orientation may be changed by using the multiple state spacers as mentioned above or by the three linear actuators provided with means measuring linear displacements; two of them positioned at the opposite ends of the frame changing the printing line orientation and step-displacement correction and the third changing the device position along the line.

As another example of using an incrementally moving image forming device, the device for laser marking or engraving may be considered. Basically, laser marking or engraving is carried out by line pixel scanning and focusing a laser beam on a work surface, the laser beam being switched on at every image point or off at every blank position. A marking on a thermal print media is accomplished by transferring dye from a sheet or pre-coated solid layer of a dye donor material to the thermal print media by applying a sufficient amount of thermal energy to the dye donor material to form an intended image. The laser tool head has to be mounted as the operating means on the carriage of the incrementally moving device. The optical sensor 281 provides position signals to tool head control processor, which in turn energizes the laser as a function of the actual position of the tool head. The laser print head includes a plurality of laser diodes, which are coupled to the print head by fiber optic cables, which can be individually modulated to supply energy to selected areas of the thermal print media in accordance with an information signal. The print head of the image forming apparatus includes a plurality of optical fibers coupled to the laser diodes at one end and to a fiber optic array within the print head at the other end. The dye is transferred to the thermal print media as the radiation, transferred from the laser diodes by the optical fibers to the print head and thus to the dye donor material, is converted to thermal energy in the dye donor material. One version of the laser head implementation and control is given in U.S. Pat. No. 5,268,708 to Harshbarger, et al.

After an image is imparted to the medium, the incrementally moving device keeps moving across the surface and engages the surface outside the image area. The donor material is removed from the medium surface. Additional donor sheets or solidified layers of the donor materials may be sequentially superposed with the medium surface. Each time the medium surface is covered with the donor material the incrementally moving device is moved across the surface back to the image area and transfers another image or another part of the image onto the medium until the desired complete image is obtained.

One more way to use movable image forming device with laser head is printing or changing pattern of variety of products, which can be made using electromagnetically responsive particles. Such products include electronic paper, color-changing fabrics and decorative coverings (e.g., wall paper, carpets, rugs, and tapestries). Need for an electronic paper-like print means has recently prompted development of electronic paper technology, utilizing various techniques, such as rotation of bichromal colorant particles (e.g., U.S. Pat. No. 6,690,350 to Sheridon), microencapsulated electro-phoretic colorant (e.g., U.S. Pat. No. 6,738,050 Comiskey, et al), thermal rewritable, etc. The colorants are field translated or rotated under the influence of an applied electromagnetic or electrostatic field so the desired hemisphere color faces the observer at each pixel. U.S. Pat. No. 6,670,981 to Vincent, et al., presents invention that provides a hard copy system including: a rewritable medium having a molecular colorant; and a laser printer for generating electric fields associated with said molecular colorant for writing and erasing a print image therewith. Another print-head for printing on rewritable sheet is presented in U.S. Pat. No. 6,707,479 to Pan, et al. The print head has multiple solenoid-actuated print wires that are operable to reciprocate toward and away from the medium. The biasing system is coupled to the print head and is operable to apply through print wires extended toward the medium an electric field that is greater than a threshold electric field needed to reorient switchable display elements in a localized region of the medium.

Usage of movable image forming device makes it possible to work with device of the significantly smaller size than the printed rewritable sheet. Printing device may be built in or be compatible to palm computer or to cellular phone. A variety of other products can be made using electromagnetically responsive particles. Such products include color-changing fabrics and decorative coverings (e.g., wall paper, carpets, rugs, and tapestries). Present invention makes it possible to change patterns of the end products of this kind occasionally by wish of the owner.

In the image forming process the difference between the desired and the actual pixel position has to be insignificant and tolerable. Pixel positions in the line have to be equally spaced. If the carriage moves with the steady speed then the laser has to be energized at equal time intervals, which depends on the carriage velocity. The time to the next pixel has to be estimated and anticipatory signal to the pixel forming operating means (taking account of the time from the issuing signal to the pixel forming on the work surface) has to be generated. It is not a simple task taking into account considerable scanning velocity. A tool head may be moved at a velocity of about 30 cm/sec and more. In order to obtain a surface image of acceptable quality, the lag in actuating an image forming head as a result from the physically and structurally conditioned response rate has to be adjusted as a function of the head velocity. The time from the issuing signal to the pixel forming on the work surface can be estimated in advance for the known steady velocity and estimated value may be used for issuing anticipatory signals in real time. The essential correction or compensation takes place during the acceleration and deceleration path of the carriage after the beginning and before the end of its movement. The correction may be fulfilled on the basis of an acceleration and deceleration profiles stored in the memory of a control device and on the basis of acceleration data collected by an encoder and fed to a control device as it proposed in U.S. Pat. No. 6,423,931 to Penz et al.

Another way to overcome errors due to the acceleration and deceleration zones (critical zones) of the line is to cease operating means action within those zones. It is reflected sometimes in the permissible minimal size of the side margins in the print work. The critical zone is sized in correspondence with ramp up and rump down non-uniformity of a carriage on which the operating means is mounted, so as to accommodate a distance between a point where the image degradation due to speed non-uniformity is noticeable to a point where image degradation is no longer noticeable. By using the device it is possible to cease operations within the critical zones and still to create a continuous image without side margin limitations. For this purpose the device ceases operating means action within a deceleration zone of the run. Then the device is displaced forward in the run direction not to the end of the run but for the distance of acceleration zone plus deceleration zone shorter then the run. After that the carriage is moved backward to the extreme position and begins the run continuing the previous one but operating means restart operation from the location where it ceased operation during the previous run. At the moment of the restarting operation the carriage has already passed an acceleration zone and is moving with steady velocity. For this type of operation it is enough to determine a time delay value from the issuing signal enabling the operating means to its real operation on the surface. Then, while the carriage is moving with said steady velocity, enabling signals are issued for said time delay value ahead for any pixel location.

For engraving hard materials, like concrete, stone, etc., the operating means of direct mechanical action can be used. Among them there are operating means of the sort generally referred to as "needle scalers", which use one or more impacting tools that are repeatedly driven into the work surface to be engraved by impacts from a hammer that is conventionally pneumatically operated, but that could be electrically or hydraulically driven. A needle scaler typically uses ten to thirty pointed rods, called "needles", as the impacting tools. It is also known to engrave hard surfaces using grinding wheels and chisels. The gravure engraving heads may use cutting styli formed of diamond.

Engraving processes are mostly dusty. The dust removal may be fulfilled by vacuum device with vacuum exhaust hoses to be provided at the work zone. They can be arranged on the pallet of the service station, as it is adjacent to the middle part of the work zone.

It is appropriate to make a few remarks:

If the work surface is not completely flat the main parts of the device may be provided with three supports in place of four.

All embodiments of the image forming device mentioned above describe relative displacements of an image forming device across the work surface. If an image forming device is fixed at one location and a medium for image forming can be moved relative to the bearing surface (or medium is placed on the image forming device, which is fixed upside down), then the image forming device induces the intermittent medium movement relative to the image forming device during the image forming activity.

The contact means with the suction holder described above are suitable mostly for the flat even work surface. Suction means for contact with uneven surface can be built on the basis of one described in U.S. Pat. No. 5,429,333 to Klein. It comprises a mounting plate traversed by vacuum passages, one side of which serves for sealing purposes and is provided with a closed roll of compressible material. The mounting plate is designed as a plane-parallel and stiff plate. It is advantageous to use a roll of an easy deformable elastic material.

This mounting plate 307 (FIG. 35A—bottom view, FIG. 35B—cross-section front view) can have one or more vacuum connections 308 running as channels ending in suction openings. Several vacuum connections in such plate offer the possibility to create several vacuum chambers by mounting several closed rolls 309.

Furthermore the sealing side of the holding plate can be provided with the rigid uneven surface structure 311 (see FIG. 35C) enhancing the holding forces with the uneven bearing surface 305. For instance this sealing side surface can be provided with milled ribs. Soft silicon rubber may be used as the elastically deformable sealing mass of the mounting plate. When vacuum is created between the mounting plate and the surface, it has the particular feature of fitting itself vacuum tight to the irregularities of the latter. An extruder can be used for producing a pre-shaped profile. This profile can be shaped like sealing lips in order to achieve a quick sealing. The application of the rolls onto the mounting plate is thereby facilitated by a guide element, which is guided along in a groove of the mounting plate.

An essential advantage resulting from the use of an easy elastically deformable sealing mass combined with the surface structure 311 consists also in the fact that it is self-sticking and can be affixed onto an uneven surface even before generating vacuum—by mechanical contact pressure—since indentations occur between the sealing mass and the uneven surface.

A disadvantage is an occurrence of small uncontrollable shifts of the mounting plate in the process of fitting the sealing side surface structure of the plate to the uneven work surface. It can induce an inaccuracy in the displacement of the frame relative to the shuttle determined by the spacer. One of the ways to overcome this source of inaccuracy is to use a hard deformable elastic material, like hard rubber, with high friction surface in place of milled ribs.

Another way is to use bulges, as pads or bumps, 312 (FIG. 36A—bottom view, FIG. 36B—cross-sectional view taken along line 1-1 of the FIG. 36A) capable of controllable changing its state from liquid to solid and vice versa under control of electric or magnetic field, or influenced by temperature in place of the rigid structure of the plate sealing side. Substance of the kind and pads and bumps of the kind are described for other applications in, for example, U.S. Pat. No. 6,149,391 to Pohl, et al., U.S. Pat. No. 6,666,368 to Rinne and U.S. Pat. No. 6,682,893 to Taylor, et al.

Phase-changeable pad and bump technologies include, for example, solders, waxes, thermoplastics, electro-rheologic fluids and magneto-rheologic fluids. It will be understood that electro-rheologic and magneto-rheologic fluids are fluids that may contain small polar or ferromagnetic particles that can stick together when exposed to either an electrical or magnetic field, respectively. When the particles stick together, the viscosity of the fluid can increase dramatically. The design and operation of all of these phase-changeable pad and bump technologies are well known to those having skill in the art, and need not be described further herein.

The liquefied pads have to be solidified when the plate is pressed against the work surface 305 forming rigid structure fitting the uneven surface (FIG. 36B). The pads have to be liquefied to release the holding plate. If bumps are used then the portion of the holder support surface carrying the bump has to be wettable with bump substance and bearing work surface has to be unwettable with the bump substance.

A plurality of the small changing phase pads or bumps at the bottom of supports can be used for controllable changing the holding/non-holding contact with the bearing surface if the bearing surface has multiple small projections or if it is porous, fractured, or of lattice or of fibrous structure. Parts of the pads or bumps penetrate through the bearing surface holes or fractures and are distorted when the plate is pressed against the bearing surface. The plate is fastened to the bearing surface after solidification of the pads. After the substance liquefying the plate can be easily untacked.

The suction means shown in FIG. 35, 36 can be modified. Modification is shown in FIG. 37A (bottom view of this means modification). The high friction substance 311 or/and 312 may be placed not within the vacuum areas 308 of the mounting plate but outside the multiple vacuum areas.

Yet there is another way to overcome small uncontrollable shifts and inclinations of the mounting plate in the process of fitting the plate sealing side surface with hard uneven structure, like milled ribs, to the uneven work surface. This way is to make a double story holding means. The role of the lower story unit is to fasten to the work surface. The role of the upper story unit is to fasten to the lower story unit and to correct inaccuracy induced by the lower story unit. The bottom surface of the lower story holding unit is fitted to be releasably fastened to the work surface and its upper surface is fitted to be releasably fastened to the bottom surface of the upper story holding unit. The lower story holding unit is movably coupled to the upper story holding unit. The bottom surface of the upper story holding unit is fitted to be releasably fastened to the lower story unit. After the lower story unit is fastened to the work surface the upper story unit, which is fixed to a frame, a shuttle or a base of the device, is fastened to the low story unit with eventual shift to secure proper contact between the frame and the shuttle clamped together and to counteract the tensions in the device. It can also correct small inclinations needed if the work surface is uneven or not completely flat, using liquefying pads or bumps at the bottom of the upper level unit or at the top of the lower level unit. The releasable holding means of any type may be used as the upper story holding unit and as the lower story holding unit. The first example of double story holding means is shown in FIG. 37B and FIG. 37C. The FIG. 37B shows a sectional view of the double story holding means in the non-holding state with the bearing surface, and the FIG. 37C shows a sectional view of this means in the holding state with the bearing surface 305. The lower story holding unit 313B is the mounting plate with two easy elastically deformable closed rolls 309A and 309B and the vacuum connections: 308A for vacuum chamber 315A formed by the rolls 309A, 308B for vacuum chamber 315B formed by the roll 309B. The unit 313A is suspended from the upper story holding unit 313A when the holding means is not pressed against the bearing surface 305 (FIG. 37B). The upper story unit in this double story holding means is the suction means of the type shown in the FIG. 15C. Its cups 314A and 314B are served as vacuum sources for the lower story unit. The FIG. 37B shows the upper story unit 313A, which cups 314A and 314B have already contracted by forcing them down, and the unit is ready to be pressed against the work surface. When the unit 313 is pressed against the work surface the low story unit 313B is shifted fitting itself to the uneven bearing surface, as it can be seen in FIG. 37C. But the unit 313A, being forced by external restraints and capable to move freely across the upper surface of the unit 313B, keeps its position determined by the external conditions. The FIG. 37C shows the double story suction means 313 in holding state with the work surface. The cups 314A and 314B are reshaped creating under pressure within the cups and within the vacuum chambers 315A, 315B and fastening the upper holding unit 313A to the lower holding unit 313B, and the lower holding unit 313B to the bearing surface 305.

The second example of double story holding means is shown in FIG. 37D. The FIG. 37D shows a sectional view of the double story means in the non-holding state with the bearing surface. This holder is similar to the previous one. The sealing lips of the cups 314A and 314B are enlarged and it is advantageous if they are made of an easy deformable elastic material. Pads with magneto-rheologic fluids 317 are added to the upper surface of the lower unit. The upper surface adjoined to the pads is slip-resistant. Permanent magnets 316, located under the pads 317 close to them, are added to the lower unit. For definiteness, assume that the N-poles of the magnets 316 are under the pads. Electromagnets 318 are added to the upper unit and its bottom surface adjacent to the pads is slip-resistant. Prior to all fastening actions the electromagnets 318 are energized so that their N-poles are close to the pads 317. The pads are softened. When the unit 313 is pressed against the work surface the low story unit 313B is possibly shifted and slightly inclined fitting itself to the uneven bearing surface. But the unit 313A, being forced by external restraints and capable to move freely across the upper surface of the unit 313B, keeps its position determined by the external conditions eventually shifting and inclining itself relative to the unit 313B. The cups 314A and 314B are reshaped creating under pressure within the cups and within the vacuum chambers 315A, 315B and fastening the upper holding unit 313A to the lower holding unit 313B, and the lower holding unit 313B to the bearing surface 305. After that the electromagnets 318 change polarity and the magneto-rheologic pads 317 are solidified fixing the position of the holder 313.

If the bearing surface is very rough and the double story holding means described above is not enough to level the supports, one more upper level unit can be added to the double story holding means, which is used in this case as a low story unit. Each upper story unit in this sandwich like structure is fitted to be releasably fastened to the adjacent one with eventual small shifts and inclinations to fit to external restraints. The above configuration is an example of device part becoming a rigid structure when the part is in holding contact with the work surface.

Now we present releasable holding mechanism based on a flexible strip capable of multiple fastening and releasing the work surface, which may be used as the contact means for image forming device.

The first alternative is presented in FIG. 38. FIG. 38A shows isometric view of this mechanism under no driving force. The mechanism comprises:

a supporting structure, as shown in FIG. 38B;

the driven member 319 (FIG. 38C) (which is based on a right circular cylinder sector in this mechanism but may have another form with surface area of any cylinder with convex directrix) movable back and forth relative to the supporting structure;

the flexible strip 320 (FIG. 38C), one end A of which is anchored to the supporting structure and another end B is anchored to the driven member;

a flexible strip 320 can be in the holding state with the work surface and releasing this surface being pulled out from it; and the driving structure imparting and directing a motion to the pressing member to fasten the flexible strip to the work surface and to pull out said strip from said work surface, shown in FIG. 38D (the driven member 319 and the strip 320 are not included in the driving and guiding structure).

The base of the strip 320 is made of a flexible stretch-proof durable material, for example PET tape or flexible elastic steel strip. The base is coated with a layer of material capable of having multiple releasable holding contacts with the work surface (or adhered to this material) and adhered to an elastic substrate on the opposite side. Alternatively an elastic substrate may be adhered to the driven member surface facing the strip.

The driven member 319 is connected by the ties 321A, 321B, 321C and 321D to the discs 322A, 322B, 322C and 322D respectively. The ties 321A, 321B are anchored to the discs 322A, 322B, which are rigidly fixed to the shaft 323. The ties 321C, 321D are anchored to the discs 322C, 322D which are rigidly fixed to the shaft 324.

The shaft 323 is provided with torsion springs 325A, 325B that rotate the shaft 323 with the discs 322A, 322B and force the ties 321A, 321B to roll the driven member 319 guiding it so that cylinder generix is parallel to the line A-A (FIG. 38A). The driven member, while rolling, stretches the strip 320 over the work surface and during stretching presses it against the work surface fastening the strip to the surface.

One more tie 326 is anchored to the shaft 324. Another end of the tie 326 is connected to the end of the rod 327. When the rod 327 is pushed down, the tie 326 rotates the shaft 324. The shaft 324 rotates the discs 322C, 322D, which force the ties 321C, 321D to roll driven member 319 applying a peeling force to the strip 320. The peeling force is applied to the flexible strip 320 in proximity of the boundary line between part of the flexible strip, which is still in the holding state with the work surface, and part of the strip, which has already released the surface. The angle of the force relative to the surface is near 90 degrees.

As long as a force is applied to the rod 327 pushing it down, the driven member 319 is retained in the position shown in the FIG. 38F (partly cross-sectional South-East isometric view), keeping most of the strip 320 in the upper position. In this position the holder is lowered to the work surface and is pressed to it. A small part of the strip in proximity of the line A-A is fastened to the work surface fixing the holder at its position relative to the work surface. To put the holder to the fast grip with the work surface the pressing force is withdrawn and the torsion springs 325A, 325B force the driven member 319 to roll stretching and fastening the strip 320 to the work surface and retain the driven member in the position, shown in the FIG. 38E (partly cross-sectional South-West isometric view). To release holding the holder is raised from the work surface after the pressing force is applied to the rod 327 and the driven member is brought to the position shown in the FIG. 38F.

The holder may comprise several "leaves" of strips synchronously releasing grip by pushing down one rod. The holding means may comprise an actuator pressing and releasing the rod by control signals. FIG. 38G shows the holder with two leaves and solenoid as actuator, FIG. 38H shows the holding means with three leaves, and FIG. 38I shows the holder with four leaves and solenoid as an actuator.

A flexible strip may be provided with a flexible permanent magnetic layer, or a flexible elastic layer with plurality of miniature suction caps, or a releasable adhesive layer, or a non-tacky contact responsive fastening layer, or a bur layer, or a layer with phase-changeable pads or bumps capable of changing its phase by influence of temperature or by electric or magnetic field, or a layer capable to be fastened to the holding surface by electrostatic forces, or a layer with plurality of short micro fibers capable to be fastened to the holding surface by molecular forces, for example by Van der Waals forces, or any combination of said layers. The layer may be permanently fixed to the flexible strip or may be fixed with possibility to replace it by another layer.

The second alternative of a releasable holder based on a flexible strip capable of multiple fastening and releasing the work surface is presented in FIG. 39A and FIG. 39B. The FIG. 39A shows an isometric view of the holding mechanism in a process of disengaging the work surface 305. FIG. 39A shows side view of the mechanism. The mechanism comprises:

a supporting structure, consisting of three pairs of ribs 330A and 330B, 331A and 331B, 332A and 332B with binding ribs 350, 351, 352, supporting a strip, and two cores 334A, 334B with the rod 335 supporting a driving structure;

two driven rods 336, 337 movable back and forth relative to the supporting structure;

the flexible strip 338 with one end anchored to the rib 350 and another end anchored to the rib 351 of the supporting structure; the flexible strip 338 is covered with the layer 339, which can be in holding state with the work surface and can release this surface being pulled off from it.

A driving structure imparting and directing a motion to the driven members 336, 337, which fasten the flexible strip to the work surface and pull out said strip from the work surface forced by the force, indicated by the arrow F, include:

the rib pair 340A, 340B pivotally coupled at one end to the rod 336 and coupled at the other end to the rod 341, abutting the cores 334A, 334B of the supporting structure;

the rib pair 342A, 342B pivotally coupled at one end to the rod 337 and coupled at the other end to the rod 343, abutting the cores 334A, 334B of the supporting structure;

the rib pair 344A, 344B pivotally coupled at one end to the rib pair 340A, 340B respectively at the middle of them and pivotally coupled at the other end to the rod 335;

the rib pair 345A, 345B pivotally coupled at one end to the rib pair 342A, 342B respectively at the middle of them and pivotally coupled at the other end to the rod 335;

the helical string 346 anchored to the rod 343 by one end and to the rod 335 by the other end;

the vertical rod 347 anchored to the rod 341 to pull it for peeling the strip releasing the holding means from the work surface.

When there is no pulling force the rod 343 is forced down by the spring 346. The rod 343 slides on the cores 334A, 334B and moves down the ends of the ribs 342A, 342B. The ribs 342A, 342B drive the cylinder 336 in the direction perpendicular to the cores 334A, 334B, being restrained in motion by the ribs 344A, 344B and by the strip 338, which is tensioned by the friction between the structure driving the rod 337 and supporting structure. The tensioned strip pushes the cylinder 337, which is similarly restrained by the driving structure and can be moved only perpendicular to the cores, toward the rib 350. So without pulling force the strip 338 is spread horizontally from the rib 351 to the driven rod 336.

The holder is placed on the work surface in the state when the pulling force F is active. The vertical rod 347, being forced by the force F, pulls up the rod 343. The rod 343 is coupled to the ends of the ribs 342A, 342B, so the ends of the ribs 342A, 342B are forced to move up abutting on the cores 334A, 334B. Other ends of the ribs 342A, 342B are forced to move horizontally (being restricted in their motion by the ribs 345A, 345B) toward the rod 335 forcing the rod 337 to move and to horizontally spread the part of the strip (tensioned by the spring 346), which is on the left side of the rib 352 (FIG. 39B). This forces the strip part with the layer 339, which is on the right side of the rib 352, to be strained in incline position from the rib 352 to the rod 336.

To turn the holder to the holding state the pressure against the bearing surface is applied to the holder and pulling force is withdrawn. The rod 336 slides horizontally by the strip pressing it down driven by the ribs 340A, 340B, which are forced by the spring 346. The strip is tensioned by the sliding rod 337 and friction between the driving structure restraining its motion and the supporting structure. The layer 339 is fastened to the bearing surface being pressed against it. If the layer 339 needs special local influence to fasten to the bearing surface, like heating, the system may be provided with the needed means and the executing terminal set, like a heating element, is fixed to the rod 336.

To release the holder, the pulling force F has to be applied to the rod 347. The rod 347 pulls up the rod 343 along the cores 334A, 334B. The rod 343 imparts horizontal motion to the driven rod 337 through the ribs 342A, 342B pressing the strip down. It creates the peeling force in proximity of the boundary line between the part of the flexible strip, which is still in the holding state with the bearing surface, and the part of the flexible strip, which has already released the bearing surface. Under this force the rod 336 is moved towards the rod 335. If the layer 339 needs special local influence to release the bearing surface, like heating, the system may be provided with the needed means and the executing terminal set, like a heating element, is fixed to the rod 336. The holder is in the non-holding state as long as the force F is acting.

Like the previous variant, the holder may comprise several "leaves".

A ball support with two leaves holder attached to the base structure 349 is shown in FIG. 39C and FIG. 39D. FIG. 39C shows the ball support where the solenoid 348 has pulled the rod 347, the strips 338 are lifted and the holding strip parts 339 does not touch the work surface 305. The only contact with the work surface 305 is by the ball 354 and the support is in the non-holding contact with the surface. FIG. 39D shows the ball support where the solenoid 348 is deactivated, the rod 347 is pulled down by the spring, the holding strip layers 339 are spread on the work surface 305 and are fastened to it. Now the support is in the holding state.

A side view of the third alternative of releasable holder based on the flexible strip capable of multiple fastening and releasing the work surface is shown in FIG. 39E. This mechanism is similar to the second mechanism. Modifications are as following: The driving structure does not include the spring 346 but includes the shaft 355 and the torsion spring 356. It also does not include the ribs 342A, 342B, 345A and 345B. The rod 347 is anchored to the rod 341. One end of the strip is anchored to the rib 351 but another end of the strip is anchored to the shaft 355. In this case the force F pushes the rod 347 down.

When the force F ceases, the torsion spring 356 rotates the shaft 355 and lifts the rod 336 tensioning the strip 338 in inclined position. So the strip does not touch the bearing surface and the holder does not engage the surface. To fasten the holding means to the work surface the holder is pressed against the surface and the rod 347 is pushed down. The rod 347 pushes down the rod 341 and pair of ribs 340A, 340B (the last is not seen in the figure). The ribs 340A, 340B being restrained by the ribs 344A, 344B (the last is not seen in the figure) pushes the rod in the horizontal direction. The rod 336 stretches the strip 338 and presses the layer 339 against the work surface fastening the holding means to the surface.

Presented means may also be used as a multiple releasable, self-adhesive manual tack-means.

By "position" of a rigid structure relative to an external coordinate system we mean the coordinates of the origin of a local coordinate system of the said structure in the external coordinate system. By "orientation" of the rigid structure relative to an external coordinate system, which (x,y)-plane is parallel to the (x,y)-plane of the local coordinate system of said rigid structure, we mean the angle between an x-axis of the local coordinate system of said object and an x-axis of said external coordinate system. All bases, auxiliary bases and image forming means holder described below are rigid structures.

Embodiments of the Image forming device, which are described below, feature creating an image portion by portion, each portion being created while a base of said device is motionless at the stoppages between displacements, and after each displacement the position and orientation of the base, which is a rigid structure, is determined relative to the reference coordinate system of the flat work surface. This determination is done on the basis of the measurements of the change of said position and orientation of said base. As a matter of fact the embodiments presented above are based on the determination of the position and orientation of said the device relative to their initial position, but in part of displacements it was done implicitly counting the predetermined displacements caused by the displacements of the spacers. The displacement of the spacer is change in the position, or change in the orientation, or change in both the position and orientation of the spacer.

The fourth device embodiment is a Digitizing and Image Forming device, hereinafter DIF device (partly similar to the digitizing and plotting device presented in U.S. Pat. No. 5,397,865 to Park), explicitly determining its position and orientation relative to the work surface.

The DIF device includes an articulated arm with an operating means holder at one end. The operating means includes an image forming and a digitizing means. The other end of the arm is fixed to a housing of the apparatus. The articulated arm is capable of extending over the work surface and capable of pivoting in the plane of the work surface. Two angular displacement sensors measure the extension and the pivot angle of the arm. The third angular displacement sensor measures the pivot angle of the operating means holder relative to the arm end. The angular information is converted into the position and orientation of the operating means holder and then into the position and orientation of the image forming arrays and digitizing means. In operation, a communication link is established between the DIF device and a computer system. In the preferred embodiment, the communication link is a wireless connection. The tracking information, which includes data to determine positions of the image forming arrays and digitizing means, is relayed to the computer system. The computer system can relate the operating means coordinates to the coordinates on the display screen, thereby permitting the trace of the operating means over the work surface to be accurately reproduced on the computer display.

A cross-hair reticle in a flat, transparent piece that is traced over the work surface may be used as the digitizing means. A manual switch may be used by the user to indicate by the position of the switch that the DIF device is in an "image forming" mode, in a "digitizing" mode, or in a "screen pointing" mode. Such a manual switch may be placed on the housing of the device. A removable plotting or a printing cartridge, a scanning device, a laser marking or engraving tools, and others may be used as the image forming means.

FIG. 40A shows the DIF device 400. The device 400 comprises an articulated arm attached to the base 405A that is engaged to the work surface 425 by three ball supports like the one shown in FIG. 39C and FIG. 39D (mostly they are in the holding contact with the bearing surface). The articulated arm includes the first articulated arm segment 410A, rectangular in shape, and the second articulated arm segment 410B, also rectangular in shape, joined by the hinge joint 415B between them. The articulated arm segments are equal in length. The end of the first articulated arm segment, opposite its connection with the second articulated arm segment 410B, is joined by the hinge joint 415A to the pivot disc 430A, which is mounted to the base 405A in a manner which permits it to pivot freely in the plane parallel to the work surface 425. The first angular displacement sensor (described below with respect to FIG. 40D) detects the angular displacement (THETA.sub.1) of the pivot disc 430A relative to the base 405A. The second angular displacement sensor (described below with respect to FIG. 40C) detects the angular position (THETA.sub.2) of the first articulated arm segment 410A with respect to the work surface. The second articulated arm segment 410B is joined at the end opposite its connection to the first articulated arm segment 410A by the third hinge joint 415C to the pivot disc 430B, which is mounted to the operating means holder 405B of thickness equal to the base 405A in a manner which permits it to pivot freely in the plane parallel to the work surface 425. A third angular displacement sensor (described below with respect to FIG. 40D) detects the angular displacement (THETA.sub.3) of the pivot disc 430B relative to the operating means holder 405B. The operating means holder contains an image forming means 420A and the digitizing means 420B. The base 405A includes the mode switch 421, indicating if the DIF device is in a "image forming" mode, in a "digitizing" mode, or in a "screen pointing" mode, the manual pushbutton switch 422 that in a depressed state of the switch activates image forming if the device is in a "image forming" mode, activates digitizing if the device is in a "digitizing" mode, and pushbuttons 423, 424 acting as the left and the right mouse pushbutton if the device is in a "pointing" mode. A pedal can be used in place of the manual pushbutton switch 422. In an un-depressed state the switch 422 deactivates image forming if the device is in an "image forming" mode and deactivates digitizing if the device is in a "digitizing" mode.

The operating means holder 405B is supported by three ball supports like those that support the base 405A (their main state is free rolling). It keeps the disc 430B parallel to the work surface 425 and ensures that the discs 430A and 430B are at an equal distance from it. A torsion spring (not shown) on the joint 415B retains the holder 405B against the work surface 425.

Alternatively the operating means holder 405B may be supported by one or two ball supports keeping the same distances from the discs 430A and 430B to the work surface and parallelogram structures keep the holder parallel to the planar work surface. The parallelogram structures may be made, for example, as shown in FIG. 40B. Rigid links 416A and 417A of the same length, equal to the length of the segment 410A, are mounted to the opposite ends of the hinge joint 414A, which is mounted on the disc 430A parallel to the joint 415A. Rigid links 416B and 417B of the same length, equal to the length of the segment 410B, are mounted to the opposite ends of the hinge joint 414C which is mounted on the disc 430B parallel to the joint 415C and at the distance equal to the distance between the hinges 414A and 415A. Other ends of the links 416A, 416B and 417A, 417B are mounted to the opposite ends of the hinge 414B. The hinges 414B and 415B are mounted into fixing block 410C. The hinges 414B and 415B are parallel one to another and a distance of one hinge to another is equal to the distance between the hinges 414A and 415A. All rigid links are mounted to the hinges in a manner that permits them to pivot freely about the hinges.

Let us assume that the origin of the local coordinate system of the base 405A is the center of the disc 430A (the intersection of the disk axis and the upper disc surface) and the x-axis direction is perpendicular to the hinge 415A when (THETA.Sub.1) equals zero. Let us assume that the origin of the local coordinate system of the operating means holder 405B is the center of the disc 430B and the x-axis direction is perpendicular to the hinge 415C when (THETA.sub.3) equals zero.

The position (X.sub.p, Y.sub.p) of the center of the disc 430B relative to the base 405A coordinate system is determined as a function of the two measured angular displacements (THETA.sub.1) and (THETA.sub.2). The coordinate input device 400 is a polar coordinate (angle and radius) transducer. The rotation angle is determined directly from the first angular displacement sensor. The radius (distance from the center of the pivot disc 430A to the center of the pivot disc 430B) is determined from the angle between the first articulated arm segment 410A and the work surface 425, as determined by the second angular displacement sensor.

Given the second angular displacement (THETA.sub.2), the radius R is determined according to:

$R = 2A \cos(\text{THETA.sub.2})$ where: "A" is the articulated arm segment length.

Orientations of the base 405A and of the holder 405B in the reference coordinate system are their angles between the x-axis direction of their local coordinate system and the x-axis direction of the reference coordinate system. Let (THETA.sub.b) denote an orientation of the base in the reference coordinate system and (THETA.sub.h) denote an orientation of the holder in the reference coordinate system and let us assume that units of length measurement are the same in the base coordinate system and in the reference coordinate system. Then the position of the holder 405B (X.sub.h, Y.sub.h) in the reference coordinate system of the work surface may now be readily determined as following:

$X.\text{sub}.h = R \cos((\text{THETA.sub.1}) + (\text{THETA.sub.}b)) + X.\text{sub}.b$ and $Y.\text{sub}.h = R \sin((\text{THETA.sub.1}) + (\text{THETA.sub.}b)) + Y.\text{sub}.b$ where:

(X.sub.b, Y.sub.b) is the position of the base 405A in the reference coordinate system (coordinates of the base 405A origin point in the work surface reference coordinate system) and orientation of the holder is:

(THETA.sub.h) = (THETA.sub.b) + (THETA.sub.1) − (THETA.sub.3)

Now for calculation of the operating means coordinates in the reference coordinate system their polar coordinates in the local holder coordinate system will be used. Let us denote the local polar coordinates of the cross-hair of the digitizing means as ($R_D$), ($\Theta_D$). Position ($X_d$, $Y_d$) of the cross-hair in the reference coordinate system may now be determined by follows expressions $$X_d = (R_D)\cos(\Theta_h + \Theta_D) + X_h$$

$$Y_d = (R_D)\sin(\Theta_h + \Theta_D) + Y_h$$

Positions of the other operating means may be calculated in the same manner knowing their polar coordinates in the local holder coordinate system. If an operating means is an array of the active elements, like in the case of a printer or a scanner, then it is sufficient to calculate only positions of the first and of the last array elements.

FIG. 40C is a view of a mechanical apparatus for determining the angular position ($\Theta_2$) of the first articulated arm segment 410A. The first articulated arm 410A is rigidly attached via the hinge joint 415A to the sector gear 462. (Provisions can also be made for removal and replacement of the articulated arm by means of a snap-in locking mechanism or other removable coupling, which is rigidly attached in its locked or engaged state.) The sector gear 462, in turn, drives the gear 464, which is mounted to the shaft 472 in common with the shaft encoder disc 466. The motor 470, controlled by the controller, can be used to move the first articulated arm segment 410a. The shaft encoder sensor 468 reads marks or other encoding on the shaft encoder disc 466 to determine the angular displacement of the first articulated arm segment.

A detailed description of the operation of optical encoders may be found in the optical encoder sales brochures available from many sources, for example, "Hardware and software resolution for pointing device" of Microchip, one of the manufacturers of the mouse controllers. In general, each encoder measures the rotational position of its shaft by coupling its movement to an internal wheel having successive transparent and opaque bands. The encoder preferably uses two emitter-detector pairs (in the FIG. 40C and in the FIG. 40D both emitters are included in the light source and both detectors are included in the light sensor). If only one pair is used, the single output signal indicates motion, but cannot indicate which direction the encoder disk/shaft is turning. A practical encoder requires the addition of a second detector (and the second emitter if appropriate) slightly offset from the first so that it produces a square wave pulse stream that is 90 (electrical) degrees out of phase with the first pulse stream (offset is several grid spacing intervals plus ¼ of the grid spacing interval on the encoder disk), allowing the sensing of the direction of a motion, as is well known to those skilled in the art. The output of the analog encoder is substantially two sinusoidal signals, A and B. Coarse positioning occurs through monitoring the change in polarity of the signals A and B by an integrated circuit. The integrated circuit may be one like wide distributed ball-mouse controllers, output of Which are two digital signals, one of which indicates rotation through the ¼ grid pitch in the positive direction and another indicates rotation through the ¼ grid pitch in the negative direction. The fine positioning is determined by measuring the actual value of the two signals at the instant in question. Higher resolution encoders require finer pitch grid patterns on the disks, or the disks with larger circumferences that possess more grid lines per revolution. The manufacturers use various technologies to fabricate encoder disks. Most encoders use the plastic film disks imprinted with standard lithographic methods. These disks can reliably accommodate a grid pitch as fine as 0.002". It is possible to use the stepping motors with encoders manufactured in one package.

FIG. 40D is a view of a mechanical apparatus for determining the first angular displacement ($\theta_1$). The pivot disc 430A includes the downward facing ring gear 432A. The ring gear 432A drives an idler gear 474A, which in turn drives a gear 476A mounted to a shaft 478A together with the motor 484A and the shaft encoder disc 480A. The shaft encoder sensor 482A reads marks or other encoding on the shaft encoder disc 480A to determine the angular displacement of the pivot disc 430A. As before, the motor 484A can be used to rotate the pivot disc 430A under control of the controller. A similar apparatus can be used for determining the third angular displacement ($\Theta_3$) of the pivot disc 430B.

One of ordinary skill in the art will appreciate that many different techniques for determining angular displacement of the articulated arm segments are available and can be readily substituted for the techniques described herein. The apparatuses described with respect to FIG. 40C and to FIG. 40D are merely exemplary of such techniques, and it is within the spirit and scope of the present invention to substitute any suitable alternative technique.

In order to facilitate the attachment of articulated arms of different designs (e.g., with special capabilities, different dimensions, etc.) it is advantageous to provide means for removing and replacing articulated arms. One of ordinary skilled in the art will immediately recognize that this can be accomplished by providing the first segment of articulated arm (e.g., 410A) with a suitable snap-in locking mechanism or other suitable removal/replacement mechanism.

In "pointing" mode the device is working in the base local coordinate system. The computer screen is mapped to the predetermined rectangle in the base local space within reach of the digitizing means. A cursor location on the display screen is determined by the location of the digitizing means in the above mentioned rectangle. In a first step, after the device is mounted on the work surface and the base has engaged it at the base initial position, a reference coordinate system is established. In effect, the reference coordinate system may be established without loss of generality as a local coordinate system of the base at its initial position. We shall call the base initial position "the base home position". It is easy to determine the position and orientation of the base relative to any other known reference coordinate system of the work surface. For example, let us assume that at least two points of the work surface with known reference coordinates are within the reach of the DIF device digitizing means. In this case the DIF device is transferred into "Pointing" mode and "Calibration" submode for calculation of the position and orientation of the base in its starting position relative to said known reference coordinate system. In the "Calibration" submode two reference coordinates of the first known point are entered in the computer system. Next, the first known point is digitized in the base local coordinate system. The same procedure is performed with the second known point. The measured extension and pivot angles for the digitized point are stored in the memory. The position ($X_b$, $Y_b$) and the orientation ($\Theta_b$) of the base in the reference coordinate system are calculated resolving the new set of the equations obtained from the following equations:

$$X_h = R\cos((\Theta_1) + (\Theta_b)) + X_b$$

$$Y_h = R\sin((\Theta_1) + (\Theta_b)) + Y_b$$

$$X_d = (R_D)\cos((\Theta_h) + (\Theta_D)) + X_h$$

$$Y.sub.d = (R.sub.D)\sin((THETA.sub.h)+(THETA.sub.D))+Y.sub.h$$

$$(THETA.sub.h)=(THETA.sub.b)+(THETA.sub.1)-(THETA.sub.3),$$

by substituting X.sub.d and Y.sub.d by the known reference coordinates of the first point, substituting (THETA.sub.1), (THETA.sub.3) and R by their measurement values for the first point (X.sub.d, Y.sub.d), and adding to them the same equation set with the coordinates for the second known point.

The second step is establishing the correspondence between the work surface reference coordinate system and the computer image on the screen. It may be done by digitizing two known points of the computer image. The device is turned into the digitizing mode. Then computer image coordinates of the first known point are entered in the computer system by pointing image point on the screen or by explicitly entering two coordinates of the point in the computer image coordinate system. Then a point, corresponding to the first designated point of the computer image, is digitized on the work surface. The same procedure is performed with the second known point. These points may be any points in the computer image and on the work surface, as long as they are not the same. We assume that all considered coordinate systems are Cartesian, "right handed". After the correspondence between the work surface reference coordinate system and the computer image on the screen is established, the computer system traces the position and orientation of the operating means on the screen image during work session (depending of the DIF mode). This mapping of the memory image to the work surface coordinates will be called memory image in the start coordinate system.

The third step is determination of an image or an image portion in the work session of image forming. It may be done by pointing an area of the work surface or by pointing the area of the computer image. In the standard situations like printing text on the A4 size paper sheet the second and the third steps may be done as default by digitizing the paper position on the work surface in the established order, for example: the first digitized point is the upper left corner of the paper sheet, the second digitized point is the lower left corner of the paper sheet, the third digitized point is the lower right corner of the paper sheet.

Let us now consider different ways of usage of the DIF device for image forming.

Usage of the DIF device with an operating means holder being manually manipulated across the work surface and not using the motors. (It is understood that in case when the motor is not used, power to the sensors is provided through separate means.)

At first consider the printing of an image stored in the computer system. The computer system transmits data that represents the part of the image to be printed at a particular position on a print medium as the operating means holder travels over that particular position. The data is sent in the form of print data to drive printing cartridges to deposit droplets of ink. The conversion of the computer memory image data into print data is accomplished by a printer driver, which is typically implemented in computer software. The dynamic arrangement of segments of print data may be implemented at the driver level, or at a level above the driver level. That is, the printer driver may direct print data in an arrangement of segments responsive to the reception of the tracking information. By continuously monitoring the progress of the printing process, the computer is able to distinguish printed areas on the print medium versus to-be printed areas on the print medium. The monitoring allows the device to print only those pixels that were not printed previously. More detailed description of the moving printing device interaction with the computer may be found in U.S. Pat. No. 5,927,872 to Norihide Yamada.

Now consider scanning an image from the work surface and storing it in the computer system. The operating means holder comprises an image sensor. The scanning device may be moved in a freehand meandering pattern, such as one of alternating left-to-right and right-to-left movements with descent along the original. Each one of the side-to-side swaths should overlap a portion of the previous swath, so that the image may be manipulated with respect to a position and stitched either during or following the scanning process. The manipulation of the image signal is an operation of arranging and modifying acquired image data based upon the tracing of the optical image sensor array position in order to achieve conformance between original and output images. The imaging sensor is clocked as the scanning device moves across an original. The clocking ensures that the fastest moving element of the sensor samples at least once per pixel displacement. As the imaging sensor captures data the position and orientation of the sensor is acquired. The current position coordinates of the sensors are "tagged" at the ends of a line of data that corresponds to the number of pixels within the imaging sensor when data is sent to the memory. The position-tagged data stream related to the image swath fills memory locations that provide continuity in both the X and Y axes. Because the scanner is not subjected to any kinematics constraints in the plane of the original, there is a tendency for a user to follow a curvilinear path across the original from one end to another, as when the hand and forearm of the user rotate about the elbow. If the lower edge of the scanning device is the edge that is closer to the elbow that defines the axis of rotation, the lower edge will have a shorter radius. Consequently, imaging elements of an imaging sensor will vary with respect to the time and distance required to pass over the data block. So as the device is moved across the original, distorted image of the block is captured. The next step is to stitch successive image swaths within their region of overlap. This must be done in such a way as to identify and correct most of the accumulated errors. Techniques for stitching image swaths are known in the scanning art. These techniques typically require a pair of complete image swaths and produce a single, global transformation that brings the two swaths into registration. More detailed description of the free hand moving scanning device interaction with the computer may be found in U.S. Pat. No. 5,578,813 to Allen, et al.

If not all image area is achievable by the operating means from the present base position then the base is moved to another position and orientation on the work surface in such a manner that its new position and orientation relative to the reference coordinate system of the work surface can be determined, knowing its present position and orientation. So after the change of the base position an operating means work may be resumed for the new image portion. It may be done several times until the work is done over the whole image area.

A displacement of the base is done in three phases.

The first phase is to bring the operating means holder in the holding contact with the work surface. After that the position of the holder (X.sub.h, Y.sub.h) in the reference coordinate system are calculated by equations:

$$X.sub.h = R\cos((THETA.sub.b)+(THETA.sub.1))+X.sub.b$$

and $$Y_h = R\sin((\Theta_b)+(\Theta_1))+Y_b$$

where:

$(X_b, Y_b)$ is the position of the base in the reference coordinate system and R equals to $(2A\cos(\Theta_2))$ as was explained earlier.

The orientation of the holder in the reference coordinate system is calculated by equation:

$$(\Theta_h)=(\Theta_b)+(\Theta_1)-(\Theta_3)$$

as was explained earlier.

The second phase is to bring the base in the non-holding contact with the work surface. After that the base is displaced to another position and orientation relative to the work surface and engages the surface at the new location. The holder stays motionless during displacement of the base. Now the position $(X_b, Y_b)$ and orientation $(\Theta_b)$ of the base in the reference coordinate system are calculated by equations:

$$X_b = R\cos((\Theta_b)-(\Theta_1))+X_h$$

and $$Y_b = R\sin((\Theta_b)-(\Theta_1))+Y_h$$

where:

$$(\Theta_b)=(\Theta_h)+(\Theta_3)-(\Theta_1)$$

and $(X_h, Y_h)$ is the known position of the holder in the reference coordinate system and R is equal to $(2A\cos(\Theta_2))$ as was explained earlier.

The third phase is disengaging the surface by the holder. Now the DIF device is ready to work at the new location on the work surface.

So, a distinctive feature of the work with DIF device is periodically displacing the base and the holder, one with respect to another, and calculating the position and orientation of the displaced part in the reference coordinate system (on the basis of the measurements for determination of the position and orientation of the displaced part relative to the other), selecting at each step, which one—the base or the holder—is in the holding contact with the work surface and stays motionless with respect to the surface and which one is in the non-holding contact and is displaced across the surface.

Usage of the DIF device with the operating means holder being manually manipulated across the work surface and the holder motor is used only for preserving an orientation of the image forming array during session.

The manual manipulation of the DIF device described above has an essential element that overburdens computer work to map image pixels to the traced location of the image forming elements in real time. This is free changing of orientation of the image forming element array at any moment during the work session. Computer image pixels of the portion chosen to participate in the work session are stored as two-dimensional array. One index is changed along one side of the work surface rectangle chosen for image forming and another is changed along the other side. If needed the image representation of this portion within computer is transformed to this form during determination of the computer image to the work surface mapping by digitizing means at the beginning of the work.

To maintain the same orientation of the operating means holder during a work session the motor 484B mounted to the holder may be activated. In this case manual manipulating of the DIF device is carried out by manipulating the pivot disc 430B to let the holder 405B change its orientation freely. So, with known changes of the angles $(\Theta_b)$ and $(\Theta_1)$, the motor 484B can compensate the orientation change under control of the controller. At the beginning of the work session a desirable holder orientation is indicated by the vector on the computer. When the DIF device is placed on the work surface a desired orientation of the operating means holder is set according to the determined vector. After that the controller maintains the desired orientation using the motor 484B.

Usage of the DIF device with the operating means holder moving automatically across the work surface under the computer control and doing the base displacement manually.

The operating means holder routes may be pre-programmed. If the image area on the work surface is a rectangle then one of the pre-programmed routes may include parallel lines along one rectangle side, swath height apart, with the operating element array oriented along the other side of the rectangle.

Usage of the DIF device in an automatic operation mode:

In this mode a computer, under the user's control, determines a route for the DIF base displacements and orientations for an operating means holder movement at any base stop. This route depends on the size, the form and the structure of the image area on the work surface. As an example, in FIG. 41A a possible pre-programmed DIF base route and a possible pre-programmed holder route for the rectangle image of big size are shown. The first location of the base on the work surface 425 is 405A-1. At this position the portion 426-1,1 of the image 426 is printed. After that the holder is turned to the holding contact with the work surface at the location 405B-1 and the base is displaced along the horizontal border of the image 426 to the next location 405A-2. Then the base is turned to the holding contact, the holder is turned to the non-holding contact with the work surface and the portion 426-1,2 is printed. The next holder station for the base displacement relative to it is 405B-2. Such displacements and printing of the image portions is made several times until the last image portion 426-1,N of the first row is printed at the base location 405A-N. The last holder station at the first row is 405B-N. At this point the base is displaced to location 405A-(N+1) in the second row. At this location the portion 426-2,N of the image is printed. Then the holder is fixed at the location 405B-(N+1) and the base is displaced at the same distance as before but in the opposite direction. This process continues to the last base location 405A-2N. At this location the last portion 426-2,1 of the image 426 is printed.

For keeping a certain orientation of the operating means array along the whole image forming process a DIF device with parallelogram structures can be used. The fifth embodiment of the image forming device is an example of such device and shown diagrammatically in FIG. 42. The device comprises the main base 500 including two substructures 500A, 500B (engaging the bearing surface by the ball supports like in the previous embodiment) tightly coupled by the beam 500C, and the secondary base 501 including two substructures 501A, 501B (engaging the bearing surface by the ball supports like in the previous embodiment) tightly coupled by the beam 501C of the same size as the main base. Two bases are pivotally joined by two identical cross-members 502, 503. Two bases 500, 501 and two cross-members 502, 503 form a parallelogram structure. The main stepping motor turning cross-member 502 with the angle encoder (not shown) is mounted on the substructure 501A. The lead screw 504 with the stepping motor rotating it and the encoder system (not shown) are fixed to the cross-member 502 and the rail 505 is fixed to the cross-member 503. The lead coupling 506 is slipped over the lead screw 504 and the roll coupling 507 is slipped over the rail 505. The carriage system 509, including the carriage shaft 510, the operating means holder 511 reciprocating over the shaft, the carriage drive with the carriage position pickup 512, is pivotally coupled to the couplings 506 and 507 so that the carriage shaft is parallel to the beams 500C and 501C.

The device executes an image forming when both, the main base and the secondary base, are in the holding contact with the work surface. The device is in the home position when the cross-members are perpendicular to the base beams, the carriage is in the closest position to the main base and the operating means holder is in the most left position over the carriage shaft. The origin of the local coordinate system of the main base is the intersection of the upper side of the cross-member with the pivot connection axis of the main base 500 with the cross-member 502. The x-axis direction of this local coordinate system is from the origin to the point of the pivot connection axis of the main base 500 with the cross-member 503. The origin of the local coordinate system of the secondary base is the point of the pivot connection axis of the main base 501 with the cross-member 502. The x-axis is always parallel to the x-axis of the local coordinate system of the main base and directed from the origin to the point of the pivot connection axis of the main base 501 with the cross-member 503. The origin of the local coordinate system of the operating means holder is the upper left corner of the rectangular upper side of the holder. The x-axis is always parallel to the x-axis of the local coordinate system of the main base and directed from the origin to the upper right corner of the upper side of the holder. In the home position of the device the coordinates of the local coordinate origins of the secondary base and of the operating means holder are (a,0) and (.hx., .hy.) with respect to the local coordinate system of the main base. The values a, hx, hy are determined by measurements and can be verified by the device calibration. If the cross-members are turned through the angle .PHI. and the operating means holder slips over the lead screw to a distance yh and slips over the carriage shaft to a distance xh, then the coordinates of the origin (.ohx., .ohy.) of the operating means holder in the local coordinate system of the main base are:

.ohx.=.xh.+.yh. sin .PHI.+.hx.

.ohy.=.yh. cos .PHI.+.hy.

The x-axis of the operating means holder and the main base are parallel thus the orientation of the operating means holder relative to the main base is 0, so the position of the operating means in the main base local coordinate system is easily determined knowing their position within the operating means holder.

Let the coordinate system of the start base position on the work surface be the reference coordinate system of the work surface. The position of the secondary base at the initial position relative to the reference coordinate system is (0,a). An orientation of all of the device parts, the main base, the secondary base, and the operating means holder is 0 relative to the reference coordinate system. The device moves across the work surface by displacements actuating by the main stepping motor. A displacement of the secondary base is executed when the main base is in the holding contact with the work surface and the secondary base is in the non-holding contact with the surface. After the main stepping motor turns the cross-member the displaced secondary base is turned to the holding contact with the work surface and then the turn angle of the cross-member is determined. If the turn angle is PHI then the position (.xs., .ys.) of the secondary base with respect to the reference coordinate system is .xs.=.xm.+asyn.PHI.

.ys.=.ym.+a cos .PHI., where (.xm., .ym.) is the position of the main base.

A displacement of the main base is executed when the main base is in the non-holding contact with the work surface and the secondary base is in the holding contact with the work surface. After the main stepping motor turns the cross-member, the displaced main base is turned to the holding contact with the work surface and then the turn angle of the cross-member is determined. If the turn angle is .PHI. then the position (.xs., *ys.) of the secondary base with respect to the reference coordinate system is .xm.=.xs.+asyn.PHI.

.ym.=.ys.+a cos .PHI., where (.xs., .ys.) is the position of the main base.

An exemplified route of such device for forming an image is shown in FIG. 41B. At any displacement, position of the displaced part is determined as explained above. At the initial position of the device, shown as a rectangle structure (the carriage system is not shown) with corners 500A-1,1, 500B-1,1, 501B-1,1, 501A-1,1 the image portion 520-1,1 is formed on the work surface. The device travel to the next working position 500A-1,2, 500B-1,2, 501B-1,2, 501A-1,2 in the same row for forming the next image portion 520-1,2 is done in three steps. At the first step the substructures 501A and 501B of the secondary base are turned to the non-holding contact with the work surface and the stepping motor mounted on the main base substructure 500A turns the cross-member 502 through the angle .PHI. displacing the secondary base to the position 501A-T, 501B-T. The angle .PHI. is determined as arcsine(0.5 bc/a), were a is the distance between axes of the pivot connections of the bases to the cross-member and bc is a width of the rectangular image portion which has to be less then the operating means holder run along the carriage shaft. At the second step the substructures 501A and 501B of the secondary base are turned to the holding contact with the work surface, the substructures 500A and 500B of the main base are turned to the non-holding contact with the work surface and the stepping motor mounted on the main base substructure 500A turns the cross-member 502 through the angle −2 .PHI. displacing the main base to the position 500A-1,2, 500B-1,2. At the third step the substructures 500A and 500B of the main base are turned to the holding contact with the work surface, the substructures 501A and 501B of the secondary base are turned to the non-holding contact with the work surface and the stepping motor mounted on the main base substructure 500A turns the cross-member 502 through the angle .PHI. displacing the secondary base to the position 501A-1,2, 501B-1,2 and the secondary base substructures are turned to the holding contact with the work surface. After the last image portion 520-1,N in the same row is formed the device is displaced to the next row. The device movement to the next row is done in four steps. At the first step the substructures 501A and 501B of the secondary base are turned to the non-holding contact with the work surface and the stepping motor mounted on the main base substructure 500A turns the cross-member 502 through the angle θ displacing the secondary base to the position 501A-TR, 501B-TR, which is the half image portion height up with respect to its previous position. The angle θ is determined as arccos (a−0.5 ac)/a), were ac is a height of the rectangular image portion which has to be less then the maximal carriage (with the operating means holder) run along the lead screw. At the second step the substructures 501A and 501B of the secondary base are turned to the holding contact with the work surface, the substructures 500A and 500B of the main base are turned to the non-holding contact with the work surface and the stepping motor mounted on the main base substructure 500A turns the cross-member 502 through the angle—θ displacing the main base to the position 500A-TR, 500B-TR. At the third step the substructures 500A and 500B of the main base are turned to the holding contact with the work surface, the substructures 501A and 501B of the secondary base are turned to the non-holding contact with the work surface and the stepping motor mounted on the main base substructure 500A turns the cross-member 502 through the angle—θ displacing the secondary base to the position 501A-2,N, 501B-2,N. At the fourth step the substructures 501A and 501B of the secondary base are turned to the holding contact with the work surface, the substructures 500A and 500B of the main base are turned to the non-holding contact with the work surface and the stepping motor mounted on the main base substructure 500A turns the cross-member 502 through the angle θ displacing the main base to the position 500A-2,N, 500B-2,N and the main base substructures are turned to the holding contact with the work surface.

A common method to achieve positional accuracy with the robotic equipment is to use measurements of the relative angles between various portions of the robotic structure. The robotic equipment employed in the type of work described above typically have a working implement (e.g. welding tips, work piece grasping elements, etc.) pivotally attached to an arm structure which is in turn pivotally attached to a base structure. Given the angles between the arm, the base, the working implement, and the arm length along with the position and orientation of the base structure the position and orientation of the working implement can be fairly precisely determined.

There are many types of devices for digitizing three-dimensional articles. A common type of digitizing apparatus utilizes mechanical linkage assembly including a plurality of joints, wherein sensors are coupled to the mechanical linkage assembly to sense joint angles and linear linkage changes related to their position and orientation to determine the position and orientation of the stylus or other probe that is tracing the three-dimensional article. The stylus is fixed to one end of a series of mechanical linkages, and the other end of the linkage chain is connected to a base fixed to stationary surface.

The host computer system can sample the probe device to receive discrete data points at different spatial coordinates. The angle data read by the transducers can be converted into coordinate data by a local controller or by the host computer system. Examples of structural mechanisms having interconnected structural beams to position an article or tool and coordinate measuring machines are described in U.S. Pat. No. 3,944,798 to Eaton, U.S. Pat. No. 4,676,002 to Slocum, U.S. Pat. No. 5,402,582 to Raab, U.S. Pat. No. 5,829,148 to Eaton, U.S. Pat. No. 6,088,107 to Livingston, U.S. Pat. No. 6,125,337 to Rosenberg, and many others.

The described above method of the base displacement for broadening area that can be reached by a working implement may be applied to the robotic and digitizing equipment based on the arm type structure with sensors for determination of the working implement position and orientation. For this purpose the ability to be in two states, immobilized and movable, has to be added to the base, i.e. the base has to be equipped with releasable holding means. The auxiliary base that can change its state from immobilized to movable and vice versa has to be provided. One of the rigid mechanical linkages of the arm equipped with releasable holding means may be used as the auxiliary base. The base and the auxiliary base may be periodically displaced in turn provided at any moment at least one of them is motionless. Both bases have to be motionless before any displacement, and their position and orientation with respect to reference coordinate system have to be determined on the basis of the relative position and orientation one with respect to another.

The auxiliary base may not be mechanically coupled to the main base. In this case they are fitted with means for distance and orientation finders. Those means may comprise several laser transceivers for measuring distance and, optionally, direction to light-reflecting targets. Three distances are necessary in order to determine three-dimensional coordinates for one point. If the distances from three known points of the base to three known points of the auxiliary base are measured, the relative position and orientation one with respect to another can be determined. From geometric considerations, the minimum number of transceivers per reference point is three, however, the accuracy will increase as the number of transceivers increases. Examples of systems for determining relative position and orientation of one physical object relative to another are described in U.S. Pat. No. 4,134,681 to Elmer, U.S. Pat. No. 5,305,091 to Gelbart, et al, U.S. Pat. No. 5,917,600 to Rongo, et al, U.S. Pat. No. 6,166,809 to Pettersen, U.S. Pat. No. 6,381,006 to Ramstrom, U.S. Pat. No. 6,411,370 to Rajchel, et al.

The details of distance measurement by using phase measurement are well known in the art and will not be elaborated since they are used by commercial instruments such as Hewlett-Packard Model 3805A Distance Meter, manufactured by the Hewlett-Packard Company, Loveland, Colo.

If the main base and the auxiliary base are placed on the flat surface then two transceivers for a reference point is enough in order to determine two-dimensional coordinates for the reference point. If the distances from two known points of the main base to two known points of the auxiliary base are measured, the relative position and orientation one with respect to another can be determined.

Using these technique we now introduce another example of DIF device, the sixth embodiment, partially similar to the plotting device presented in U.S. Pat. No. 6,116,707 to Avida, but which uses another structure and methods to determine the accurate location of the operating means and controlling their movement and operation.

A diagrammatic top view of the DIF system of this type is shown in FIG. 43. The system comprises the operating means holder 568 that is placed on the flat surface 573 upon the recording medium 572, and is directed across the medium 572 by signals 566 transmitted to the operating means holder 568 by the control unit 564. The operating means holder 568 includes the motorized drive mechanism (not shown) that propels it preserving its orientation across the surface 573 in a controlled manner, for example using microwave control signals 566. In alternative mode the operating means holder 568 is moved across the surface by hand.

The control unit 564, comprising the transmitter 565, transmits the signal 566 including movement direction and velocity data and operating means enabling data.

The operating means holder 568 and the control unit 564 are fitted with a distance finder means. Those means may comprise at least two laser transceivers 585, 586 mounted to the control unit (at equal distance to the work surface) for measuring distances and optionally directions to at least two light-reflecting targets 587, 588 mounted to an operating means holder (at the same distance to the work surface). Two distances are necessary in order to determine two-dimensional coordinates for one point. If the distance from two known points of the control unit to two fixed points of the operating means holder is measured, the relative position and orientation of the operating means holder can be determined with respect to the control unit. For better accuracy a digital camera fixed to the control unit and an array of equidistant points on the operating means holder or an array of the optical transceivers and an array of the target points may be used additionally to the set of range finders.

In place of the laser transceiver other optical transceiver may be used. Another possibility is to use ultrasonic transducers or radio microwave transceivers in place of optical transceivers and reflectors. The distance measurement from a point on the work surface to the point on the operating means holder may be based on comparing phases of the returned and sent signals, as in the case of the optical or microwave signals, or by measuring the signal traveling time from sender to receiver, as in case of the ultrasonic signal.

Thus, the control unit 564 can accurately update the current position and orientation of the operating means holder with respect to the reference coordinate system, which may be the local coordinate system of the control unit in its starting position.

For covering larger area by DIF device of this type, as in the previous embodiment, control units may be displaced while the operating means holder is motionless engaging the work surface by the releasable holders described herein above. First, the control unit determines the position ($x_{hr}$, $y_{hr}$) and orientation ($\Phi_{hc}$) of the operating means holder with respect to the reference coordinate system. Second, the control unit is displaced to the new location. Third, at the new location the control unit determines the position ($x_{hc}$, $y_{hc}$) and orientation ($\Phi_{hc}$) of the operating means holder in local coordinate system of the control unit (relative to itself). Then, knowing the position ($x_{hr}$, $y_{hr}$) and orientation ($\Phi_{hc}$) of the operating means holder with respect to the reference coordinate system, determines its own position ($x_{cr}$, $y_{cr}$) and orientation ($\Phi_{cr}$) with respect to the reference coordinate system as follows.

$$x_{cr} = x_{hr} - x_{hc}$$

$$y_{cr} = y_{hr} - y_{hc}$$

$$\Phi_{cr} = \Phi_{hr} - \Phi_{hc}$$

At least one auxiliary unit 563 is needed for tracking continuously moving operating means holder if the DIF device covers a larger area.

It is fitted with at least two additional laser transceivers 589, 590 that measure distances and optionally directions, like the main control unit, to the light-reflecting targets of the operating means holder. Additional transceivers are clocked by the control unit and measurement results are returned to the control unit. The control unit determines the position and orientation of the operating means holder relative to the auxiliary unit using these measurement results. By determining the position and orientation of said operating means holder relative to the reference system practically at the same time the motionless control unit can determine the position and orientation of the auxiliary unit relative to the reference coordinate system. Using range data from several points of the motionless auxiliary unit to several points of the operating means holder and knowing its position and orientation with respect to the reference system, the control unit can determine the position and orientation of the operating means holder relative to the reference coordinate system. Then the control unit can determine its own position and orientation relative to the reference coordinate system by determining the position and orientation of said operating means holder relative to itself. Like in the previous embodiment both the control unit and the auxiliary unit may be displaced in turn across the work surface determining the position and orientation of the control unit with respect to the reference coordinate system after each displacement. When the control unit is moving to the new location it performs tracking using data from the auxiliary peripheral unit. When the auxiliary peripheral unit is moving to the new location the control unit performs tracking using its own data. When both, the auxiliary peripheral unit and the control unit, are motionless tracking is performed by the control unit with redundant data from both units. So the control unit 564 can track the position and orientation of the operating means holder 568 relative to the reference coordinate system continuously and thus it can continuously control the image forming activity on the larger area. To determine positions and orientations with more accuracy two additional light-reflecting targets 591, 592 may be added to the auxiliary unit. So the control unit may use additional range data from its transceiver to the auxiliary unit reflecting targets calculating its position and orientation relative to the auxiliary unit.

In all described above printing procedures it is preferable to scan image portions overlapping each other but to print only those pixels that were not printed earlier. If operating means of the DIF device include scanning facilities, which are in fixed spatial relationship with the printing operating means, then overlapping enables evaluation of an accumulated error, as it explained herein above. Then accumulated error is evaluated by the offsets of the scanned items and the fitted memory image items which coordinates in the start coordinate system can be calculated. Location of the memory image pixel(i,j) in the start coordinate system may be calculated, for example, by knowing saved location of the image pixel(1,1) and the values and directions of the memory image vectors (pixel(1,1), pixel(1,2)) and (pixel(1,1), pixel(2,1)) in the start coordinate system. The error evaluation may be used for estimating image forming quality, image device fitness or for correction of the DIF device's position and orientation in the surface reference system.

For coordinate corrections special marker signs may be formed by the DIF device on the work surface at the specific locations within reach from the next location of the DIF device and the device's absolute position and orientation can be automatically corrected in the new location using these marker signs.

Any image forming device equipped with precision scanning operating means and with any controllable means bringing the base of said device to holding/non-holding contact with the work surface may be moved by any drive means from one location to another for forming an image portion by portion while the device's base is motionless on the work surface at the stoppages between displacements, provided:

a position of any image forming means can be determined in the same base local coordinate system; in other words, a spatial relationship between any image forming means and the precision scanning operating means coupled to said base can be determined;

a part of the image formed before the last base displacement is within reach by scanning means from the next base location;

there are several mark signs (with known spatial relationship with said work part of the image) that are placed on the work surface by the same device or existent on the work surface.

Within these conditions image coordinates determined by the device are adjusted by a correction procedure at each new base location. The correction procedure is established after the device stoppage before forming of the next image portion at this stoppage using said mark signs scanned by said scanning means to obtain forming of the next image portion with correct spatial relationship with the image portions formed earlier.

The simplest way to establish the correction procedure is finding two mark signs with known image coordinates (.x1., .y1.), (.x2., .y2.) using the scanner, determining their local coordinates (.X1., .Y1.), (.X2., .Y2.) from the new base location, and determining the linear coordinate transformation mapping point (.X1., .Y1.) to point (.x2., .y2.) and point (.X2., .Y2.) to point (.x1., .y1.). The correction procedure is applying this linear transformation to coordinates of each image point determined by the device at this stationary location of the base. The coordinates of the mark signs may be determined by scanning them at each stationary location of the base after coordinate correction and may be saved for future usage in the correction procedure at the next stoppage of the device. Instead of the device image coordinate transformation the memory image may be changed by the linear transformation mapping point (.x1., .y1.) to point (.X2., .Y2.) and point (.x2., .y2.) to point (.X1., .Y1.) at each stoppage of the device.

Note that scanning is not obligatory optical so as mark signs are not obligatory visible. The only requirements are that the scanning means can sense the image signs and can determine their coordinates with an accuracy needed for precise image forming.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore understood that the appended claims encompass any such modifications or embodiments and all changes which come within the meaning and range of equivalency of the claims are therefore intended to be embraced therein.

The invention claimed is:

1. An image forming device operating on a work surface and forming an image portion by portion in the course of incremental displacements of said device relative to said work surface comprising:
    at least two parts such that a first part is operatively positioned on said surface and adapted to either be in holding contact immobilized relative to said surface or to be in non-holding contact with said work surface and a second part is movable relative to said first part and is adapted to be in holding contact immobilized relative to said surface or to be in non-holding contact with said work surface, the parts being rigid structures or becoming rigid structures when in holding contact with the work surface;
    contact means for selectively bringing said first part and said second part to the holding contact with said work surface to become a rigid structure immobilized relative to said surface and for selectively bringing said first part or said second part to the non-holding contact with said work surface;
    means for determining the position and orientation of said parts relative to each other when said parts are immobilized relative to said work surface at a stoppage between said displacements;
    an image forming means for creating an image, portion by portion, each portion being formed while at least one of said parts is motionless relative to said work surface at the stoppages between said displacements.

2. The device according to claim 1, further comprising:
    a clamping means clamping said parts to each other;
    at least one spacer for spacing apart the clamped parts when interposed between them;
    a spacer displacement means for displacing said at least one spacer, interposed between said clamped parts at the beginning and/or at the end of said displacement to produce a predetermined change in position and orientation of said parts relative to each other.

3. The device according to claim 1, wherein the image forming means include at least one linear array of operating elements further comprising means for maintaining the same orientation of said image forming means with respect to the initial position of said device on said work surface.

4. The device according to claim 1, further comprising means for monitoring an accumulated error in determined position and orientation relative to said work surface of said part equipped with image forming means for operating on said work surface.

5. The device according to claim 2, wherein said clamping means include at least one of a spring, an elastic body and a magnet.

6. The device according to claim 2, wherein, when said at least one spacer is interposed between said clamped parts, there are line contacts with said parts.

7. The device according to claim 6, wherein:
    said at least one spacer is a parallel-sided block;
    said line contact between said at least one interposed spacer and one of said parts is obtained by a cylinder rigidly fixed to said part and one side of said at least one spacer; and
    said line contact between said at least one interposed spacer and another of said parts is obtained by another cylinder rigidly fixed to this part and the opposite side of said at least one interposed spacer, whereby said line contact between the interposed spacer and each of the cylinders is obtained.

8. The device according to claim 7, further comprising adjustment means for changing directions of said cylinders to achieve predetermined displacement of said device with higher accuracy.

9. The device according to claim 2, wherein at least one of said parts includes a shaft and further comprises:
    at least two parts conjointly movable along said shaft, each one of them capable of turning about said shaft independently one of the other;
    an actuator for imparting motion along said shaft to at least one of said conjointly moving parts; and
    an encoder for generating positional data of at least one of said conjointly moving parts relative to said shaft.

10. The device according to claim 9, wherein at least one of said parts movable along said shaft is adapted to be in holding contact to become a rigid structure immobilized relative to said work surface or to be in non-holding contact with said work surface.

11. The device according to claim 10, wherein one of said parts movable along said shaft is a carriage carrying the image forming means and said device further comprises:
a service station carrying a plurality of different service modules and located on one of said parts; and
a mechanism for moving the carriage and the service station in a vertical direction and in two different horizontal directions relative to each other to reach a servicing position, in which the operating means is adjacent to at least one of said different service modules.

12. The device according to claim 1, wherein said non-holding contact of one of said parts with said work surface is achieved by bringing said part to a position in which said part does not touch said work surface.

13. The device according to claim 12, wherein said part is brought to a suspended position in which said part is supported by another part.

14. The device according to claim 13, wherein said part is in rolling contact with said another part.

15. The device according to claim 1, wherein the contact means comprise pressing means supported by one of said parts and providing controllable pressure to another of said parts against the work surface.

16. The device according to claim 15, wherein the pressing means comprises at least one solenoid.

17. The device according to claim 1, wherein the means for determining position and orientation of said parts relative to each other comprise at least one of an angular encoder, a linear encoder and a distance measuring means.

18. The device according to claim 1, further comprising:
means for determining a position and an orientation of said image forming means in a reference coordinate system of said work surface; and
an enabling means operatively coupled to said image forming means to enable said image forming means depending on said image forming means' position and orientation determined in said reference coordinate system of said work surface.

19. The device according to claim 1, further comprising means for error evaluation of determined position and orientation of said part, which carries the image forming means.

20. The device according to claim 1, further comprising:
a scanning operating means capable of sensing mark signs existing on said work surface or formed on said work surface by the image forming means and coupled to said device so that spatial relationship between said image forming means and said scanning operating means can be determined; and
correction means for establishing a linear transformation after said device senses said mark signs scanned by said scanning means, and applying said linear transformation to image coordinates to initiate forming of the next image portion with correct spatial relationship with said image portions formed earlier.

21. The device according to claim 1, further comprising an initial positioning means and a portable host computer for operation control and for storage of image and control data to be used as a portable image forming workstation.

22. The device according to claim 1, wherein the contact means comprises a flexible suction holder comprising:
at least one flexible suction cup, which when pressed against a surface becomes deformed with consequential expulsion of air from within the cup releasing said surface if it was stuck to it with the base of said cup, and when said base of said cup is pressed against said surface and said deformed cup restores its shape by elasticity force or by pulling the top of said deformed cup from said surface forming a negative pressure within said cup and forcing said cup to be stuck to said surface; and
a member for carrying out said suction cup deformation, upon being influenced by a controllable change of a magnetic field.

23. The device according to claim 22, wherein said member is a pin integral with the top of the cup.

24. The device according to claim 23, wherein said pin has a canal with a valve for releasing air from the cup and closing said canal from outside air.

25. The device according to claim 1, wherein said contact means comprise a releasable holding means comprising:
a plurality of flexible suction cups, each of them when pressed against a surface becomes deformed with consequential expulsion of air from within the cup releasing said surface if it was stuck to it by the base of said cup; and when base of said cup is pressed against said surface and said deformed cup restores its shape by elasticity force or by pulling top of said deformed cup from said surface forming a negative pressure within said cup and causing said cup to become stuck to said surface;
members that press said suction cups against a bearing surface when forces are applied to said members; and
an actuating means capable of applying forces on said members in a cyclical manner with a time shift.

26. The device according to claim 25, further comprising solenoids having rods, said rods constituting said members.

27. The device according to claim 1, wherein said contact means comprise a releasable holder comprising:
a supporting structure;
at least one flexible strip that is anchored to said supporting structure and can be in a holding state with said work surface;
at least one member having a convex cylindrical area which is movable in back and forth directions relative to said supporting structure and, when being moved, rolls over said flexible strip and presses said flexible strip against said work surface; and
a driving structure for imparting and directing motion to said at least one member to fasten said flexible strip to said work surface and to pull out said flexible strip from said work surface.

28. The device according to claim 27, wherein the driving structure of the releasable holder comprises an actuator.

29. The device according to claim 27, wherein said at least one member rolling over said flexible strip, in one of the back or forth directions, applies a peeling force to said flexible strip in proximity of a boundary line between a portion of said flexible strip, which is still in the holding state with said surface, and part of said flexible strip, which has already released said surface.

30. The device according to claim 29, wherein:
said at least one member rolling over said flexible strip in one direction presses said flexible strip against said work surface and, while rolling in the opposite direction, pulls out said flexible strip from said work surface;
said flexible strip is anchored to said at least one member by one of its ends and another end of said flexible strip is anchored to said supporting structure; and
said driving structure comprises at least one spring.

31. The device according to claim 27, wherein two ends of said flexible strip are anchored to said supporting structure and at least two members having convex cylindrical areas can roll over said flexible strip; one of said members while rolling over said flexible strip in one direction presses said flexible strip to said work surface and another of said members, while rolling over said flexible strip in the same or another direction, pulls out said flexible strip from said work surface.

32. The device according to claim 27, wherein one end of the flexible strip is anchored to the supporting structure, another end of the flexible strip is anchored to the driving structure, and the driving structure comprises at least one spring.

33. The device according to claim 30, wherein said at least one member of said releasable holder is a sector of a cylinder.

34. The device according to claim 1, wherein the contact means comprises a stiff plate for sticking to an uneven surface, at least one vacuum channel runs from one side of said plate to another side ending in a suction opening and said suction opening is enclosed with a closed roll of an easy deformable elastic material for sealing purposes.

35. The device according to claim 34, wherein the sealing side of said stiff plate is provided with a rigid uneven surface structure.

36. The device according to claim 2, wherein the contact means comprise a double story releasable holding means comprising an upper story holding unit and a lower story holding unit wherein said lower story holding unit is movably coupled to said upper story holding unit; said upper story holding unit and said lower story holding unit are fitted to be releasably fastened to each other; and said lower story holding unit is fitted to be releasably fastened to said work surface.

37. The device according to claim 36, wherein said upper story holding unit and said lower story holding unit are fitted to be releasably fastened to each other with small shifts and inclinations to secure proper contact between said clamped parts.

38. The device according to claim 1, wherein the contact means comprise at least one of an electromagnetic means, an elastic substrate, a suction cup, a layer with a hard face of needles, a substance capable of controllably changing its state from liquid to solid and vice versa, a layer with releasable pressure-sensitive adhesive, a contact responsive fastening layer, a retractable bearing means, a flexible permanent magnetic layer, a flexible elastic layer with plurality of suction caps, a layer capable of being fastened to a holding surface by electrostatic forces and a layer capable of being fastened to a holding surface by molecular forces.

39. A method of moving an operating tool for treatment of a work surface using a device, said device comprising first and second parts which are clamped to each other and movable relative to each other by at least one interposed spacer, and at least one of said parts is adapted to carry said operating tool, comprising the steps of:
  bringing said first part into holding contact with said work surface;
  bringing said second part into non-holding contact with said work surface;
  displacing said second part relative to said first part whereby change in the position and orientation of said second part relative to said first part is determined by displacement of said at least one interposed spacer;
  bringing said second part into holding contact with said work surface;
  bringing said first part into non-holding contact with said work surface;
  displacing said first part relative to said second part whereby the change in the position and orientation of said first part relative to said second part is determined by displacement of said at least one interposed spacer.

40. A method of intermittently moving at least two parts and determining their position and orientation in a reference coordinate system, the method comprising:
  (a) starting at an initial state where at least one of said parts is motionless and its initial position and orientation in said reference coordinate system is determined;
  (b) moving any of said at least two parts except for said at least one motionless part; and
  (c) stopping at least one of the moving parts and determining its position and orientation relative to one of said at least one motionless part, thereby determining the position and orientation of said stopped part in said reference coordinate system, said stopped part becomes said motionless part.

* * * * *